United States Patent
Yamamoto et al.

(10) Patent No.: US 10,459,638 B2
(45) Date of Patent: Oct. 29, 2019

(54) COMPUTER SYSTEM THAT GENERATES GROUP INFORMATION AND REDUNDANT CODE BASED ON USER DATA AND CHANGES THE GROUP INFORMATION AND REDUNDANT CODE BASED ON TRANSMISSION DATA, CONTROL METHOD FOR COMPUTER SYSTEM, AND RECORDING MEDIUM

(71) Applicant: HITACHI, LTD., Tokyo (JP)

(72) Inventors: Takahiro Yamamoto, Tokyo (JP); Hiroaki Akutsu, Tokyo (JP); Yoshinori Ohira, Tokyo (JP)

(73) Assignee: HITACHI LTD., Tokyo (JP)

( * ) Notice: Subject to any disclaimer, the term of this patent is extended or adjusted under 35 U.S.C. 154(b) by 0 days.

(21) Appl. No.: 16/065,961

(22) PCT Filed: Feb. 22, 2016

(86) PCT No.: PCT/JP2016/055017
§ 371 (c)(1),
(2) Date: Jun. 25, 2018

(87) PCT Pub. No.: WO2017/145223
PCT Pub. Date: Aug. 31, 2017

(65) Prior Publication Data
US 2018/0373429 A1 Dec. 27, 2018

(51) Int. Cl.
*G06F 3/06* (2006.01)
*G06F 11/10* (2006.01)

(52) U.S. Cl.
CPC .............. *G06F 3/061* (2013.01); *G06F 3/067* (2013.01); *G06F 3/0647* (2013.01); *G06F 3/0665* (2013.01); *G06F 11/1076* (2013.01)

(58) Field of Classification Search
CPC .......... G06F 3/061; G06F 11/10; G06F 3/067; G06F 3/0647; G06F 3/0665; G06F 11/1076; G06F 3/0631; F06F 3/0659
(Continued)

(56) References Cited

U.S. PATENT DOCUMENTS 7,546,342 B2 6/2009 Li et al.
10,152,260 B2* 12/2018 Yamamoto ............ G06F 3/0631
(Continued)

FOREIGN PATENT DOCUMENTS

| JP | 2010-198464 A | 9/2010 |
| JP | 2014-203233 A | 10/2014 |
| WO | 2014/162586 A1 | 10/2014 |

OTHER PUBLICATIONS

Wildani et al. "Protecting against rare event failures in archival systems", 2009 IEEE International Symposium on Modeling, Analysis & Simulation of Computer and Telecommunication Systems, Sep. 21-23, 2009, entire pages (Year: 2009).*
(Continued)

*Primary Examiner* — Hong C Kim
(74) *Attorney, Agent, or Firm* — Volpe and Koenig, P.C.

(57) ABSTRACT

The performance of a computer system which distributes and stores user data and a redundant code is improved. Each computer generates group information indicating positions of a user data region and a redundant code region in each of a plurality of computers; when a write request for write data is received, each computer writes the write data to a local storage device, selects a transmission destination computer on the basis of the group information, and transmits transmission data to the transmission destination computer; when a plurality of pieces of transmission data are respectively received, each computer generates a redundant code by using the plurality of pieces of transmission data on the basis of the group information, and writes the redundant code to
(Continued)

the local storage device; and when configurations of the plurality of computers are changed, each computer changes the group information on the basis of the changed configurations.

14 Claims, 41 Drawing Sheets

(58) Field of Classification Search
USPC ......... 714/776; 711/162, 156, 154, 173, 114
See application file for complete search history.

(56) References Cited

U.S. PATENT DOCUMENTS

| | | | | |
|---|---|---|---|---|
| 10,185,624 B2* | 1/2019 | Akutsu | ................. | G06F 3/0619 |
| 10,282,136 B1* | 5/2019 | Ito | ......................... | G06F 3/0659 |
| 2012/0042138 A1* | 2/2012 | Eguchi | .................... | G06F 3/061 |
| | | | | 711/154 |
| 2015/0324145 A1* | 11/2015 | Akutsu | ................. | G06F 3/0617 |
| | | | | 711/114 |
| 2015/0355864 A1* | 12/2015 | Nishina | ................. | G06F 3/0608 |
| | | | | 711/114 |
| 2015/0363422 A1* | 12/2015 | Shibayama | ........... | G06F 3/0605 |
| | | | | 707/827 |
| 2016/0371145 A1* | 12/2016 | Akutsu | ................. | G06F 3/0619 |
| 2018/0011764 A1* | 1/2018 | Akutsu | ................. | G06F 3/0619 |
| 2018/0246663 A1* | 8/2018 | Yamamoto | ............ | G06F 3/0631 |
| 2018/0357127 A1* | 12/2018 | Akutsu | ................. | G06F 3/0619 |

OTHER PUBLICATIONS

International Search Report for WO 2017/145223, dated Apr. 5, 2016.

* cited by examiner

[Fig. 1]
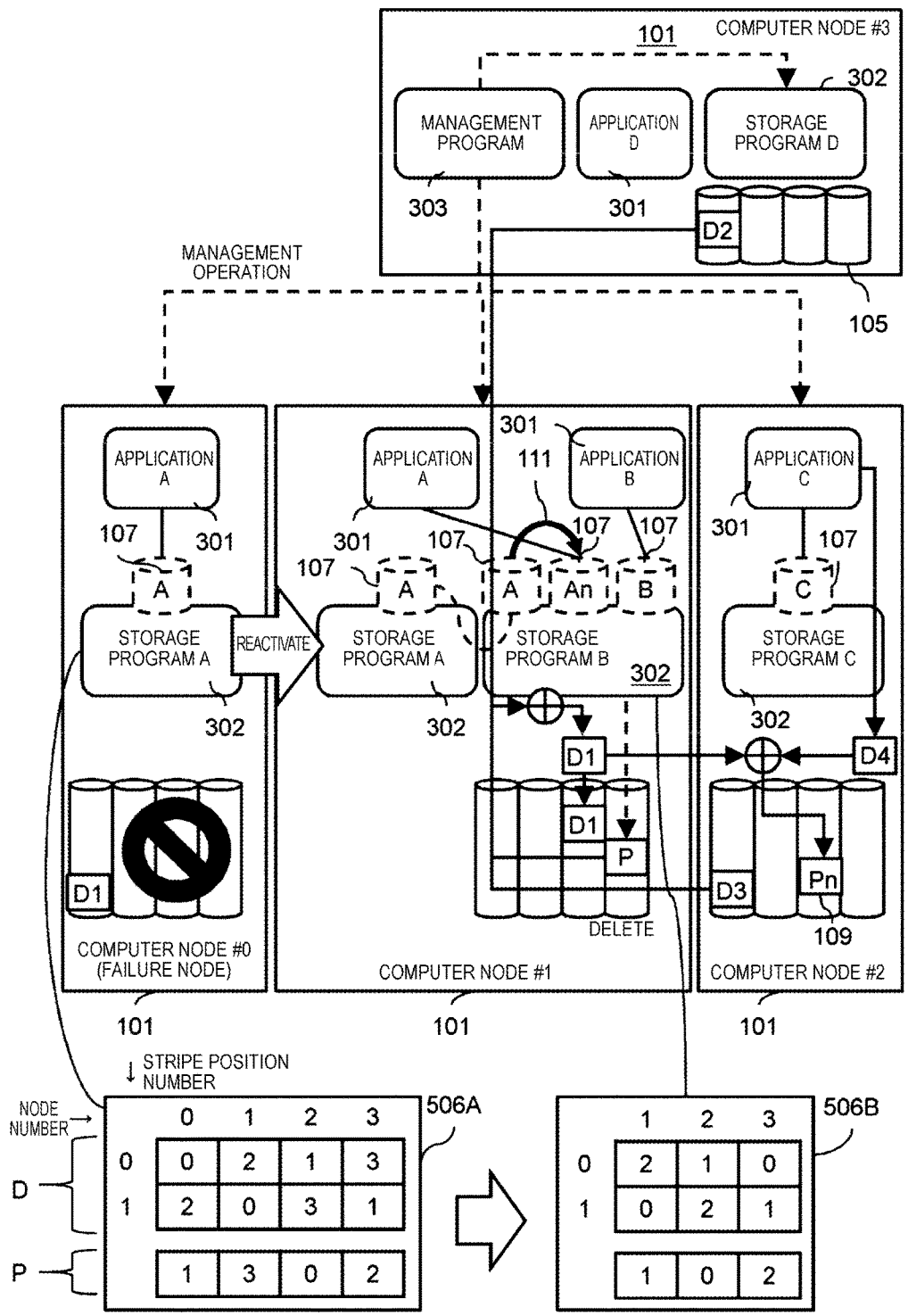

[Fig. 2]
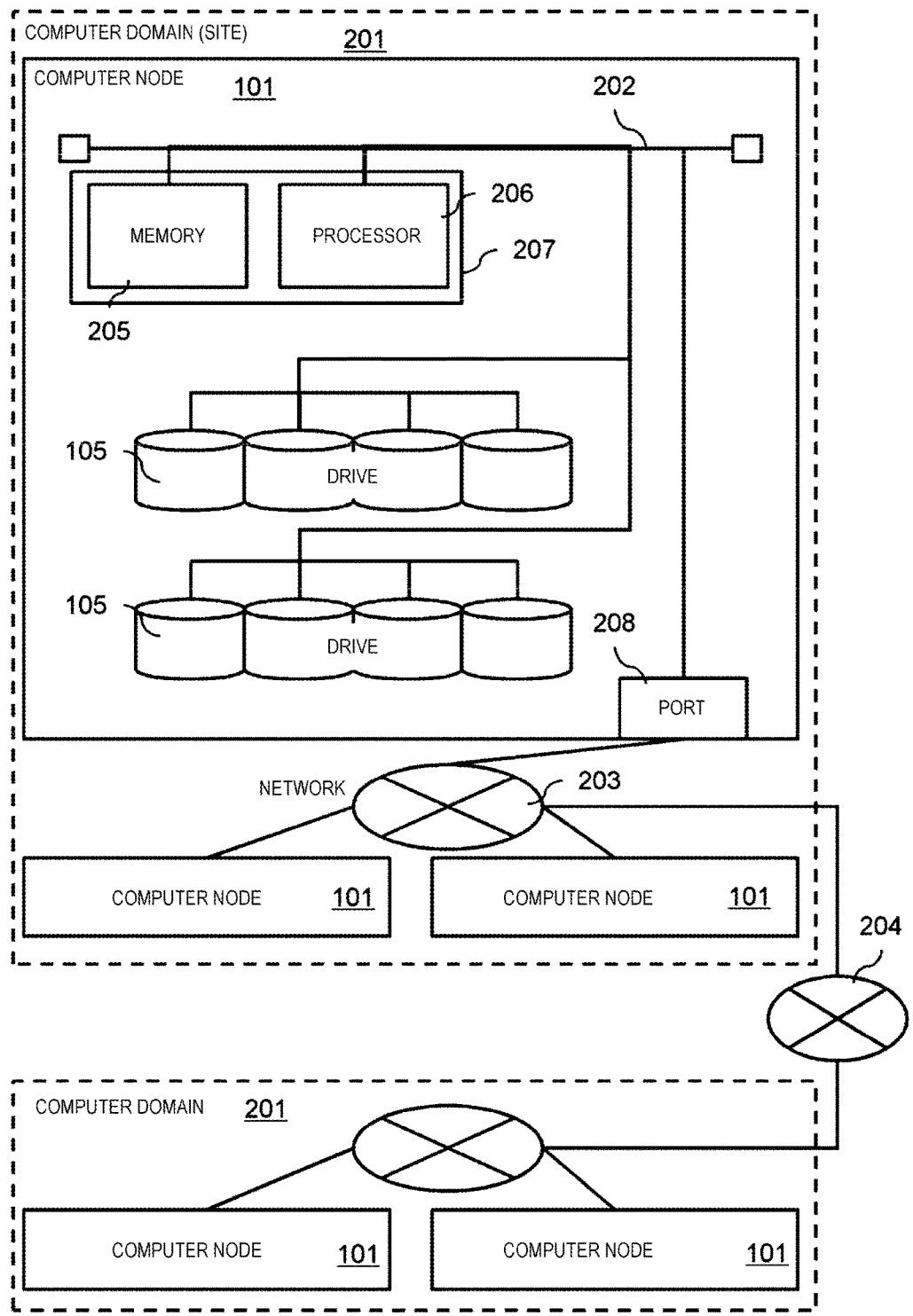

[Fig. 3]
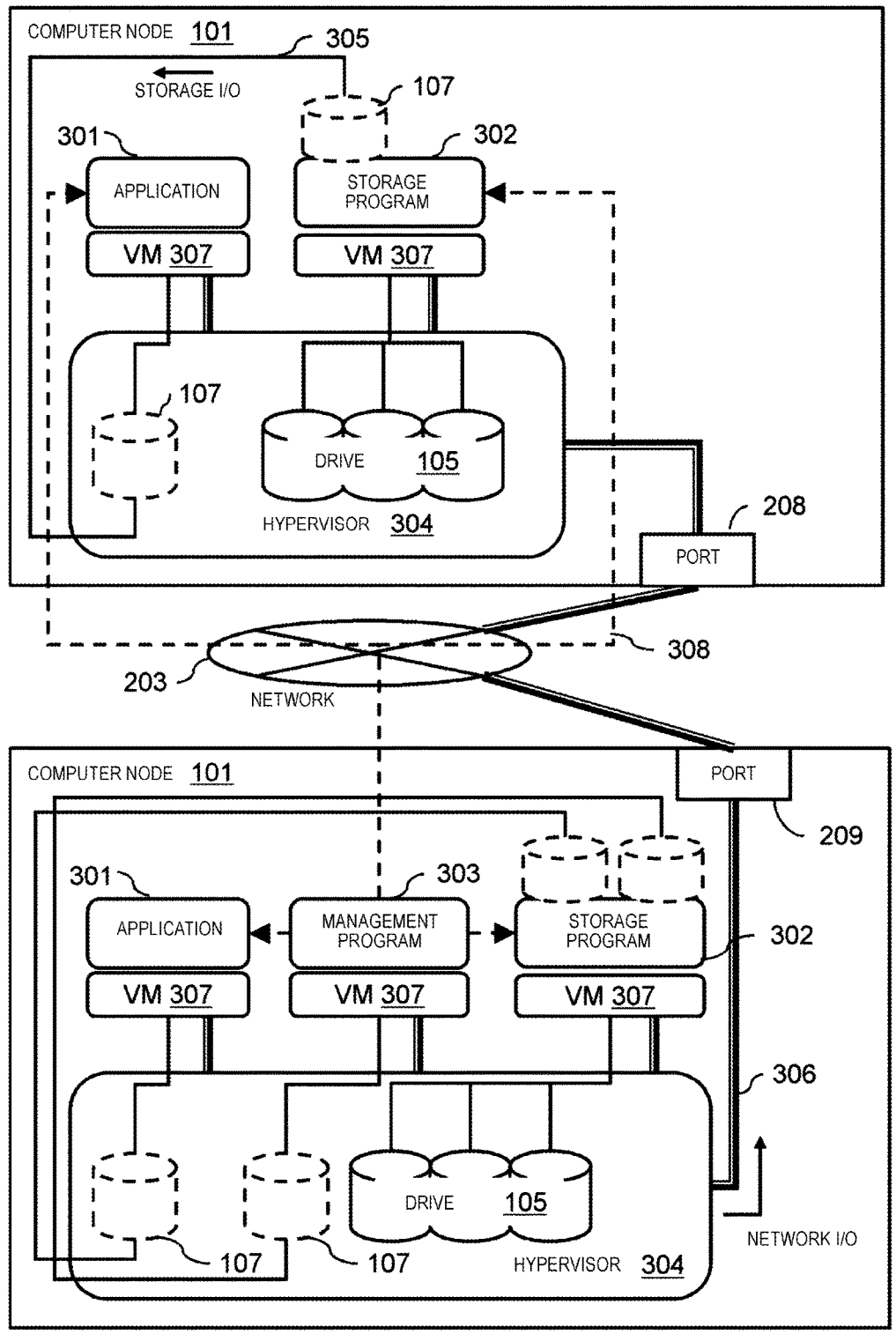

[Fig. 4]
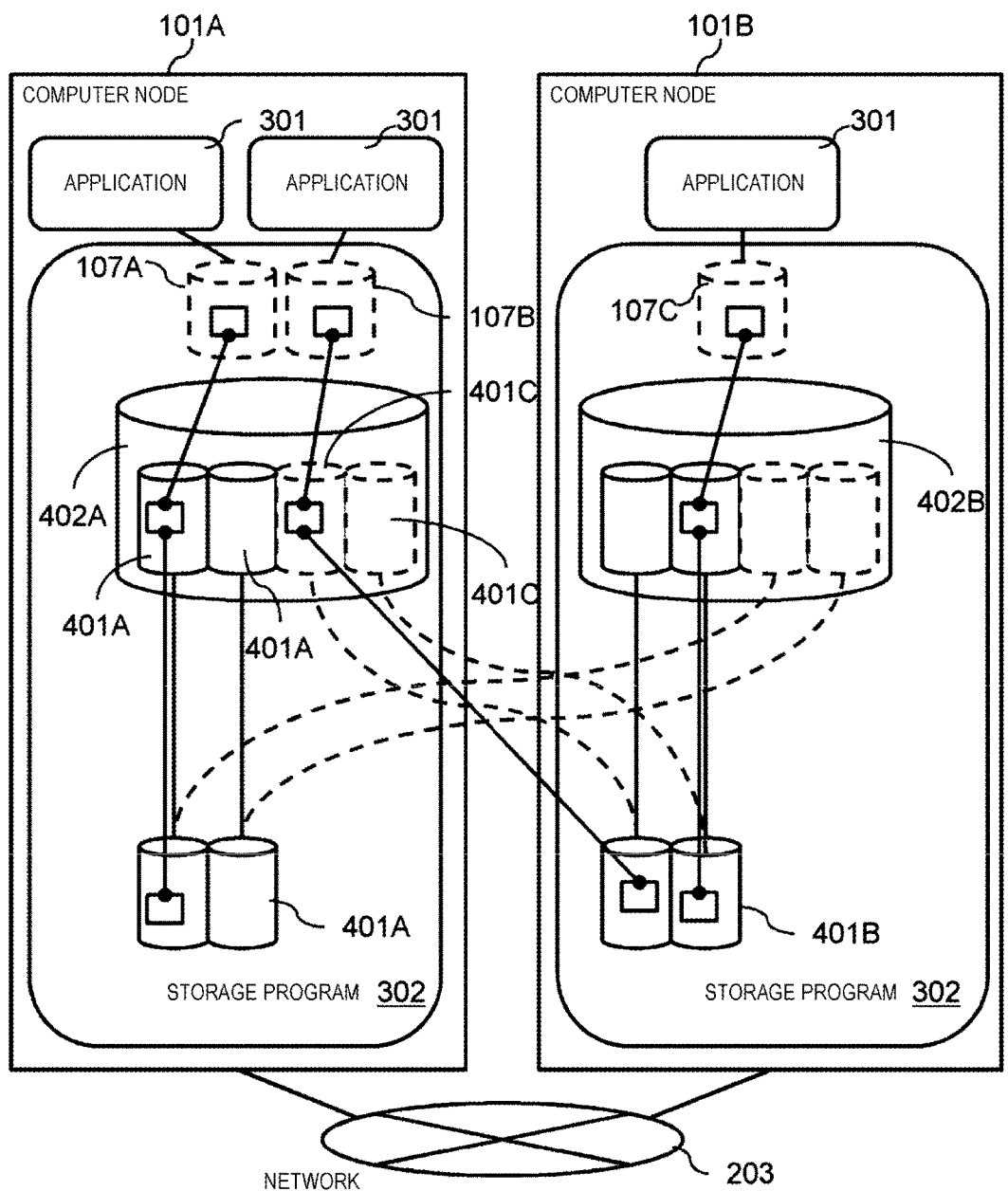

[Fig. 5]
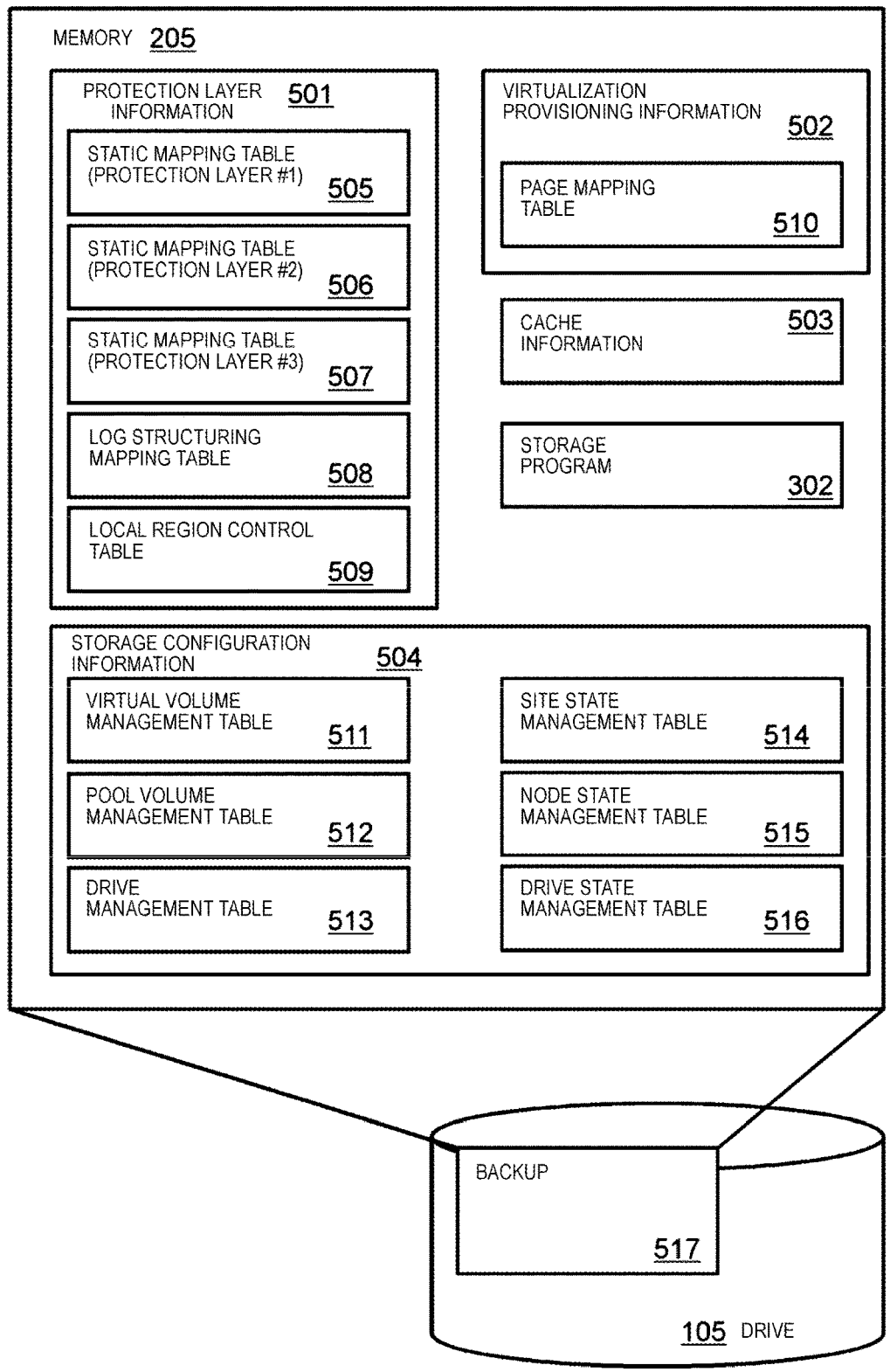

[Fig. 6]

STATIC MAPPING TABLE (LAYER #2)     506 c=4, d=4, p=2

↓ STRIPE POSITION NUMBER
NODE NUMBER →

601 — D

| Node\Pos | 0 | 1 | 2 | 3 | 4 | 5 | 6 | 7 |
|---|---|---|---|---|---|---|---|---|
| 0 | 5 | 0 | 0 | 0 | 7 | 5 | 4 | 0 |
| 1 | 6 | 2 | 2 | 5 | 3 | 7 | 6 | 3 |
| 2 | 4 | 6 | 7 | 4 | 1 | 6 | 5 | 4 |
| 3 | 1 | 7 | 3 | 1 | 2 | 5 | 3 | 1 |

602 — P

|   | 0 | 1 | 2 | 3 | 4 | 5 | 6 | 7 |
|---|---|---|---|---|---|---|---|---|
|   | 0 | 3 | 6 | 2 | 4 | 0 | 7 | 2 |
|   | 3 | 4 | 5 | 7 | 5 | 1 | 1 | 6 |

↓

STRIPE TYPE TABLE (LAYER #2)     506s

| NODE STRIPE TYPE # | DATA NODE # | REDUNDANT CODE (1) NODE # | REDUNDANT CODE (2) NODE # |
|---|---|---|---|
| 0x0000 | 0x01, 0x02, 0x03, 0x07 | 0x00 | 0x05 |
| 0x0001 | 0x00, 0x03, 0x04, 0x07 | 0x05 | 0x06 |
| 0x0002 | 0x01, 0x02, 0x04, 0x05 | 0x03 | 0x07 |
| ... | ... | ... | ... |
| 0x0007 | 0x01, 0x02, 0x04, 0x05 | 0x03 | 0x06 |

[Fig. 7]

| LOG STRUCTURING MAPPING TABLE | 508 | | | | |
|---|---|---|---|---|---|
| DATA MAPPING TABLE | | | | | 701 |

| USER DATA | | PHYSICAL | | LENGTH | STATE |
|---|---|---|---|---|---|
| LOGICAL | | | | | |
| DRIVE# | LBA | DRIVE# | LBA | | |
| 0x0000 | 0x0000 | 0x0010 | 0x0800 | 512 | |
| | 0x0200 | 0x0000 | 0x0600 | 512 | |
| | ... | ... | ... | ... | |
| 0x0001 | 0x0000 | 0x0001 | 0x0000 | 512 | |
| | ... | ... | ... | ... | |

| REDUNDANT CODE MAPPING TABLE | | | | | | 702 |
|---|---|---|---|---|---|---|
| USER DATA | | | | REDUNDANT CODE | | |
| SITE # | NODE # | LOGICAL | | PHYSICAL | | LENGTH |
| | | DRIVE# | LBA | DRIVE# | LBA | |
| 0 | 2 | 0x0000 | 0x0000 | 0x0003 | 0x2000 | 512 |
| | | | 0x1000 | 0x0004 | 0x1300 | 512 |
| | | | ... | ... | ... | ... |
| | | 0x0001 | 0x0000 | 0x0001 | 0x3200 | 512 |
| | | | ... | ... | ... | ... |

| INVERSE MAPPING TABLE | | | | | | | 703 |
|---|---|---|---|---|---|---|---|
| REDUNDANT CODE | | USER DATA | | | | | |
| PHYSICAL | | SITE# | NODE# | PHYSICAL | | LENGTH | FLG |
| DRIVE# | LBA | | | DRIVE# | LBA | | |
| 0x0000 | 0x0000 | 0 | 1 | 0x0000 | 0x2000 | 512 | |
| | | 0 | 2 | 0x0001 | 0x1300 | 512 | |
| | | 0 | 3 | 0x0004 | 0x0000 | 512 | |
| | | 0 | 7 | 0x0010 | 0x0400 | 512 | |
| | 0x0200 | ... | ... | ... | ... | ... | |

[Fig. 8]
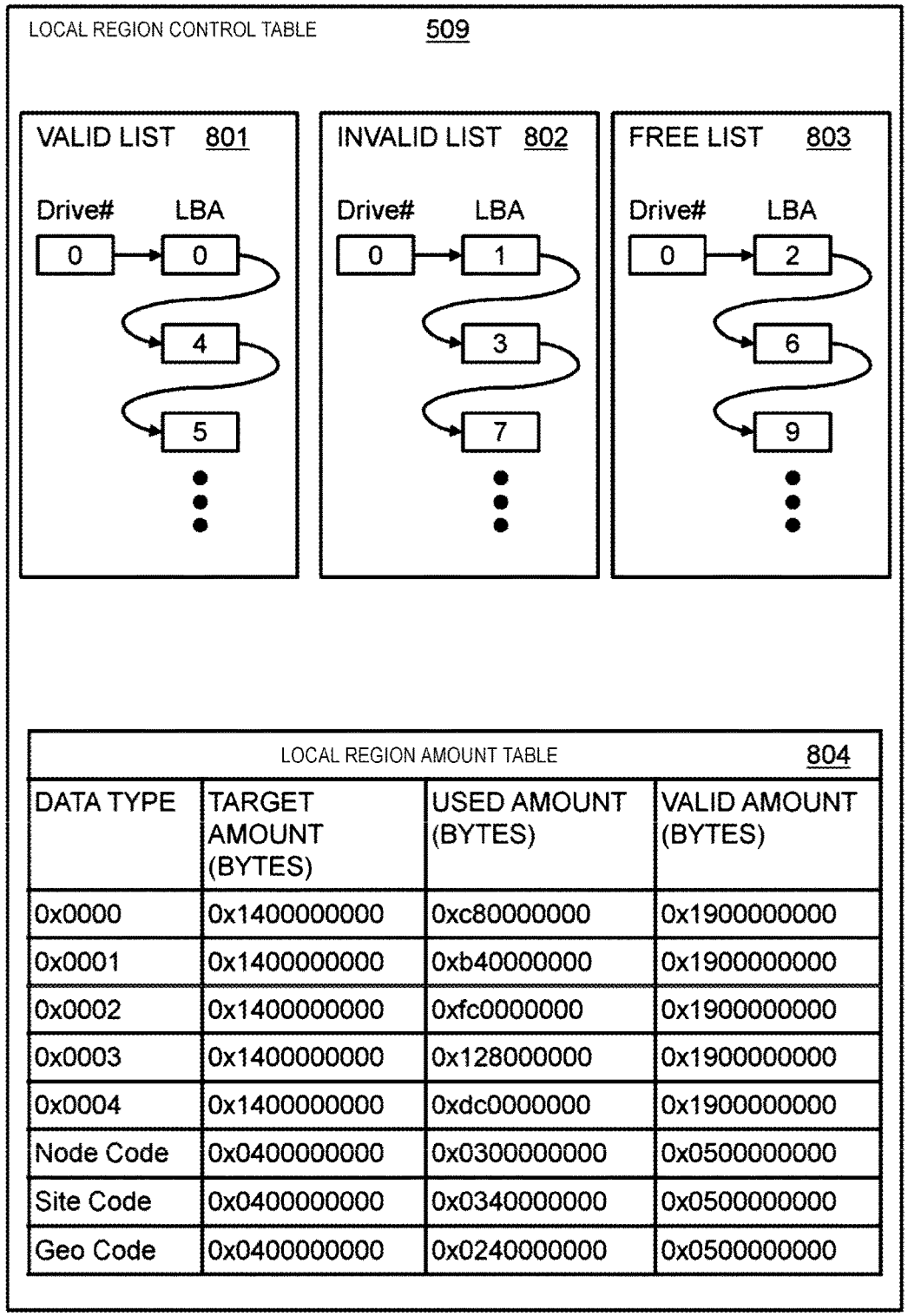

[Fig. 9]

VIRTUALIZATION PROVISIONING INFORMATION 502

| PAGE MAPPING TABLE | | | | 510 |
|---|---|---|---|---|
| VIRTUAL VOLUME# | LBA | RANGE | POOL VOLUME# | LBA |
| 0x0000 | 0x0000 | | | |
| | | | | |
| | | | | |
| 0x0001 | | | | |
| | | | | |

[Fig. 10]

| STORAGE CONFIGURATION INFORMATION | 504 | | |
|---|---|---|---|

| VIRTUAL VOLUME MANAGEMENT TABLE | | | 511 |
|---|---|---|---|
| VIRTUAL VOLUME# | SIZE (BLOCK) | USE NODE# | SYNC/ ASYNC |
| 0x0100 | 0x21210000 | 0x00, 0x01, 0x02 | GEO : ASYNC<br>SITE : SYNC<br>NODE : SYNC |
| 0x0101 | 0x12301200 | 0x00 | |
| 0x1100 | 0x42123000 | 0x00, 0x01, 0x02 | |
| 0x2100 | 0x12124120 | 0x00, 0x02 | |
| 0x3100 | 0x12181230 | 0x00, 0x03, 0x04 | |

| POOL VOLUME MANAGEMENT TABLE | | 512 |
|---|---|---|
| POOL VOLUME# | SIZE (BLOCK) | NODE# |
| 0x0000 | 0x21210000 | 0x00 |
| 0x0001 | 0x12301200 | 0x00 |
| 0x1000 | 0x42123000 | 0x01 |
| 0x2000 | 0x12124120 | 0x02 |
| 0x3000 | 0x12181230 | 0x03 |

| DRIVE MANAGEMENT TABLE | | | 513 |
|---|---|---|---|
| POOL VOLUME# | TYPE | DRIVE# | SIZE (BLOCK) |
| 0x0000 | SSD | 0x40 | 0x20000000 |
| | | 0x41 | 0x20000000 |
| | | 0x42 | 0x20000000 |
| 0x0001 | NL-SAS (7.2Krpm) | 0x20 | 0xE0000000 |
| | | 0x21 | 0xE0000000 |
| | | 0x22 | 0xE0000000 |

[Fig. 11]

STORAGE CONFIGURATION INFORMATION 504

DRIVE STATE MANAGEMENT TABLE 514

| DRIVE # | STATE | ERROR COUNT | REDUNDANT CODE CHANGE POINTER |
|---|---|---|---|
| 0x40 | NORMAL | 0 | INVALID STATUS |
| 0x41 | CONFIG CHANGING | 0 | 0x00030200 |
| 0x42 | FAILURE | 50 | 0x00000000 |
| 0x20 | NORMAL | 0 | INVALID STATUS |
| 0x21 | WARNING | 4 | INVALID STATUS |
| 0x22 | REBUILDING | 0 | 0x00002400 |

NODE STATE MANAGEMENT TABLE 515

| NODE# | STATE | ERROR COUNT |
|---|---|---|
| 0x00 | NORMAL | 0 |
| 0x01 | NORMAL | 0 |
| 0x02 | FAILURE | 10 |

SITE STATE MANAGEMENT TABLE 516

| SITE# | STATE | ERROR COUNT |
|---|---|---|
| 0x00 | NORMAL | 0 |
| 0x01 | NORMAL | 0 |
| 0x02 | FAILURE | 200 |

[Fig. 12]
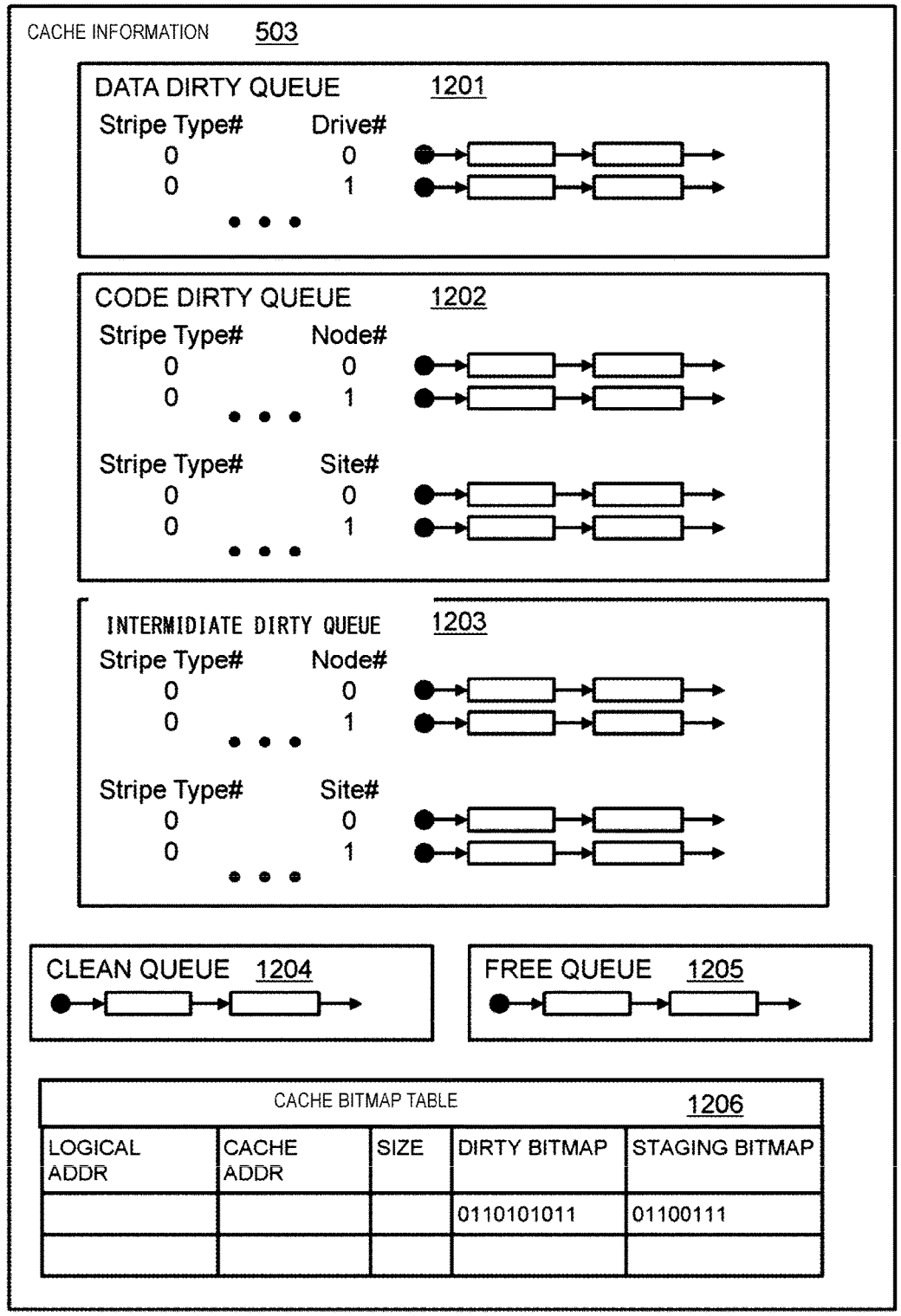

[Fig. 13]
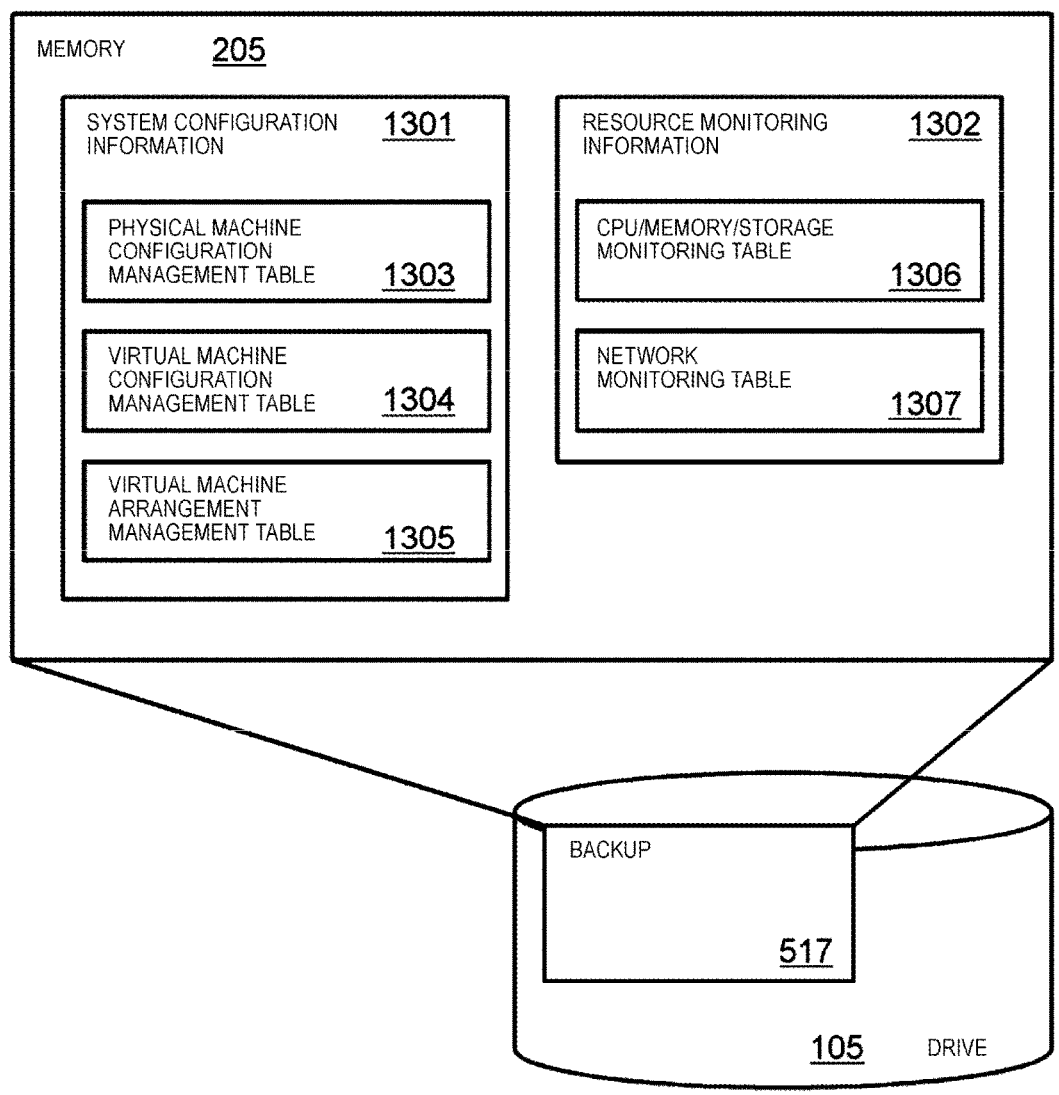

[Fig. 14]

SYSTEM CONFIGURATION INFORMATION 1301

PHYSICAL MACHINE CONFIGURATION MANAGEMENT TABLE 1303

| PHYSICAL MACHINE# | MAX RESOURCE | | | | STATUS |
| --- | --- | --- | --- | --- | --- |
| | CPU [core] | MEMORY [GB] | NETWORK [Mbps] | STORAGE [GB] | |
| 0x00 | 80 | 48 | 1000 | 1000 | NORMAL |
| 0x01 | 80 | 48 | 1000 | 1000 | REQ_ADD |
| 0x02 | 160 | 96 | 10000 | 2400 | WARNING |
| ... | ... | ... | ... | ... | ... |

VIRTUAL MACHINE CONFIGURATION MANAGEMENT TABLE 1304

| VIRTUAL MACHINE# | MAX RESOURCE | | | | STATUS |
| --- | --- | --- | --- | --- | --- |
| | CPU [core] | MEMORY [GB] | NETWORK [Mbps] | STORAGE [GB] | |
| 0x00 | 24 | 24 | 600 | 200 | NORMAL |
| 0x01 | 24 | 12 | 500 | 350 | NORMAL |
| 0x02 | 40 | 12 | 1200 | 800 | WARNING |
| ... | ... | ... | ... | ... | ... |

VIRTUAL MACHINE ARRANGEMENT MANAGEMENT TABLE 1305

| VIRTUAL MACHINE# | PHYSICAL MACHINE# |
| --- | --- |
| 0x00 | 0x00 |
| 0x01 | 0x00 |
| 0x02 | 0x02 |
| ... | ... |

[Fig. 15]

RESOURCE MONITORING INFORMATION 1302

CPU/MEMORY/STORAGE MONITORING TABLE 1306

| VIRTUAL MACHINE# | USE RESOURCE | | |
|---|---|---|---|
| | CPU [core] | MEMORY [GB] | STORAGE [GB] |
| 0x00 | 24 | 24 | 40 |
| 0x01 | 24 | 12 | 280 |
| 0x02 | 40 | 12 | 400 |
| ... | ... | ... | ... |

NETWORK MONITORING TABLE 1307

| SOURCE VIRTUAL MACHINE# | TARGET VIRTUAL MACHINE# | | | |
|---|---|---|---|---|
| | 0x00 | 0x01 | 0x02 | ... |
| 0x00 | 0 | 100 | 200 | ... |
| 0x01 | 120 | 0 | 50 | ... |
| 0x02 | 300 | 250 | 0 | ... |
| ... | ... | ... | ... | ... |

[Fig. 16]
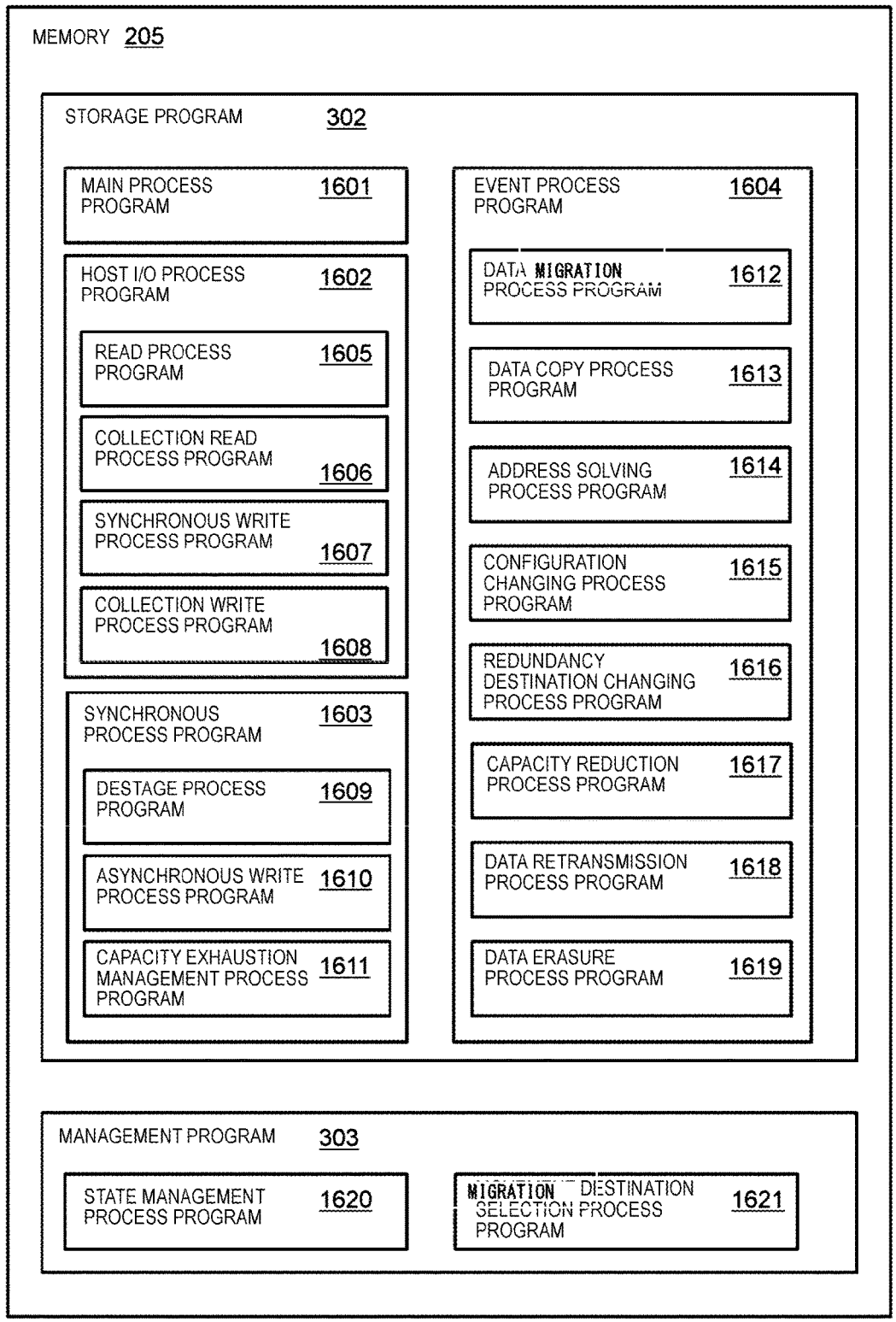

[Fig. 17]

TEMPORARY ARRANGEMENT PATTERN TABLE ⌒ 3000

|  | PHYSICAL MACHINE ID | VIRTUAL MACHINE ID |
|---|---|---|
| ARRANGEMENT PATTERN | 0x00 | 0x02, 0x03, 0x06 |
|  | 0x01 | 0x00, 0x01, 0x12 |
| NETWORK COMMUNICATION COST | 800 [Mbps] | |

[Fig. 18]
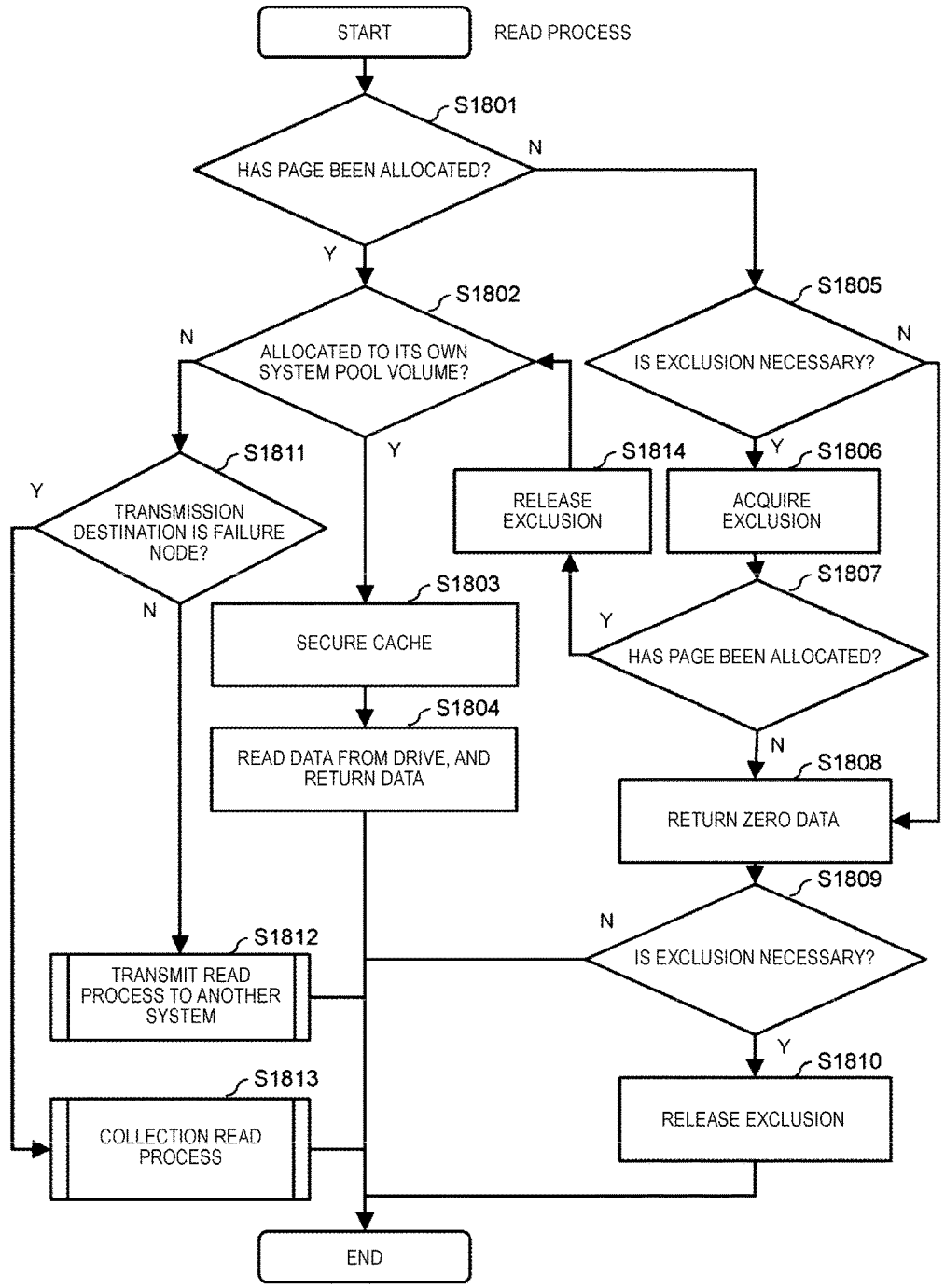

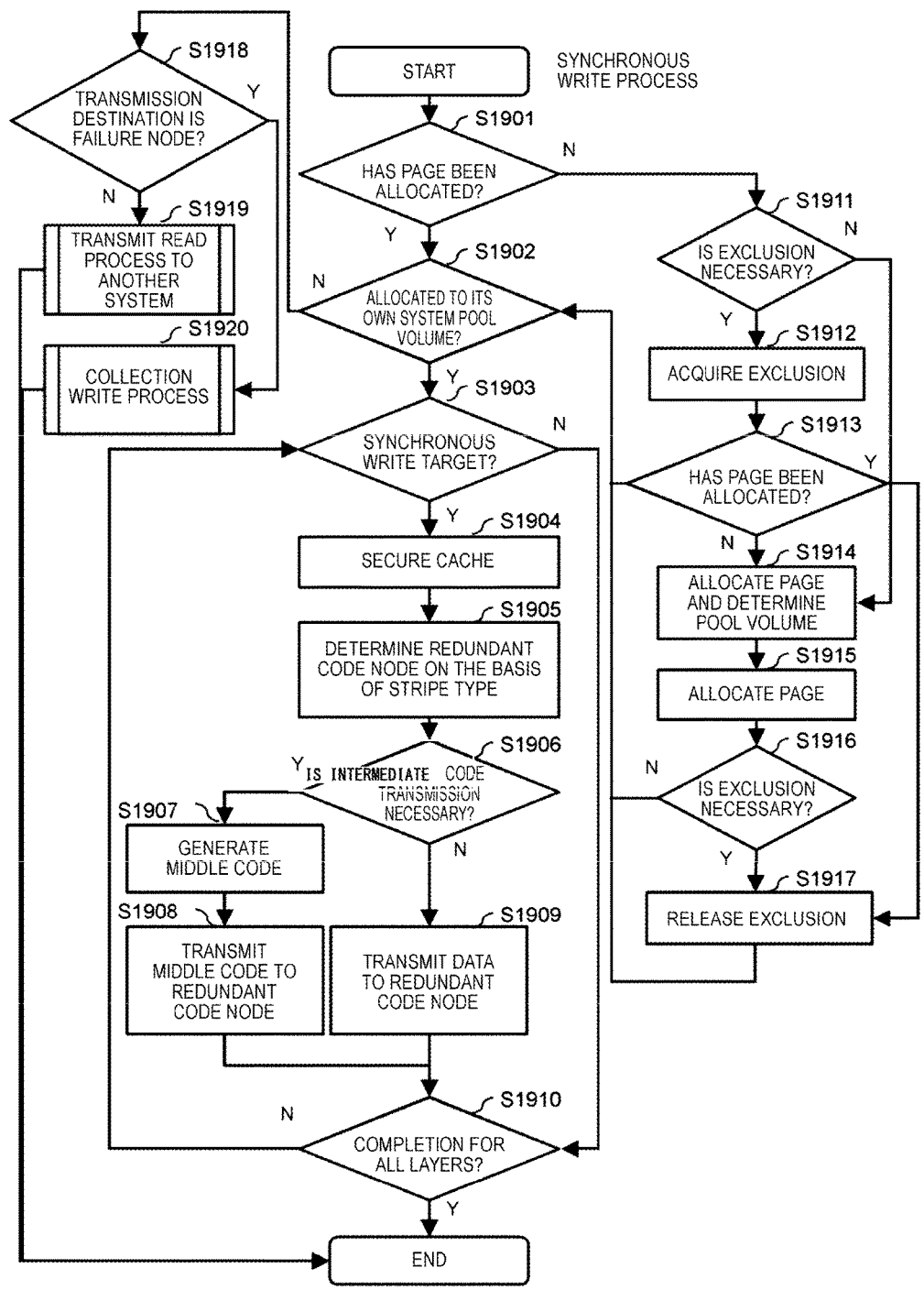

[Fig. 20]
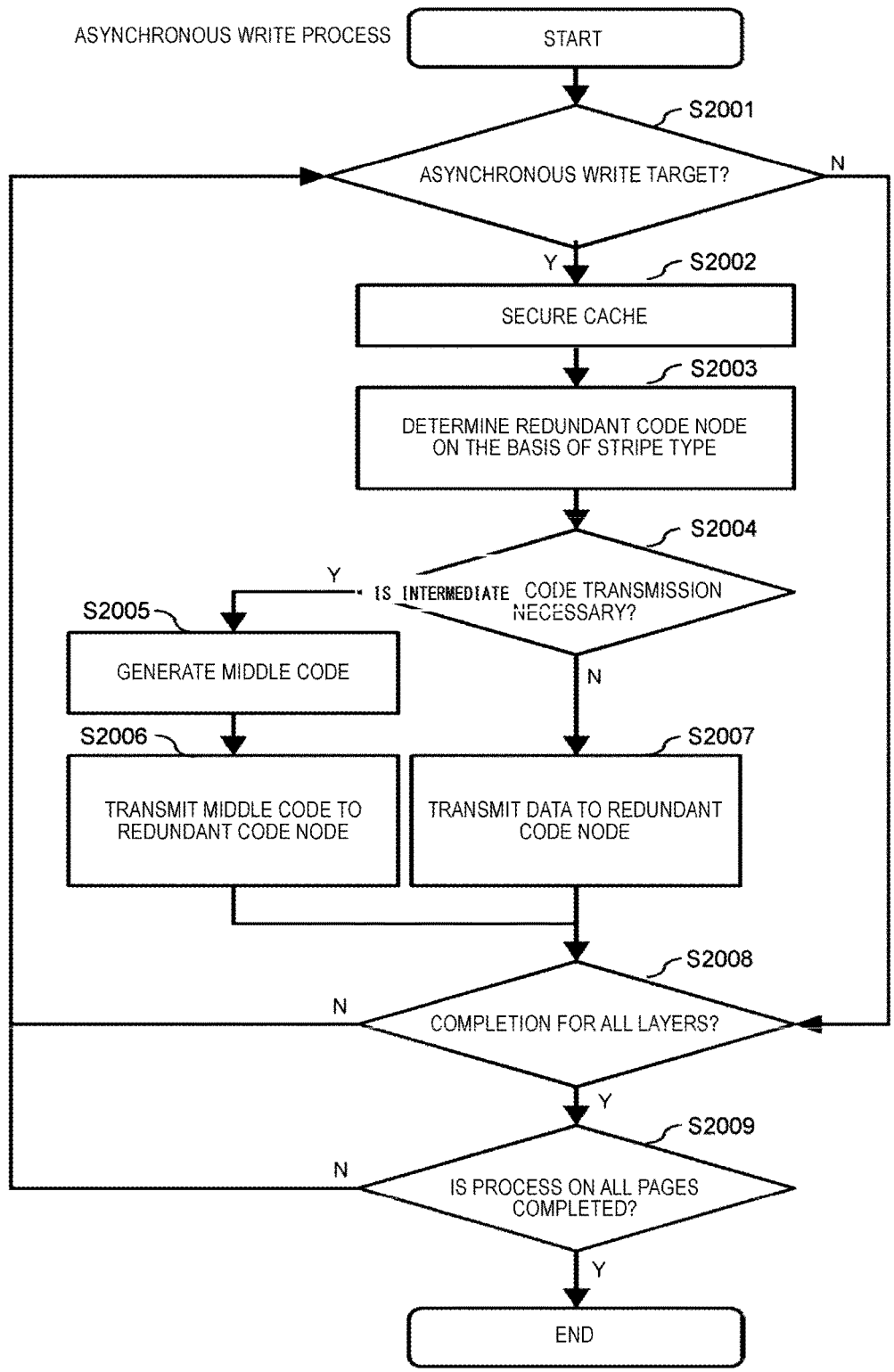

[Fig. 21]
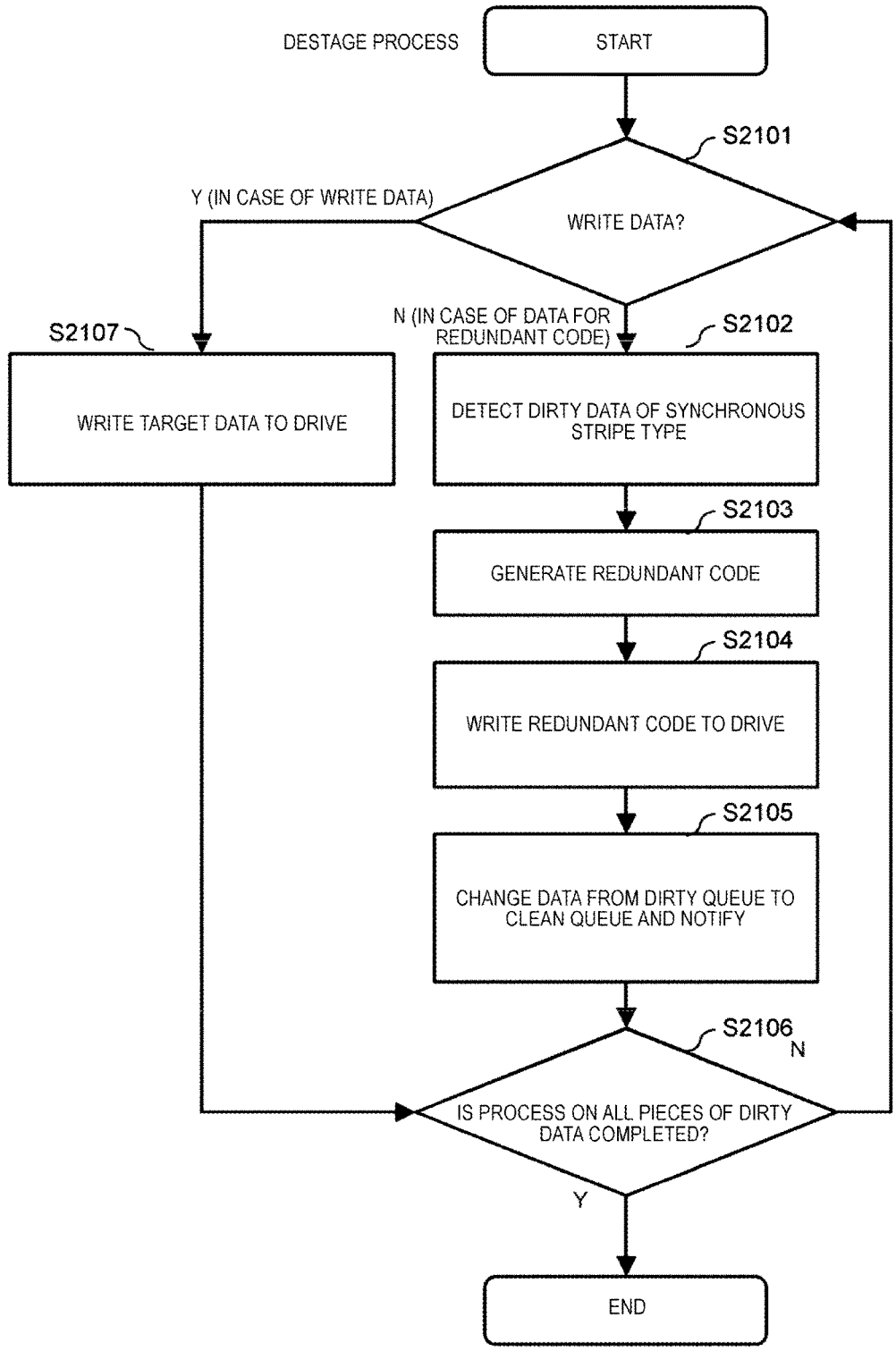

[Fig. 22]
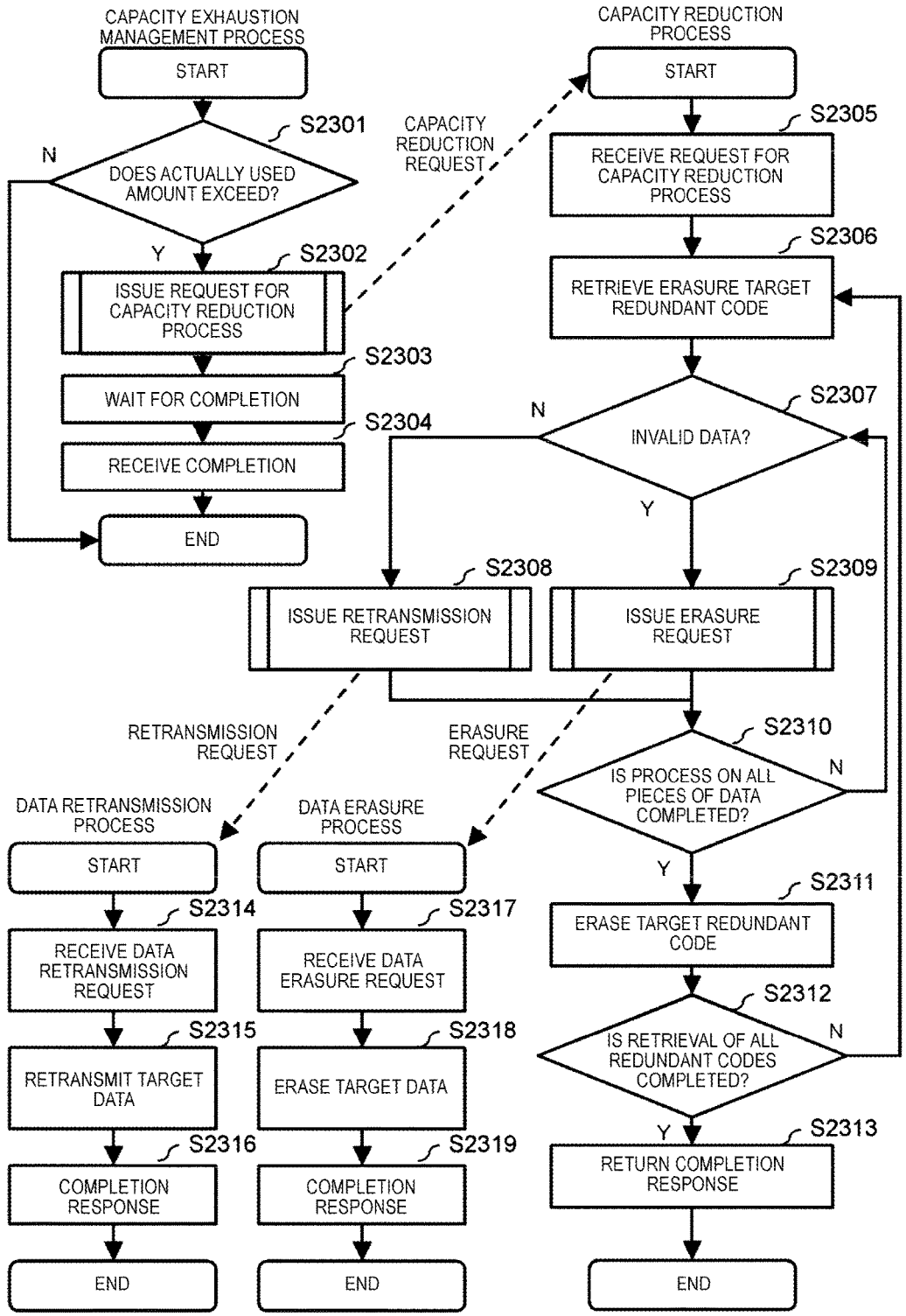

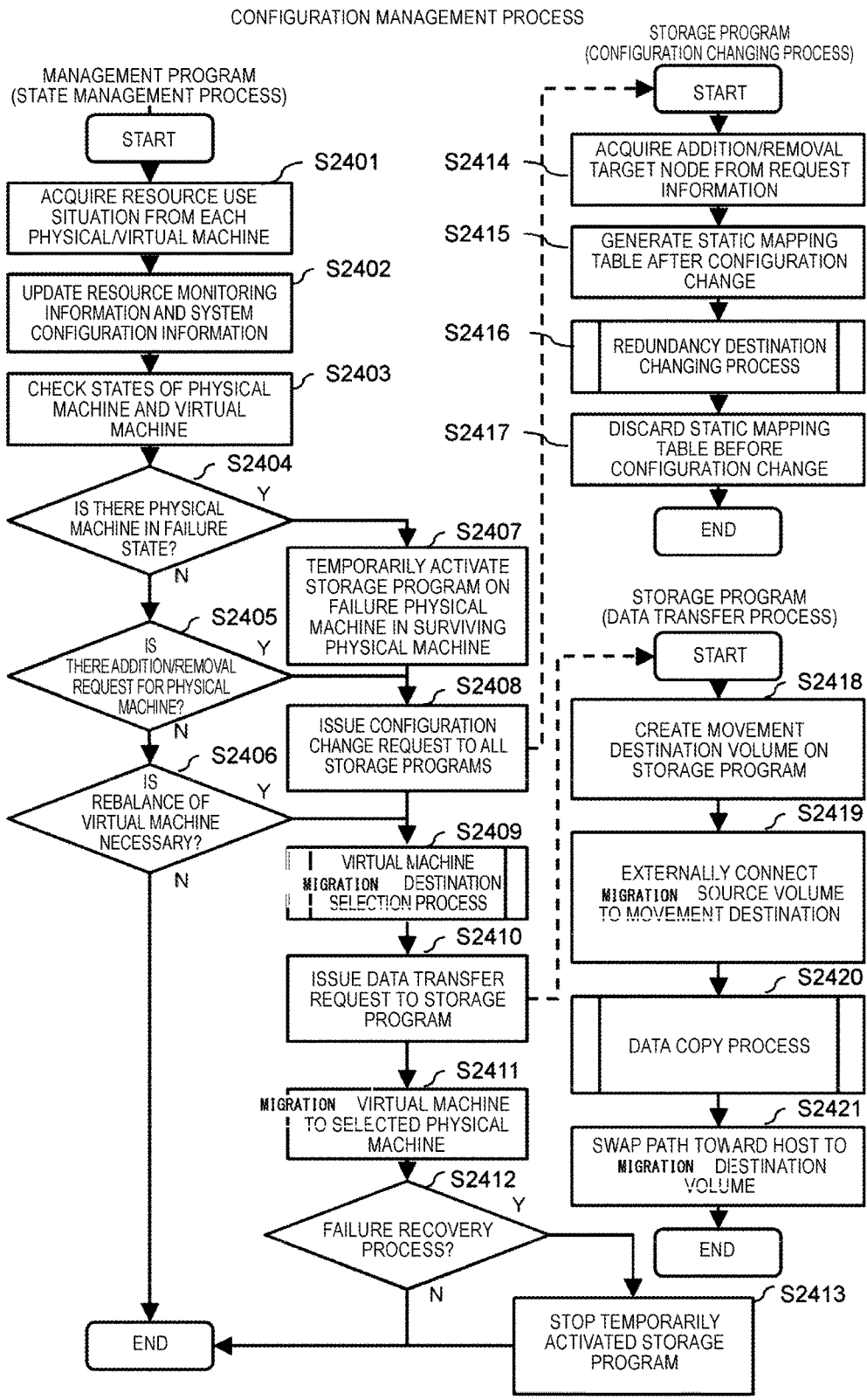
[Fig. 23]

[Fig. 24]
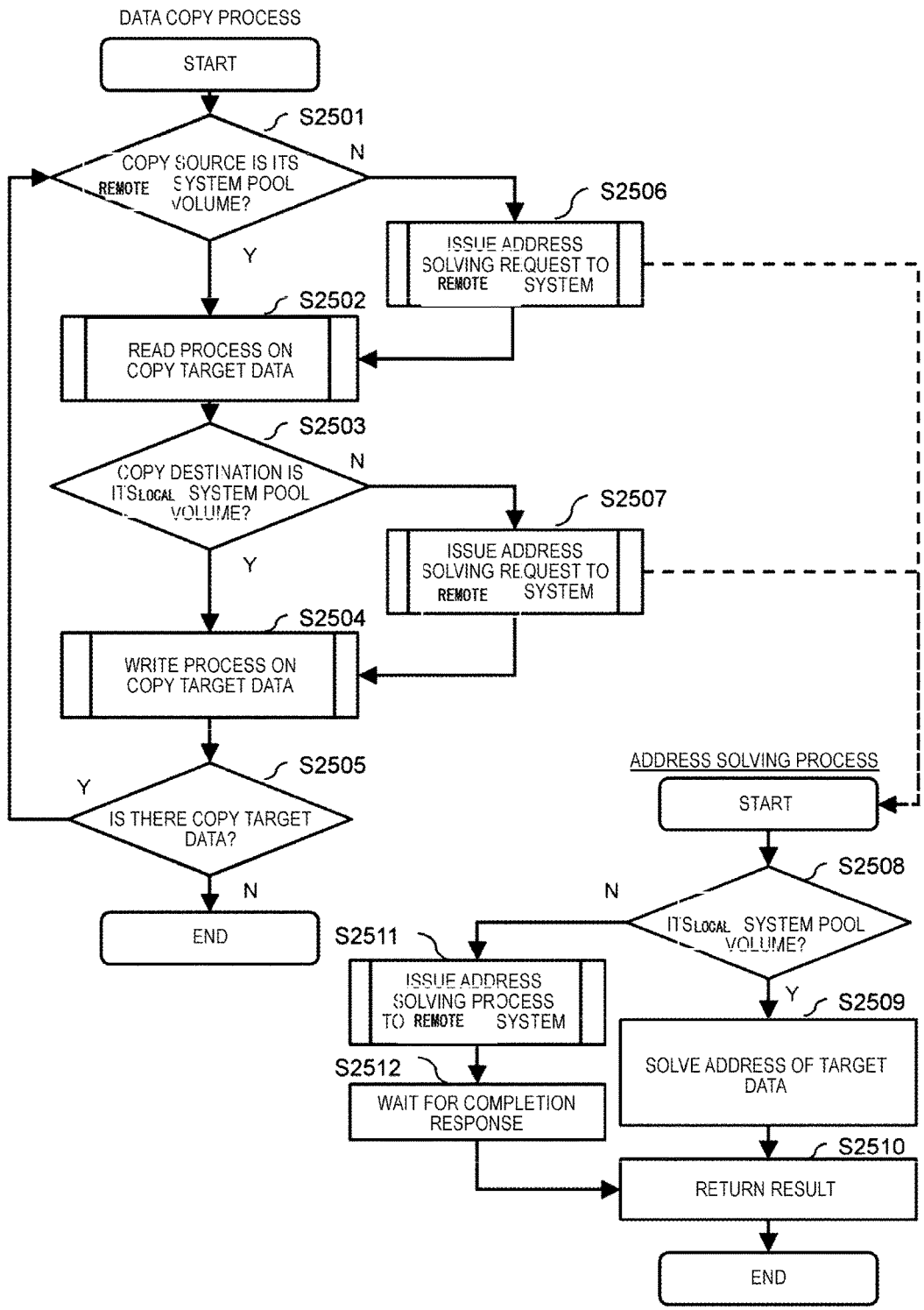

[Fig. 25]
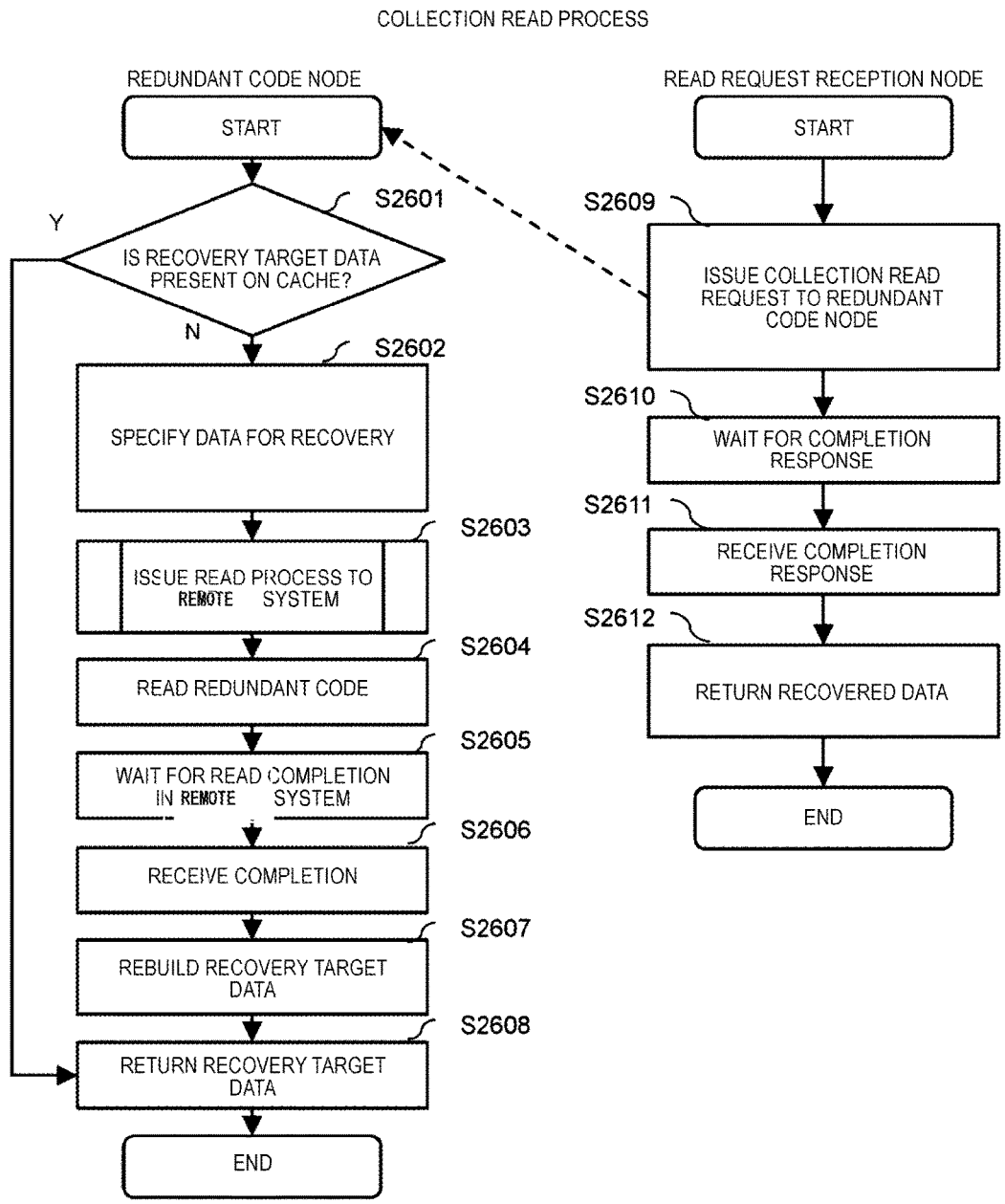

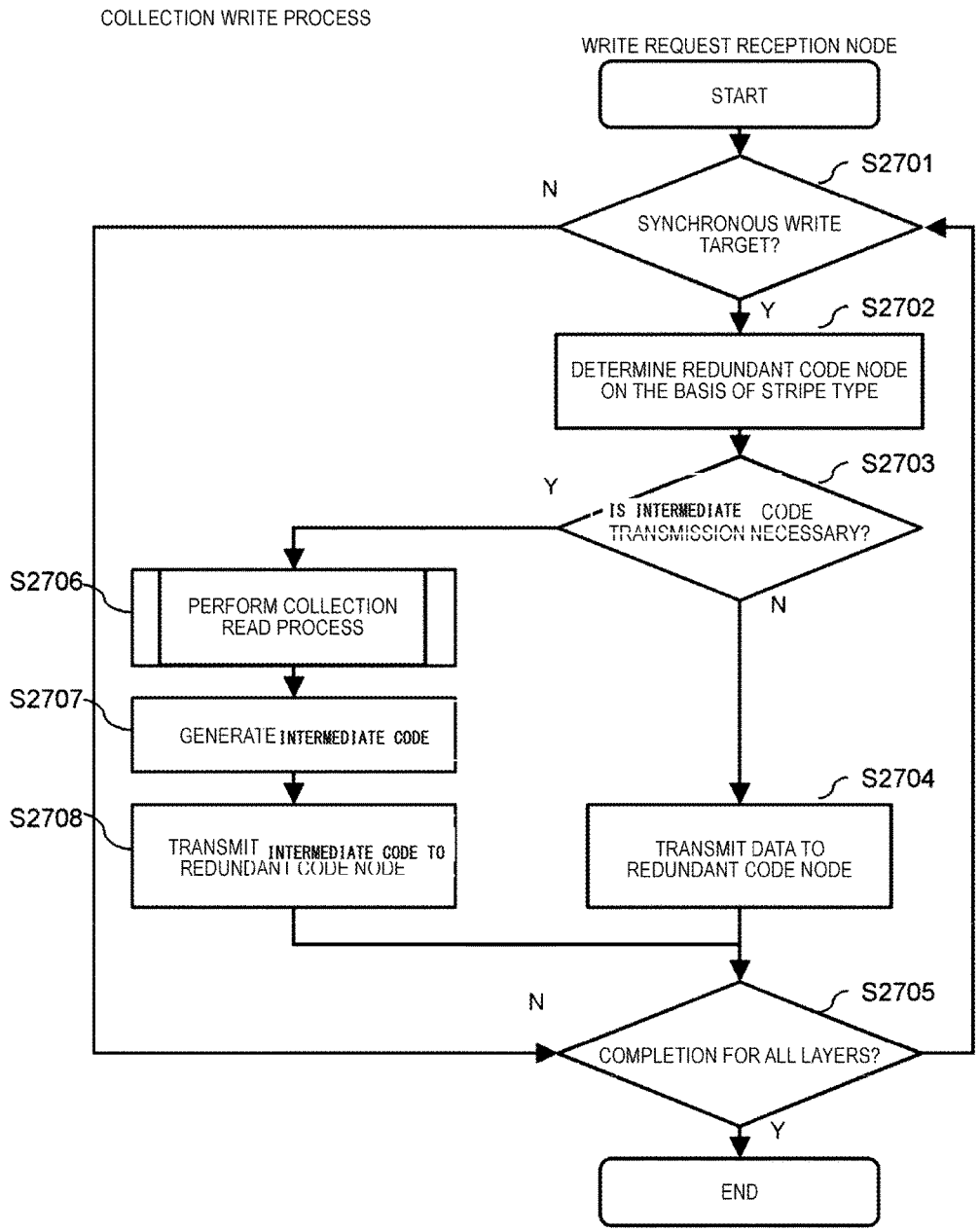

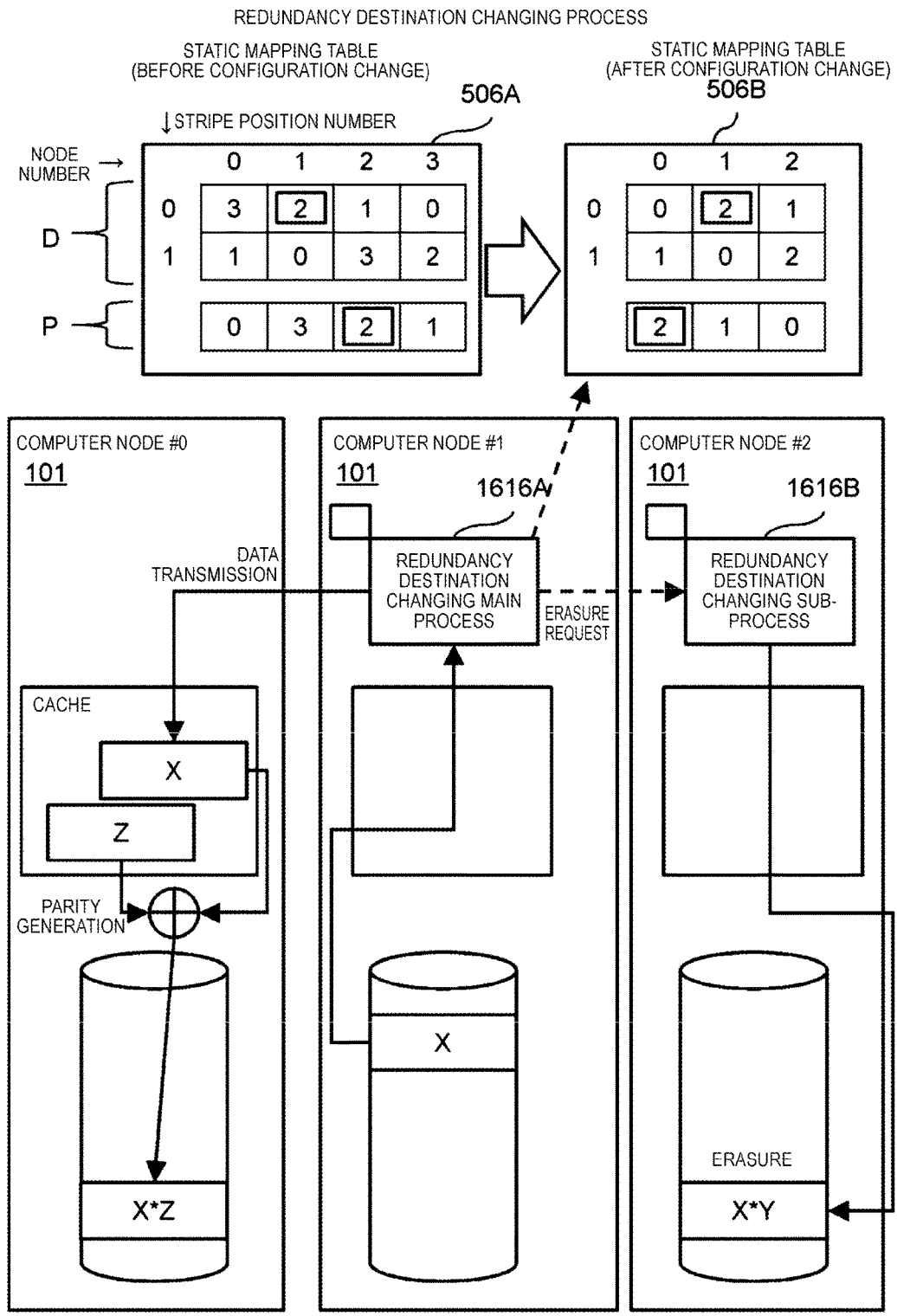

[Fig. 28]
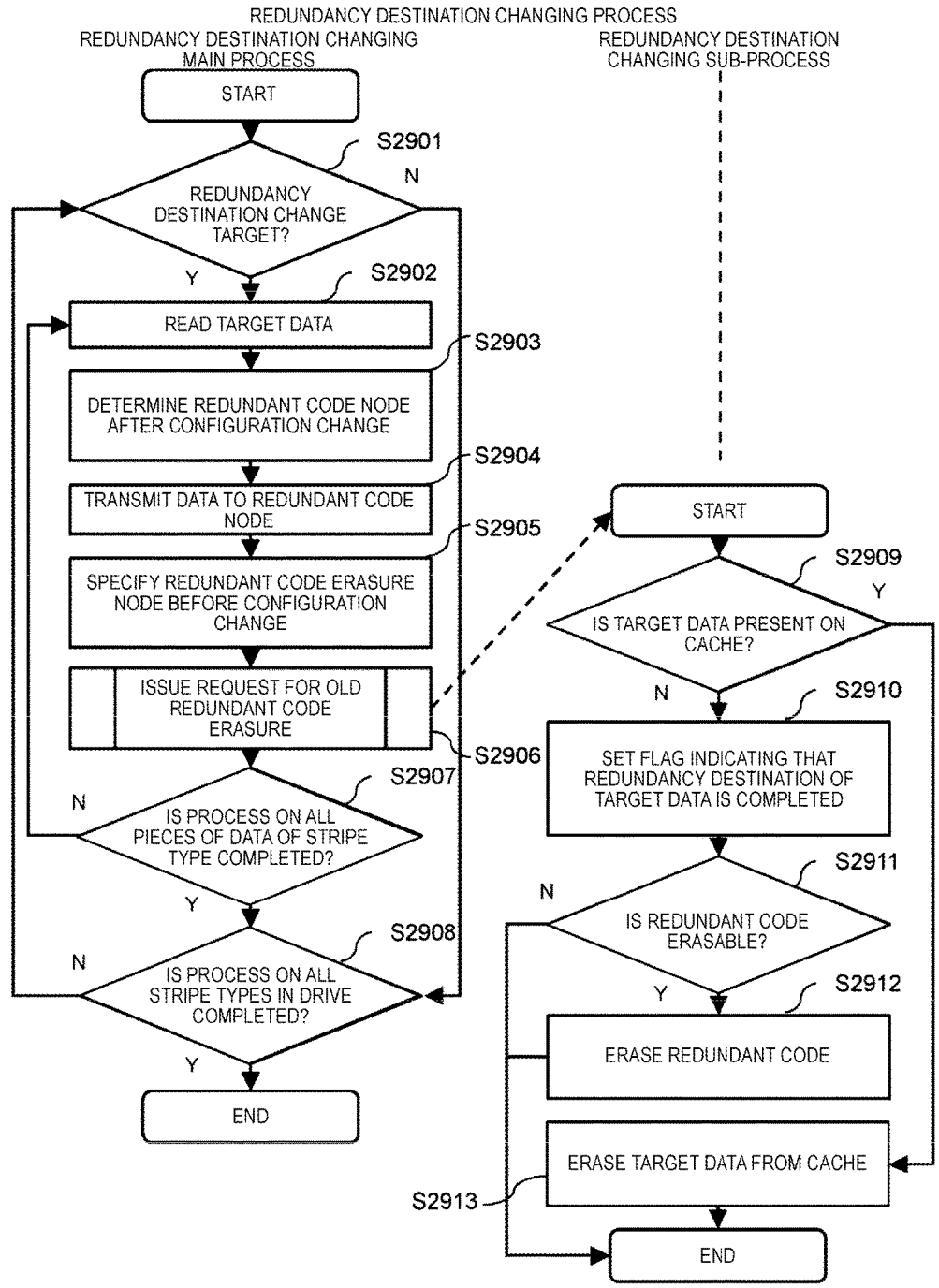

[Fig. 29]
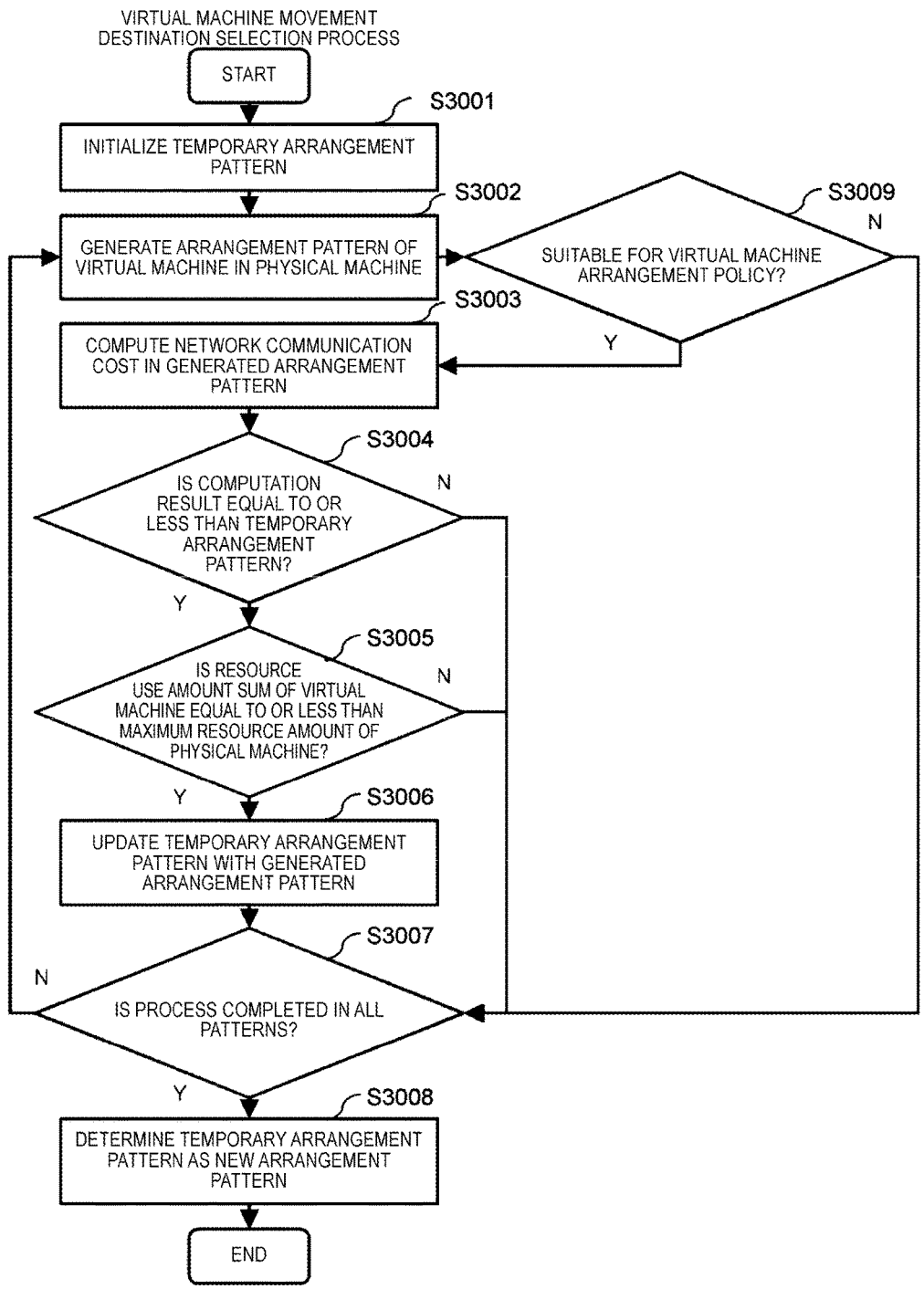

[Fig. 30]

NODE SETTING SCREEN — 3114

| MANAGEMENT I/F |

■ NODE INFORMATION — 3101

| NODE ID | NODE NAME | IP ADDRESS | STATE |
|---|---|---|---|
| 0x00 | SERV0 | 192.15.24.200 | RECOVERY PROGRESS [50%] |
| 0x01 | SERV1 | 172.24.16.203 | NORMAL |
| 0x03 | CLUSTER1 | 10.232.14.108 | NORMAL |
| 0x10 | CLUSTER2 | 10.232.14.112 | CONFIGURATION CHANGE PROGRESS [80%] |

■ NODE CONFIGURATION SETTING — 3102

| NODE NAME | ▼ | SERVERX | — 3103 |
| IP ADDRESS | ▼ | AUTO | — 3104 |
| SITE SETTING | ▼ | SITE A | — 3105 |
| GEO SETTING | ▼ | GEO C | — 3106 |

[ CHANGE ]  [ ADD ]  [ DELETE ]

■ DRIVE CONFIGURATION SETTING — 3107

| NODE NAME | ▼ | SERV0 | — 3108 |
| DRIVE NAME | ▼ | SSD00 | — 3109 |

[ ADD ]  [ DELETE ]

■ DATA PROTECTION SETTING — 3110

| LAYER NAME | ▼ | SITE | — 3111 |
| PROTECTION LAYER | ▼ | 4D2P | — 3112 |
| PROTECTION METHOD | ▼ | SYNCHRONOUS PROTECTION | — 3113 |

[ CHANGE ]  [ ADD ]  [ DELETE ]

[Fig. 31]

ARRANGEMENT POLICY SETTING SCREEN 　　　　　　　　　　　　　　　3201

MANAGEMENT I/F

■ ARRANGEMENT POLICY INFORMATION

3202

| POLICY ID | POLICY NAME | VIRTUAL MACHINE ID | POLICY TYPE |
|---|---|---|---|
| 0x00 | POLICY0 | 0x02, 0x04 | SAME NODE ARRANGEMENT |
| 0x01 | POLICY1 | 0x02, 0x06 | SEPARATE NODE ARRANGEMENT |
| 0x02 | POLICY3 | 0x00, 0x03 | SAME NODE ARRANGEMENT |

■ ARRANGEMENT POLICY SETTING　　3203

POLICY NAME ▼ POLICY0　　3204

POLICY TYPE ▼ SAME NODE ARRANGEMENT　　3205

VIRTUAL MACHINE NAME ▼ VM1　　3206

[ CHANGE ]　[ ADD ]　[ DELETE ]

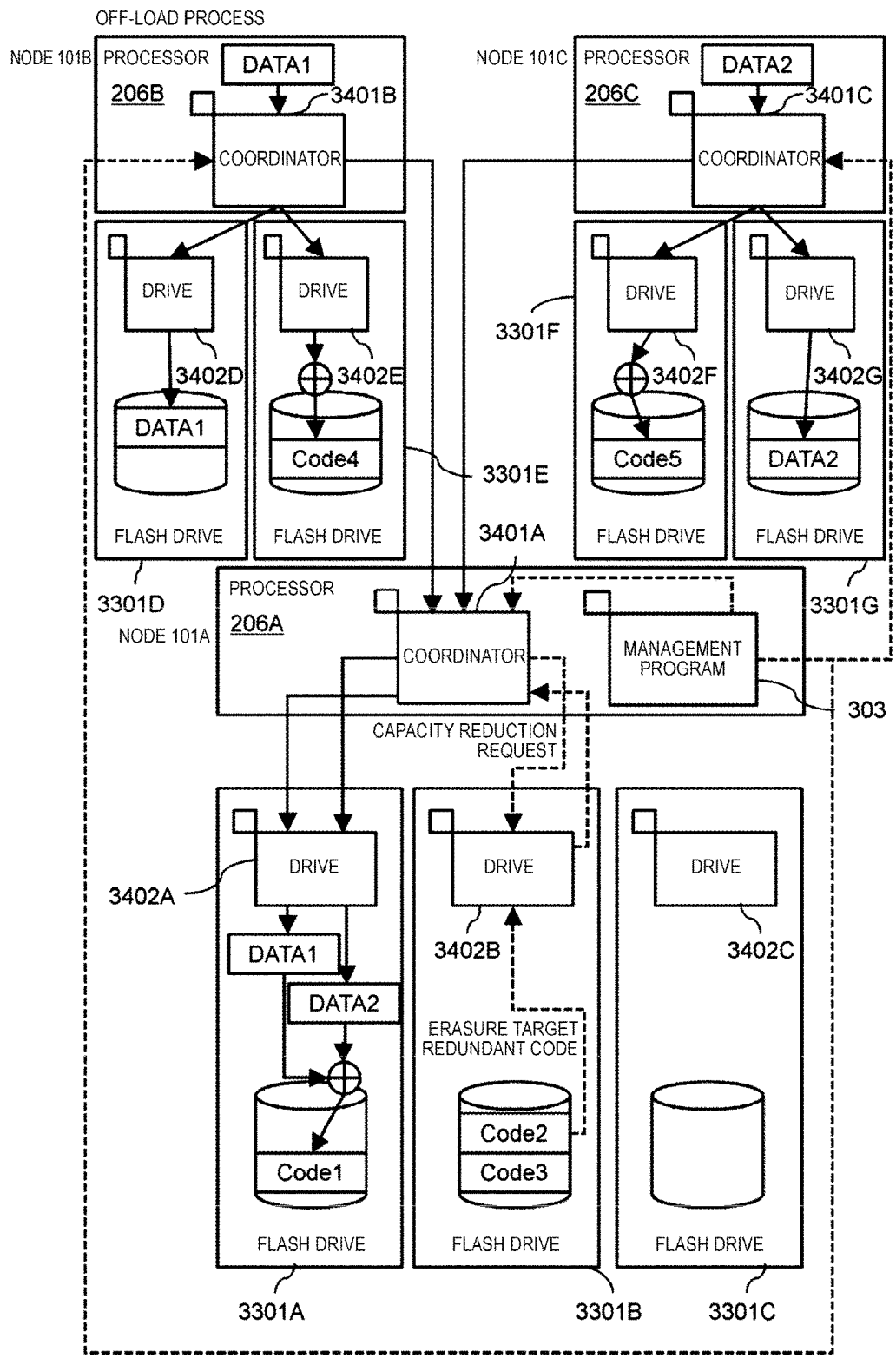
[Fig. 32]

[Fig. 33]
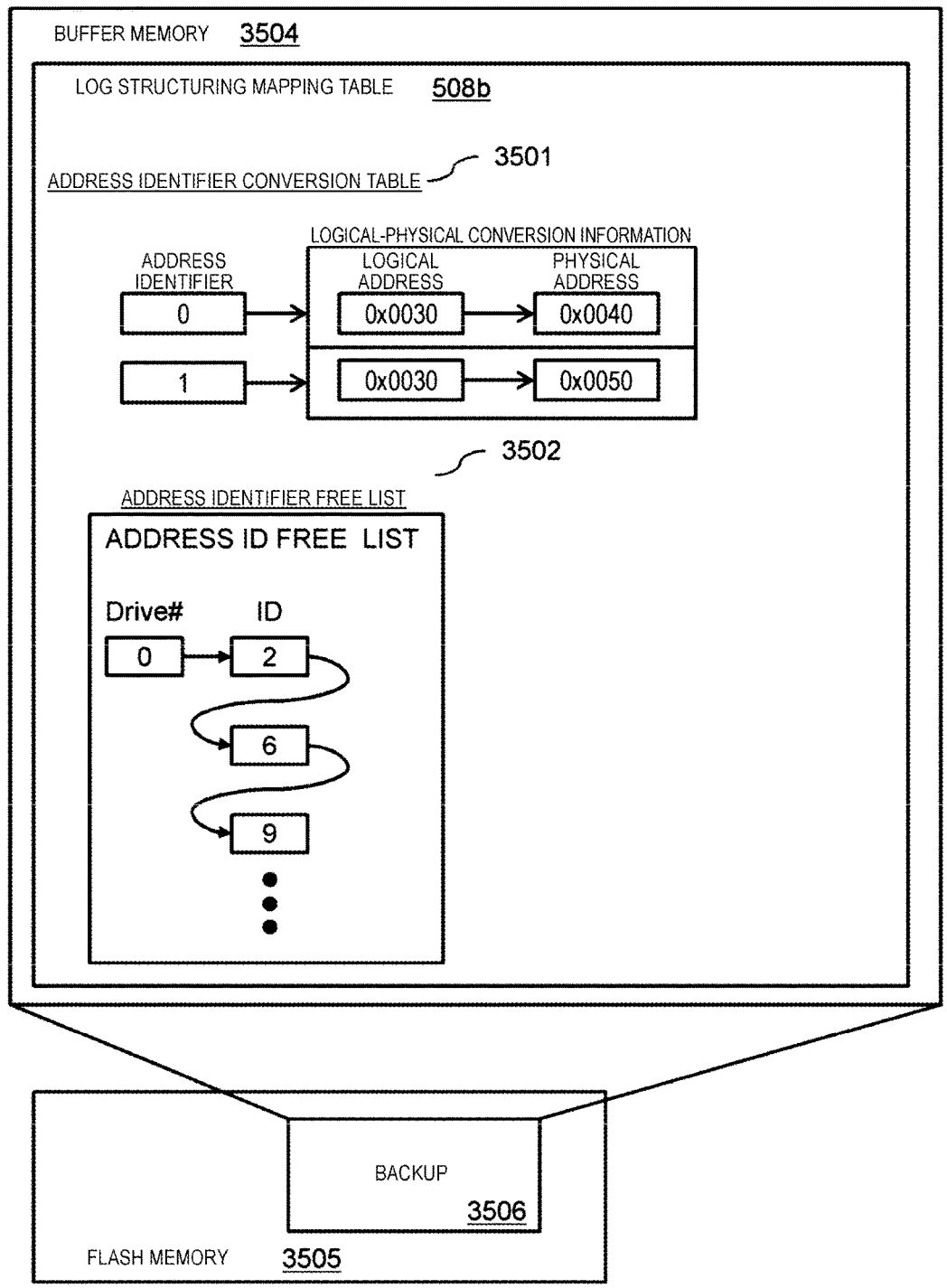

[Fig. 34]

COMMANDS FROM COORDINATE PROGRAM TO DRIVE PROGRAM

| COMMAND NAME | ARRANGEMENT | OUTPUT | DESCRIPTION |
|---|---|---|---|
| D_WRITE | 1: DRIVE NUMBER<br>2: LBA<br>3: TRANSMISSION LENGTH<br>4: ADDRESS IDENTIFIER | NONE | DESIGNATE ADDRESS IDENTIFIER AND WRITE DATA |
| P_WRITE | 1: DRIVE NUMBER<br>2: TRANSMISSION LENGTH<br>3: DATA STORAGE INFORMATION | NONE | WRITE DATA ALONG WITH DATA STORAGE DESTINATION INFORMATION |
| D_READ | 1: DRIVE NUMBER<br>2: LBA<br>3: TRANSMISSION LENGTH | NONE | READ VALID USER DATA |
| OLD_D_READ | 1: DRIVE NUMBER<br>2: ADDRESS IDENTIFIER<br>3: TRANSMISSION LENGTH | NONE | READ INVALID USER DATA (FOR COLLECTION READ) |
| P_GET | 1: DRIVE NUMBER | 1: REDUNDANT CODE CONFIGURATION INFORMATION | ACQUIRE INFORMATION REGARDING DATA FORMING REDUNDANT CODE FROM DRIVE |
| P_PUSH | 1: DRIVE NUMBER<br>2: REDUNDANT CODE CONFIGURATION INFORMATION | NONE | NOTIFY OF INFORMATION REGARDING DATA FORMING REDUNDANT CODE BY DESTAGE TRIGGER (IN CASE OF TWO OR MORE REDUNDANT CODES) |
| INVALID | 1: DRIVE NUMBER<br>2: ADDRESS IDENTIFIER<br>3: LBA | NONE | INVALIDATE LOG INFORMATION AND DATA CORRESPONDING TO DESIGNATED ADDRESS IDENTIFIER |
| SEARCH | 1: DRIVE NUMBER | 1: REDUNDANT CODE<br>2: REDUNDANT CODE CONFIGURATION INFORMATION | REDUNDANT CODE STORAGE DRIVE SEARCHES FOR DELETION TARGET PARITY, AND ACQUIRES CONFIGURATION INFORMATION OF PARITY |
| P_READ | 1: DRIVE NUMBER<br>2: LBA<br>3: TRANSMISSION LENGTH | 1: REDUNDANT CODE CONFIGURATION INFORMATION | ACQUIRE REDUNDANT CODE ENTITY AND CONFIGURATION INFORMATION THEREOF WITH RECOVERY TARGET DATA INFORMATION AS ARGUMENT |

3601, 3602, 3603, 3604, 3605, 3606, 3607, 3608, 3609

[Fig. 35]
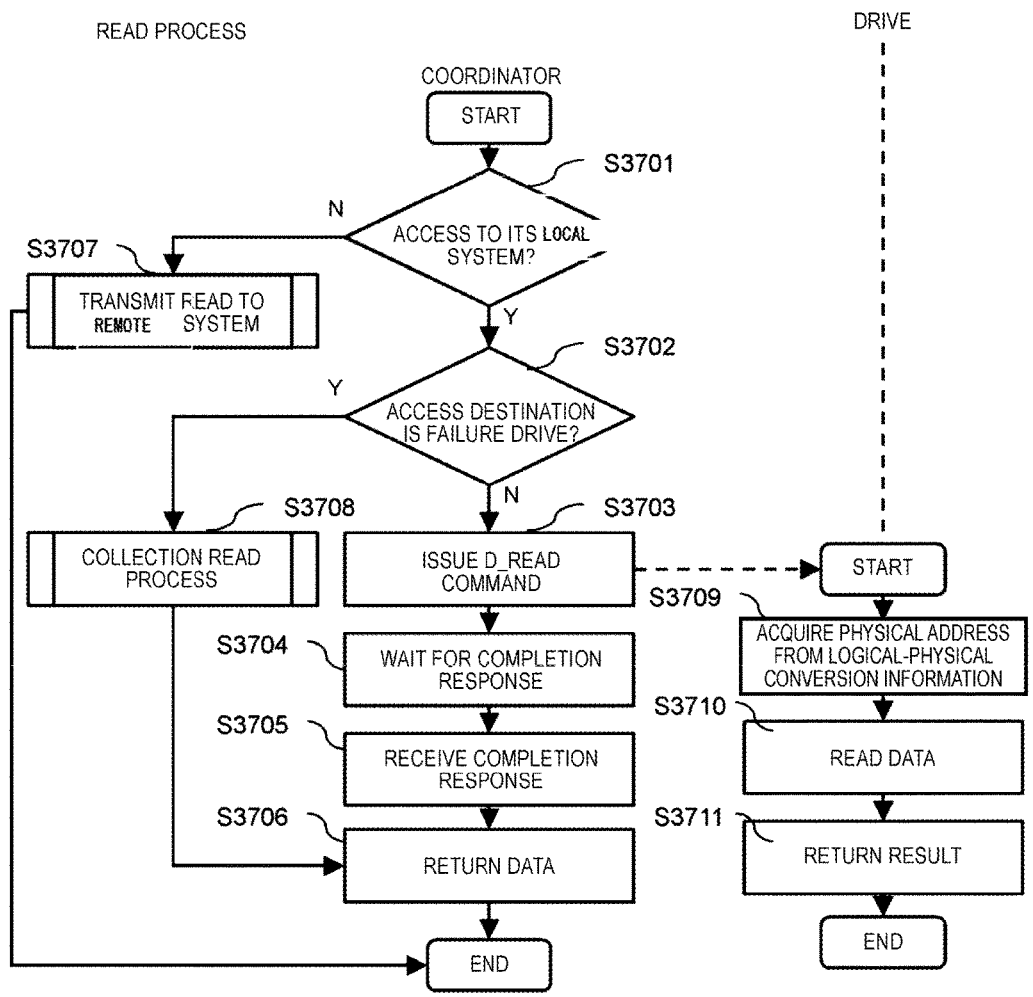

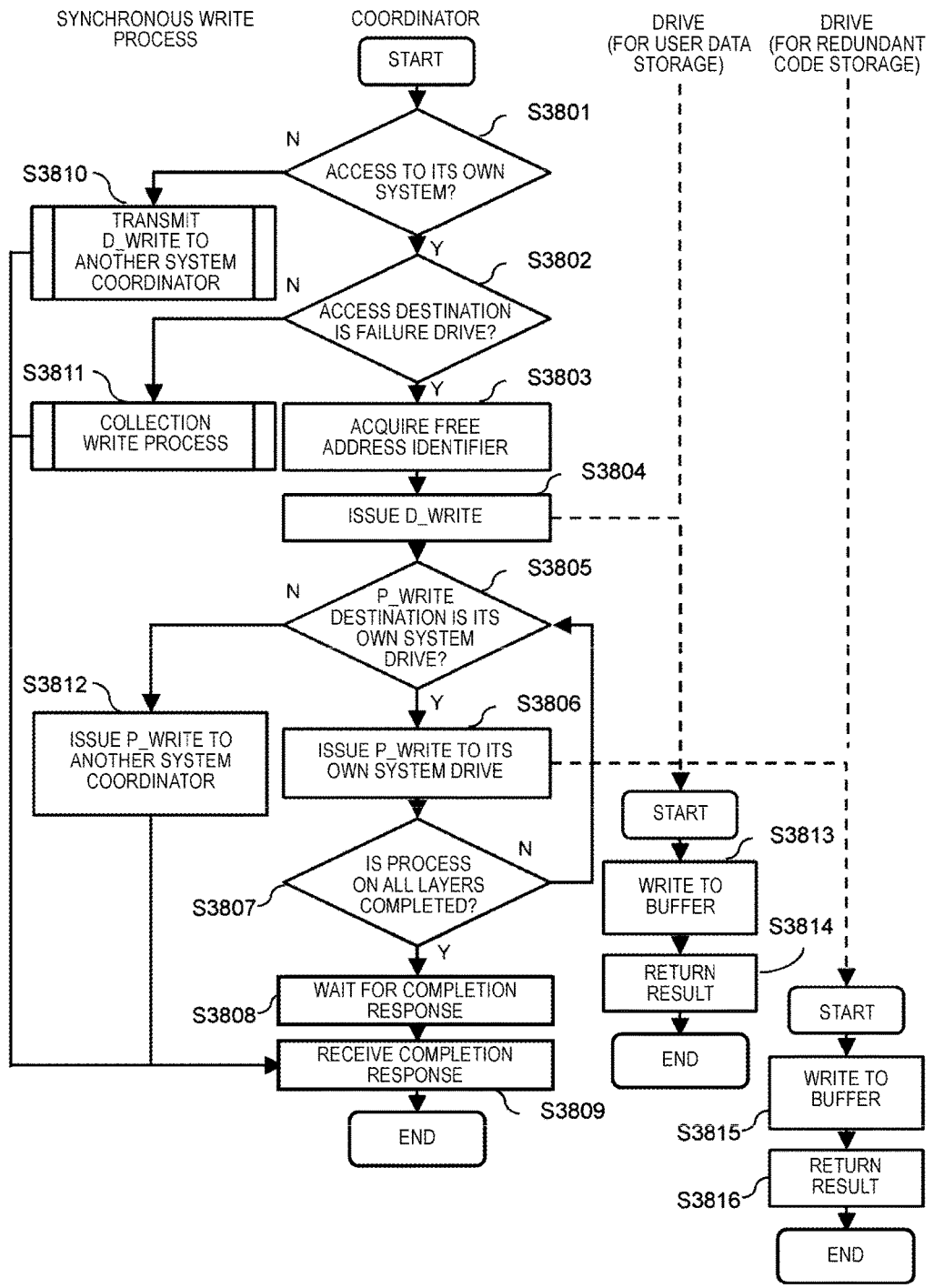
[Fig. 36]

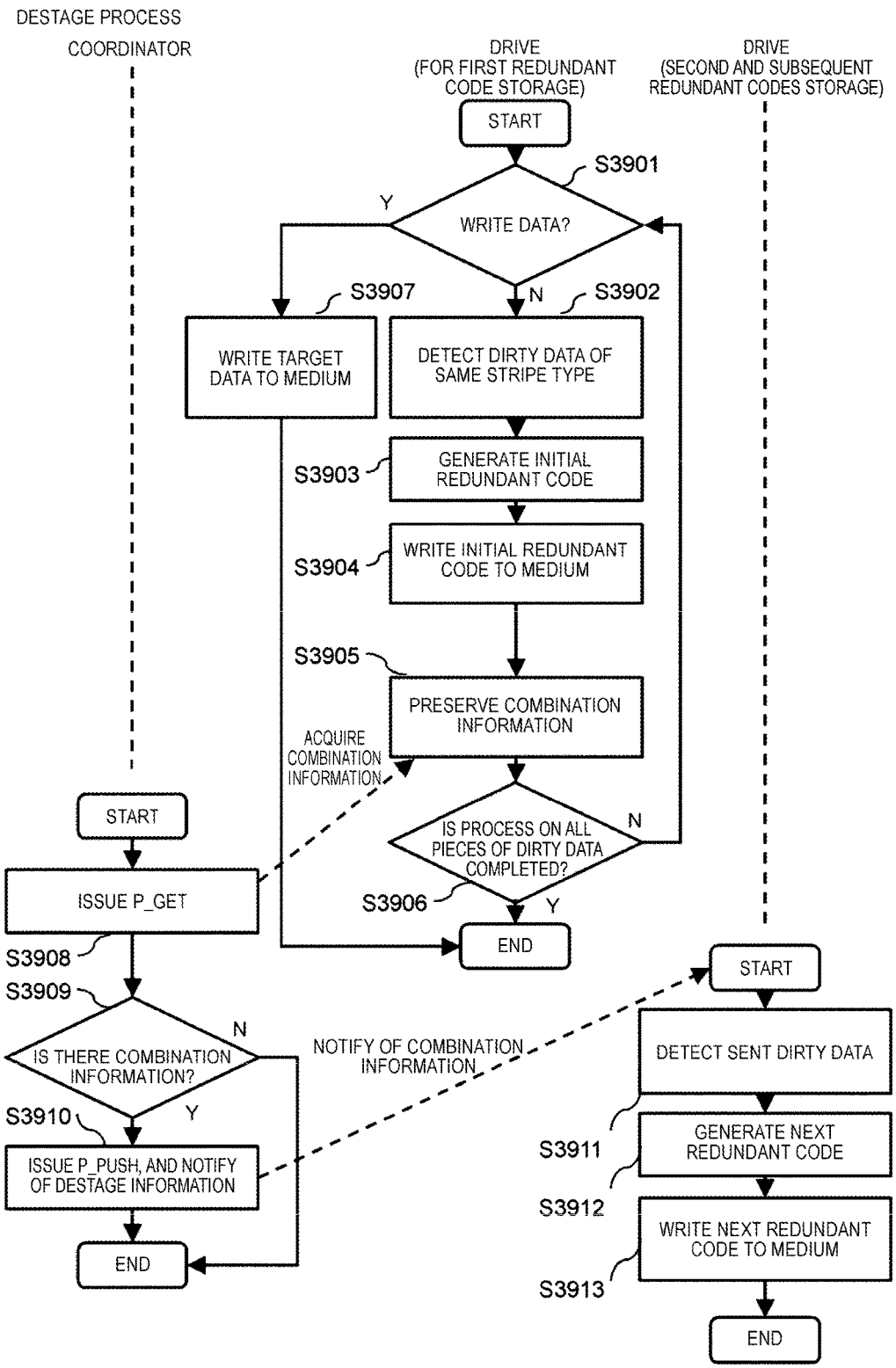
[Fig. 37]

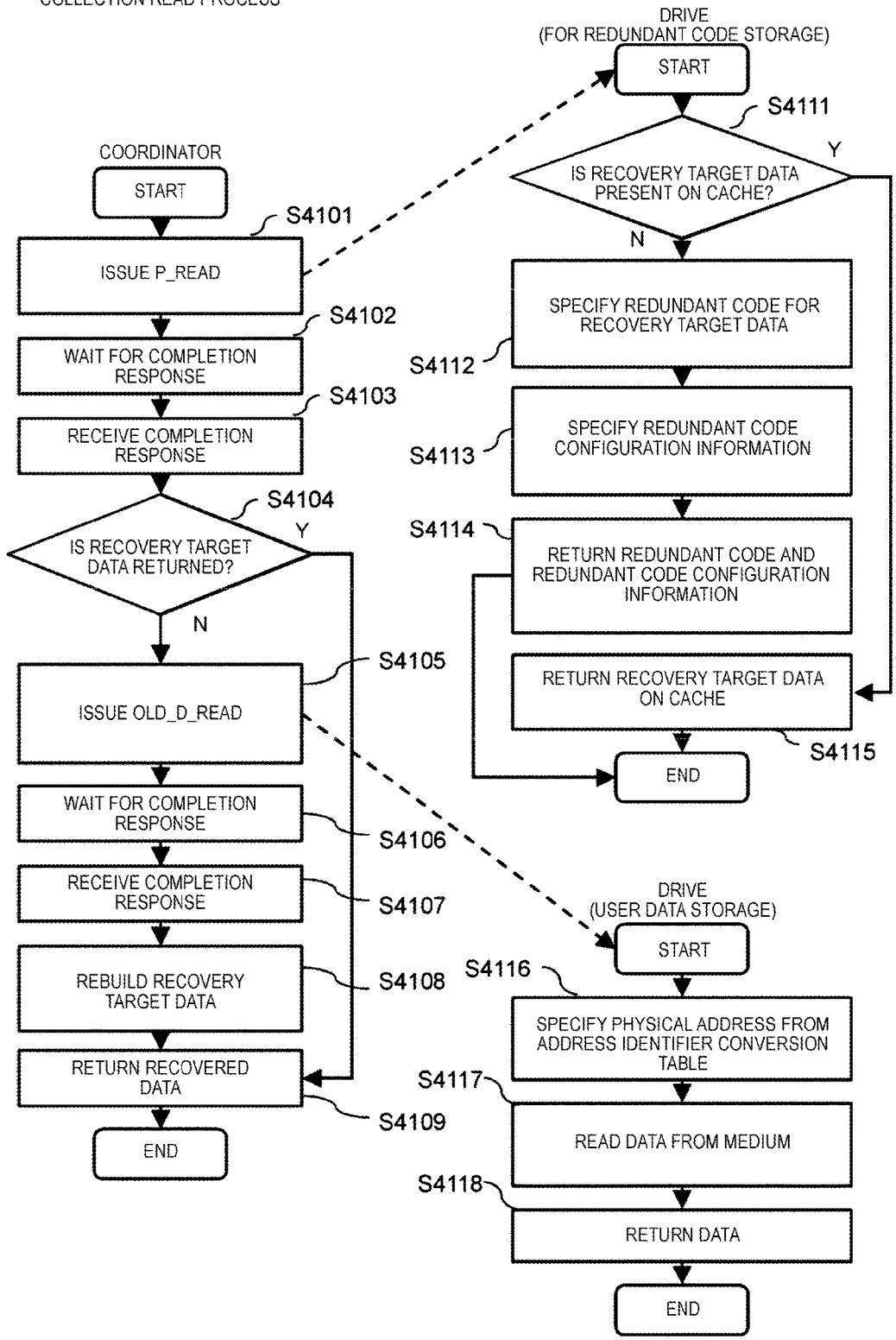

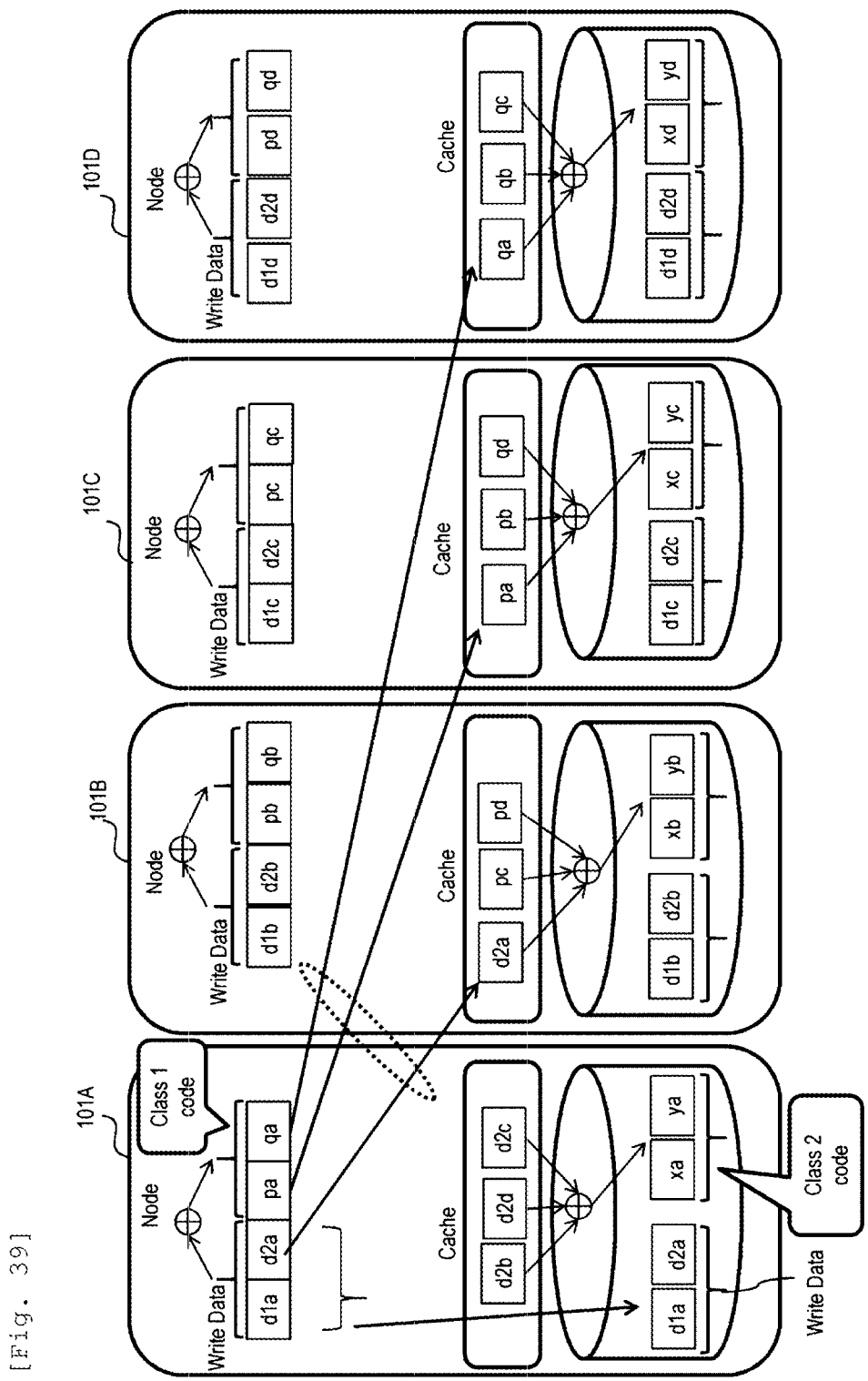

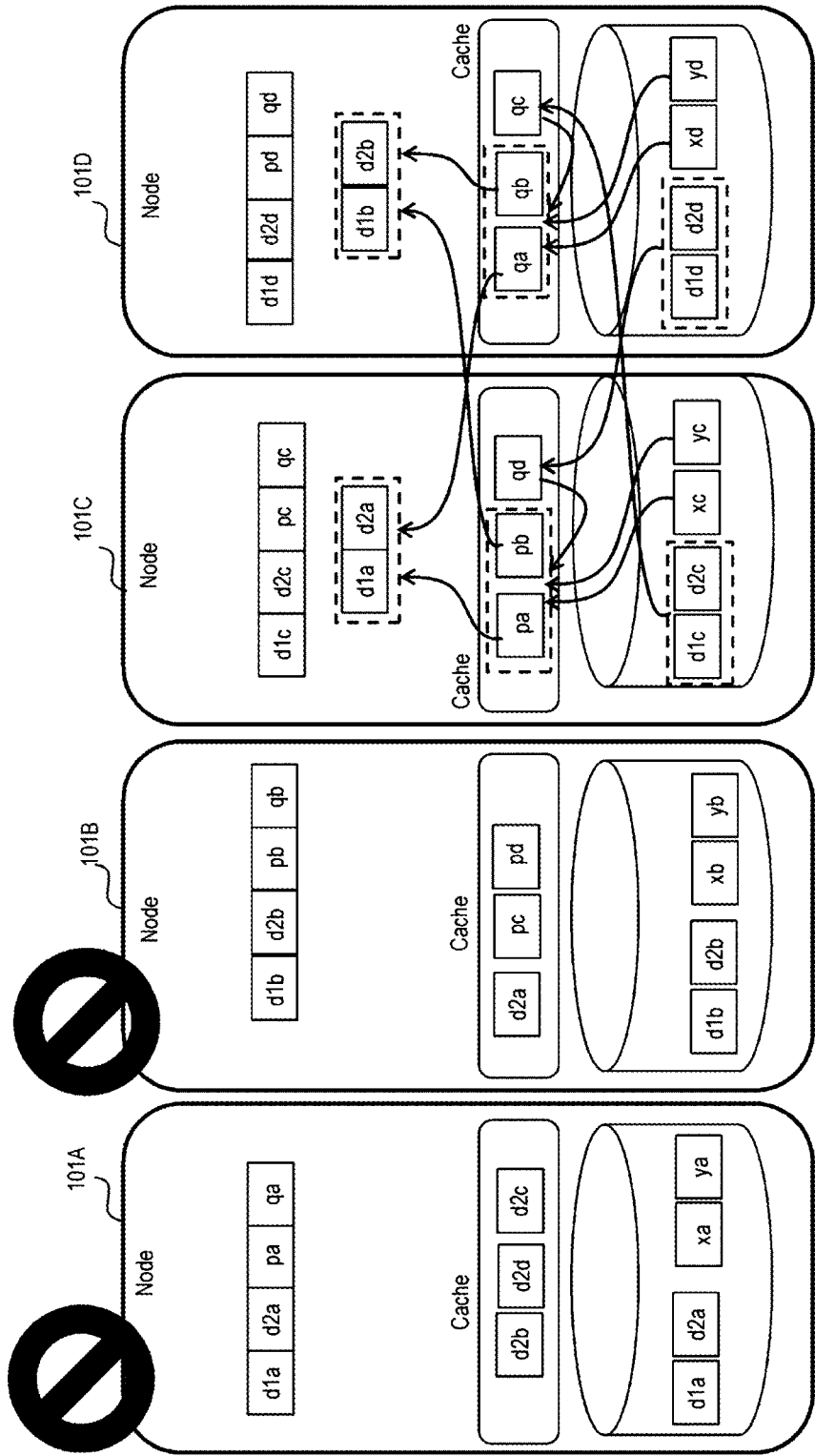
[Fig. 40]

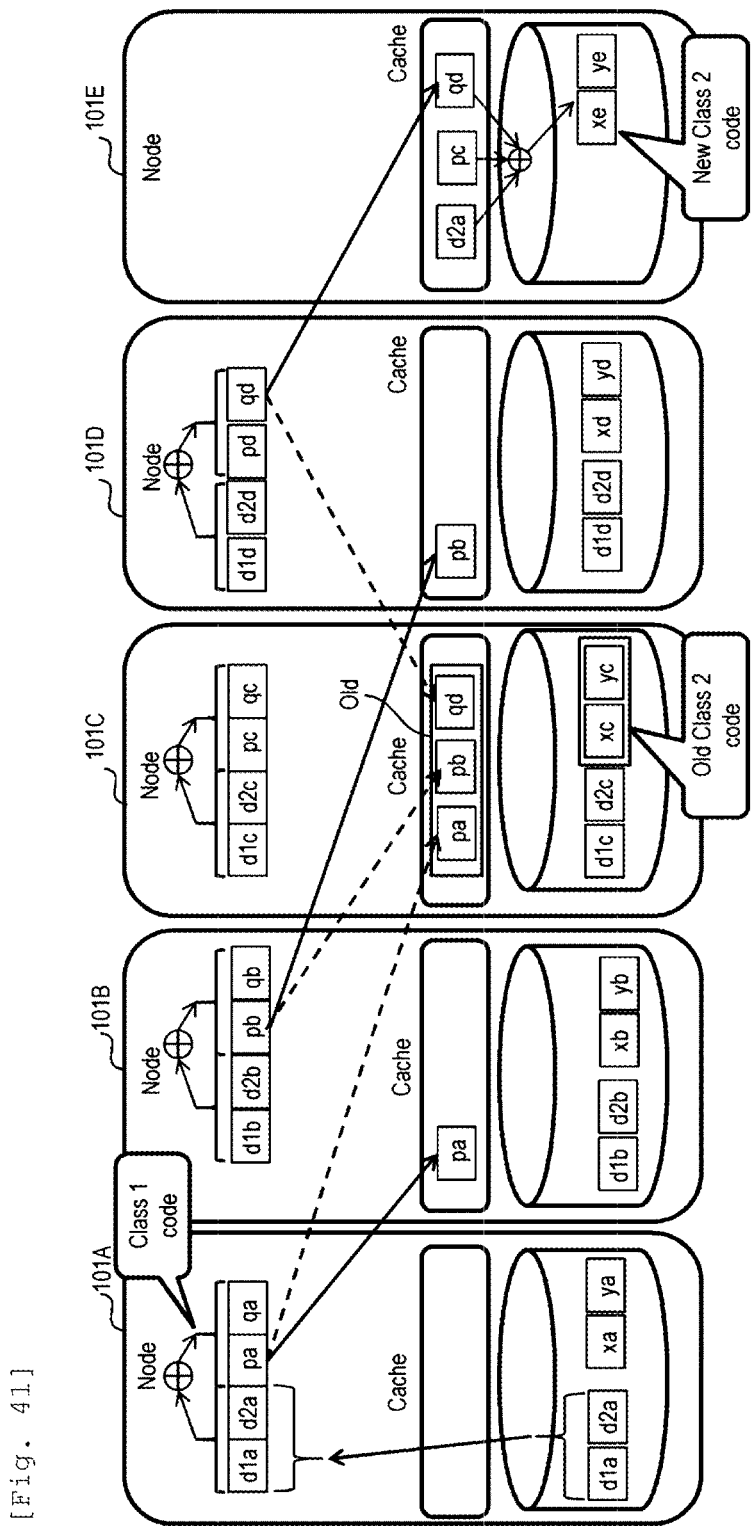
[Fig. 41]

COMPUTER SYSTEM THAT GENERATES
GROUP INFORMATION AND REDUNDANT
CODE BASED ON USER DATA AND
CHANGES THE GROUP INFORMATION
AND REDUNDANT CODE BASED ON
TRANSMISSION DATA, CONTROL METHOD
FOR COMPUTER SYSTEM, AND
RECORDING MEDIUM

TECHNICAL FIELD

The present invention relates to a computer system.

BACKGROUND ART

A distributed storage system of the related art distributes and stores user data and a redundant code of the user data to and in a plurality of computer nodes so as to protect the data. In a case where data is recovered from a computer node in which a failure occurs, data on a computer node in which a failure occurs is recovered by using a redundant code, and is distributed to respective surviving computer nodes (in which a failure does not occur) so as to be stored therein.

CITATION LIST

Patent Literature

PTL 1: Specification of U.S. Pat. No. 7,546,342

SUMMARY OF INVENTION

Technical Problem

A computer node in such a distributed storage system distributes user data received from an application program to a plurality of computer nodes. Therefore, when the application program reads data from the distributed storage system, the data is transmitted to a network among the computer nodes, and thus a delay time increases and a throughput deteriorates. Also when data from a computer node in which a failure occurs is recovered, user data is distributed to a plurality of computer nodes so as to be recovered, and thus the same problem occurs.

Solution to Problem

In order to solve the problem, according to one aspect of the present invention, there is provided a computer system including a plurality of computers. Each computer includes a storage device. Each computer sets a plurality of groups each including a user data region storing user data and a redundant code region storing a redundant code based on the user data in a logical storage region based on the storage device, and generates group information indicating positions of the user data region and the redundant code region in each of the plurality of computers for each group; in a case where a write request for write data is received, each computer writes the write data to a local storage device, selects a transmission destination computer from among other computers on the basis of the group information, and transmits transmission data based on the write data to the transmission destination computer; in a case where a plurality of pieces of transmission data are respectively received from a plurality of other computers, each computer generates a redundant code by using the plurality of pieces of transmission data on the basis of the group information, and writes the redundant code to the local storage device; and, in a case where configurations of the plurality of computers are changed, each computer changes the group information on the basis of the changed configurations, reads user data from the local storage device, selects a new redundant code computer which is a computer storing a redundant code after being changed based on the read user data on the basis of the changed group information, transmits retransmission data based on the read user data to the new redundant code computer, selects an old redundant code computer which is a computer storing a redundant code before being changed based on the read user data on the basis of the group information before being changed, and transmits an erasure request for requesting the redundant code before being changed to be erased to the old redundant code computer.

Advantageous Effects of Invention

It is possible to improve the performance of a computer system storing user data and a redundant code in a distribution manner.

BRIEF DESCRIPTION OF DRAWINGS

FIG. 1 illustrates a summary of a process of recovering data from a failure in a distributed storage system according to Example 1.
FIG. 2 illustrates a system configuration of the distributed storage system.
FIG. 3 illustrates a software system configuration of the distributed storage system.
FIG. 4 illustrates an example of page mapping of a plurality of nodes in the distributed storage system.
FIG. 5 illustrates information for control of the distributed storage system.
FIG. 6 illustrates a static mapping table 506 of a protection layer #2.
FIG. 7 illustrates a log structuring mapping table 508 in protection layer information 501.
FIG. 8 illustrates a local region control table 509.
FIG. 9 illustrates information included in virtualization provisioning information 502.
FIG. 10 illustrates a first portion of storage configuration information 504.
FIG. 11 illustrates a second portion of the storage configuration information 504.
FIG. 12 illustrates cache information 503.
FIG. 13 illustrates information for controlling a management program 303.
FIG. 14 illustrates information included in system configuration information 1301.
FIG. 15 illustrates information included in resource monitoring information 1302.
FIG. 16 illustrates internal configurations of a storage program 302 and the management program 303.
FIG. 17 illustrates a temporary arrangement pattern table 3000.
FIG. 18 is a flowchart illustrating a read process performed by the storage program 302.
FIG. 19 is a flowchart illustrating a synchronous write process performed by the storage program 302.
FIG. 20 is a flowchart illustrating an asynchronous write process performed by the storage program 302.
FIG. 21 is a flowchart illustrating a destage process performed by the storage program 302.
FIG. 22 is a flowchart illustrating a capacity exhaustion management process performed by the storage program 302.

FIG. 23 is a flowchart illustrating a recovery process from a node failure in the management program 303 and the storage program 302.

FIG. 24 is a flowchart illustrating a data copy process performed by the storage program 302.

FIG. 25 is a flowchart illustrating a collection read process performed by the storage program 302.

FIG. 26 is a flowchart illustrating a collection write process performed by the storage program 302.

FIG. 27 illustrates a concept of a redundancy destination changing process performed by the storage program 302.

FIG. 28 is a flowchart illustrating the redundant destination changing process performed by the storage program 302.

FIG. 29 is a flowchart illustrating a virtual machine migration destination selection process performed by the management program 303.

FIG. 30 illustrates a configuration example of a node setting screen.

FIG. 31 illustrates a configuration example of an arrangement policy setting screen.

FIG. 32 illustrates an off-load configuration in Example 2.

FIG. 33 illustrates a configuration example of a log structuring mapping table 508b managed by a flash drive 3301 in order to control a distributed storage system.

FIG. 34 illustrates a communication interface between a coordinator program 3401 and a drive program 3402.

FIG. 35 is a flowchart illustrating a read process in Example 2.

FIG. 36 is a flowchart illustrating a synchronous write process in Example 2.

FIG. 37 is a flowchart illustrating a destage process in Example 2.

FIG. 38 is a flowchart illustrating a collection read process in Example 2.

FIG. 39 illustrates a redundancy process in Example 3.

FIG. 40 illustrates a data recovery process in Example 3.

FIG. 41 illustrates redundancy destination changing process in Example 3.

DESCRIPTION OF EMBODIMENTS

Hereinafter, with reference to the drawings, embodiments of the present invention will be described in detail.

Embodiments described below are not intended to limit the inventions according to the claims, and it cannot be said that all combinations of features described in the embodiments are essential to solving means of the invention.

In the following description, various pieces of information are described in expressions such as a "table", a "list", and a "queue", but various pieces of information may be expressed by data structures other than the expressions. In order to indicate independence from a data structure, an "XX table", an "XX list", or the like will be referred to as "XX information" in some cases. In a case where the content of each piece of information is described, expressions such as "identification information", an "identifier", a "name", an "ID", and a "number" are used, but these can be replaced with each other.

In the following description, in a case where the same kind of elements are described without being differentiated from each other, a reference numeral or a common number in reference numerals may be used, and, in a case where the same kind of elements are described to be differentiated from each other, reference numerals of the elements may be used or IDs allocated to the elements may be used instead of the reference numerals.

In the following description, a process will be described with a "program" as the subject in some cases, but, the program is executed by a processor (for example, a central processing unit (CPU)), and thus a defined process is performed by using a storage resource (for example, a memory) and/or an interface device (for example, a communication port) as appropriate. Therefore, the processor may be regarded as the subject of the process. A process described with the program as the subject may be a process or a system performed by a processor or an apparatus including the processor. The processor may include a hardware circuit performing some or all of the processes. The program may be installed into an apparatus such as a computer from a program source. The program source may be, for example, a program distribution server or a computer readable storage medium. In a case where the program source is the program distribution server, the program distribution server may include a processor (for example, a CPU) and a storage resource, and the storage resource may store a distribution program and a distribution target program. The processor of the program distribution server may execute the distribution program such that the processor of the diagram distribution server distributes the distribution target program to other computers. In the following description, two or more programs may be realized as a single program, and a single program may be realized as two or more programs.

EXAMPLE 1

The present example discloses a distributed storage system. The distributed storage system includes a plurality of computer nodes each including a storage device. The plurality of computer nodes are connected to each other via a network. The distributed storage system creates a storage pool with the storage devices of the plurality of computer nodes, and realizes a virtual storage system by using the storage pool.

In the present disclosure, the storage device includes a single storage drive such as a single hard disk drive (HDD) or a single solid state drive (SSD), an RAID device including a plurality of storage drives, and a plurality of RAID devices. A stripe (stripe data) is a data unit which is a basis of a redundant code for protecting data. The stripe may be referred to as user data so as to be differentiated from a redundant code. The stripe is stored in the storage device of the computer node, and is used to generate a redundant code in remote computer node.

A stripe type is a class of a stripe for generating a redundant code. A stripe type to which a stripe belongs is determined by, for example, a logical address of the stripe and a computer node storing the stripe. A stripe type number which is an identifier of a stripe type indicates a group of a corresponding computer node. One stripe may be included in stripe types of a plurality of different protection layers. A host is a computer node, a processor operating in the computer node, or an application program executed by the processor.

FIG. 1 illustrates a summary of a process of recovering data from a failure in a distributed storage system according to Example 1.

A plurality of computer nodes 101 perform communication with each other via a network. Hereinafter, the computer node will be simply referred to as a node. The plurality of nodes 101 are indicated by nodes #0 to #3.

The node 101 executes a storage program 302, an application program (application) 301, and a management program 303. The storage program 302 manages a drive 105, and provides a virtual volume 107 to the application program 301. In the nodes #0 to #3, application programs A to D are executed, and storage programs A to D are executed. The storage programs A to D respectively provide virtual volumes A to D.

During normal operation, the storage program A of the node #0 stores user data D1 received from the application program A in the storage device of its local node #0 (local), also stores a redundant code for the user data D1 by using a static mapping table 506A, and selects remote node #1 so as to transmit user data to remote node #1 (remote). The node 101B generates an inter-node redundant code P on the basis of user data received from remote node, and stores the redundant code P in the storage drive 105 thereof. Hereinafter, in some cases, its local node or its local site will be referred to as its local system, and remote node or remote side will be referred to as remote system.

The management program 303 issues a management operation which will be described later to the storage program 302 and the application program 301 operating on each node via a network. In the example illustrated in FIG. 1, the management program 303 operates on only the node #3, but may operate on a plurality of nodes.

In the system as described above, in a case where a failure occurs in the node #0, first, the management program 303 reactivates the storage program A operating on the failure node #0 in the surviving separate node #1 (in which a failure does not occur). In this case, the storage program A provides the virtual volume A provided to the application program A, thereto. The virtual volume A has no entity of data since the storage drive 105 is lost. Thus, the storage program A recovers data through a collection process with respect to access to the virtual volume A, and returns the data to the application program A.

Next, the management program 303 selects the node #1 which is a failover destination of the application program, and issues a data migration request to the storage program B operating on the node #1 which is a failover destination. The storage program B performs external connection for mapping the virtual volume A of the storage program A as an internal virtual volume such that the virtual volume A is processed as a storage device thereof. Next, the storage program B creates a new virtual volume An, and performs data migration 111 from the externally connected virtual volume A to the virtual volume An. Consequently, the distributed storage system copies data on the node #0 in which a failure occurs to the storage program B operating on the surviving node #1, so that the data is newly stored therein so as to be recovered.

The distributed storage system performs a removal process for the node #0 in addition to a data recovery process. In the removal process, first, with respect to the static mapping table 506A, a new static mapping table 506B is generated as a configuration after the removal. Next, the distributed storage system determines a redundant code node (redundancy destination node) which is a node storing a redundant code on the basis of the new static mapping table 506B with respect to data stored in each node, and regenerates a new redundant code Pn. Thereafter, the redundant code P generated on the basis of the old static mapping table 506A is not necessary, and thus the storage program B deletes the redundant code P.

The example illustrated in FIG. 1 shows the static mapping tables 506A and 506B in a case of using 2D1P in which a single redundant code is generated by using two stripes. The static mapping table 506 includes a D region which is a matrix of a user data portion and a P region which is a matrix of a redundant code portion. A column number in the D region and the P region indicates a node number. A row number in the D region indicates a stripe position number. A stripe position is a logical storage region of each stripe size which is set in advance. The stripe position is repeatedly disposed in a logical address order. A number shown in an element of a matrix indicates a stripe type number. The P region represents a node storing a redundant code and a stripe type number.

In the static mapping table 506, in a case where user data of a plurality of nodes having the same stripe type in the D region is written to a corresponding stripe position, the user data is transmitted to a node of a redundant code having the stripe type in the P region.

The static mapping table 506A indicates mapping for four nodes during normal operation. The static mapping table 506B indicates mapping for three nodes after removal.

As mentioned above, the distributed storage system stores data accessed by the application program 301 of each node in the local drive 105. Consequently, it is possible to improve the performance of the application program 301. In a case where a failure occurs in the node 101, the distributed storage system recovers data in a failover destination node of the application program 301, and realizes data reading without using a network with respect to the recovered application program 301. In a case of a configuration change in which the number of nodes of the distributed storage system is changed, the distributed storage system changes the static mapping table 506 in accordance with the changed configuration so as to maintain the redundancy.

Since the storage program 302 generates a redundant code, redundancy can be performed without the drive 105 having a special function.

A node receiving a write request selects a transmission destination computer, and transmits transmission data based on write data to the transmission destination computer. The node 101 which receives a plurality of pieces of transmission data from a plurality of other nodes 101 generates redundant codes by using the plurality of transmission data on the basis of group information. In a case where configurations of the plurality of nodes 101 are changed, the node 101 reads user data, selects a new redundant code computer which is a computer storing a changed redundant code based on the user data, and transmits retransmission data based on the read user data to the new redundant code computer. The transmission data may be write data, part of the write data, an intermediate code, a class 1 code which will be described later, or the like. The retransmission data may be user data, part of the user data, an intermediate code, a class 1 code, or the like.

FIG. 2 illustrates a configuration example of the distributed storage system.

The node 101 has, for example, configuration of a general server computer. A hardware configuration of the node 101 is not particularly limited. The node 101 is connected to other nodes 101 through a backend port 208 via a backend network 203.

The plurality of nodes 101 form a domain 201. The domain 201 may correspond to, for example, a geographical area, and may correspond to topology of the virtual or physical backend network 203. An external network 204 may connect a plurality of domains 201 to each other. In the following description, each domain is assumed to correspond to one of a plurality of sites which are geographically separated from each other.

An internal configuration of the node 101, the backend port 208, a processor package 207, and a disk drive (hereinafter, referred to as a drive) 105 are connected to each other via an internal network 202. The processor package 207 includes a memory 205 and a processor 206 (for example, a CPU).

The memory 205 stores a program executed by the processor 206. The memory 205 may be a volatile DRAM, and may be a nonvolatile storage class memory (SCM), or the like.

The drive 105 is, for example, a hard disk drive having an interface such as a fibre channel (FC), Serial Attached Small Computer System Interface (SCSI) (SAS), or Serial Advanced Technology Attachment (SATA), or a solid state drive (SSD). As the drive 105, an SCM such as a NAND, a PRAM, or a ReRAM may be used, or a nonvolatile memory may be used. In a case where a volatile memory is used as the drive 105, a storage device may be made nonvolatile by using a battery.

FIG. 3 illustrates a software configuration example of the distributed storage system.

A hypervisor 304 operates on the node 101, a virtual machine (VM) 307 operates on the hypervisor 304. The storage program 302, the application program 301, and the management program 303 operate on the virtual machine depending on applications thereof.

The hypervisor 304 is a component which manages allocation of hardware resources such as the processor 206, the memory 205, the drive 105, and the backend network 203 to a plurality of virtual machines 307 operating on the hypervisor 304, and actually delivers a request for access to the hardware resources from the virtual machine 307, to the hardware. An operating system (OS) operates on the virtual machine 307, and various programs operate thereon. The virtual machine 307 is a component which manages allocation of virtual resources provided from the hypervisor 304 to the various programs, and delivers a request for access to the virtual resources from the programs, to the hypervisor 304.

The storage program 302 is a program managing storage I/O for the drive 105. The storage program 302 bundles the drives 105 which are hardware resources so as to virtualize the drives, and provides the drives to remote virtual machine 307 as a virtual volume 107 via the hypervisor 304. For example, the storage program 302 causes the hypervisor 304 to recognize the virtual volume 107 as an iSCSI target (drive 105) so as to mount the virtual volume on the hypervisor 304, and thus provides the drives (virtual volume) to remote virtual machine 307. In a case where a request for storage I/O is received from remote virtual machine 307, the storage program 302 performs the storage I/O on the drive 105, and returns a result thereof. The storage program 302 performs communication with the storage program 302 operating on remote node 101 via a network path 306, and realizes a storage function such as data protection or data migration.

The application program 301 is a program required for a user's work. In a case where storage I/O is performed, the application program 301 transmits an I/O request to a virtual volume provided by the storage program 302 through a storage path 305 via the hypervisor 304.

The management program 303 is a program managing configurations of the hypervisor 304, the virtual machine 307, and the node 101. The management program 303 issues network I/O via the virtual machine 307 and the hypervisor 304, and issues a management operation 308 to remote virtual machine 307.

Each of all of the virtual machine 307 performs network communication with the other virtual machines 307 via the hypervisor 304. The storage program 302, the application program 301, and the management program 303 may be operated by the OS directly operating on the hardware instead of operating on the virtual machine 307, so as to realize the system.

FIG. 4 illustrates an example of page mapping of a plurality of nodes in the distributed storage system.

The distributed storage system of the present example forms pools 402A and 402B with a plurality of logical volumes, and provides virtual volumes 107A to 107C formed on the pools 402A and 402B to the application program 301. The node 101A provides the virtual volumes 107A and 107B from the pool 402A. The node 101B provides the virtual volume 107C from the pool 402B.

A single pool 402 is formed of one or a plurality of logical volumes. This logical volume is also referred to as a pool volume 401. The entity of the pool volume 401 is a storage region of the drive 105. A storage region of the drive 105 of remote node 101 may be allocated to the pool volume 401.

The node 101A holds two pool volumes 401. One is a pool volume 401A formed of a storage region of the drive 105 of its local node. Data stored in the pool volume 401A is disposed in the drive 105 of its local node. The other is a pool volume 401C onto which a volume 401B of remote node 101B is mapped straight. Consequently, a volume 401C is managed as the pool volume 401C. The node 101A can perform an I/O process on the pool volume 401B of remote node via the pool volume 401C.

This function is knows as a storage external connection function. With respect to access to the pool volume 401C, the node 101A converts a pool volume address which is a logical address in the pool volume 401C into a pool volume address of the pool volume 401B of remote node, and transmits an I/O request including the address obtained through the conversion to the node 101B which is remote node. The node 101A holds a page mapping table between the pool volume 401C thereof and the pool volume 401B of remote node. Similarly, the node 101B manages the volume 401A of the node 101A as a pool volume.

The storage program 302 maps a virtual page having a large amount of host access in its local node onto the pool volume 401 of its local node, and maps a virtual page having a large amount of host access in remote node onto the pool volume 401 of remote node. Consequently, a response time for the host is reduced. Data of the virtual page allocated from the pool volume 401 of remote node is stored in the drive 105 of remote node.

The application program 301 preferably accesses the pool volume 401A of its local node in terms of the performance. However, in a case where the capacity of the pool volume 401A of its local node is exhausted, or the application program 301 of remote node is reactivated in its local node due to a failure in remote node, the pool volume 401B of remote node may be used. As mentioned above, the storage program 302 provides a virtual volume to the application program 301, and thus it is possible to easily manage the capacity of the drive 105.

FIG. 5 illustrates information for controlling the distributed storage system.

The memory 205 stores protection layer information 501, virtualization provisioning information 502, cache information 503, storage configuration information 504, and the storage program 302.

The protection layer information 501 is information regarding data protection. The virtualization provisioning information 502 is information regarding provisioning of a virtual volume. The cache information 503 is information regarding a cache of the storage program. The storage configuration information 504 is information regarding a configuration of the distributed storage system.

The storage program 302 is a program managing storage I/O for the drive 105.

The protection layer information 501 includes static mapping tables 505, 506 and 507 respectively corresponding to protection layers #1, #2 and #3. The protection layer information 501 further includes a log structuring mapping table 508 and a local region control table 509.

In the present example, the protection layer #1 distributes data to a plurality of drives 105 of the node 101 so as to protect the data. The protection layer #2 distributes data to a plurality of nodes 101 in the site so as to protect the data. The protection layer #2 distributes data to a plurality of sites so as to protect the data. Thus, the protection layers #1, #2 and #3 will be respectively referred to as a node protection layer, a site protection layer, and a geo protection layer in some cases. The number of protection layers may not be three.

The virtualization provisioning information 502 includes a page mapping table 510.

The storage configuration information 504 includes a virtual volume management table 511, a pool volume management table 512, and a drive management table 513. The storage configuration information 504 further includes a drive state management table 514, a node state management table 515, and a site state management table 516.

The memory 205 stores various programs including an OS and an interface program in addition to the information illustrated in FIG. 5. The memory 205 may store the application program 301 executing work. A backup 517 of all or some of the pieces of information stored in the memory 205 may be synchronously or asynchronously preserved in the drive 105 of its local node or remote node.

Hereinafter, a description will be made of a configuration example of a table representing information held by the node 101. In each table, only some entries are shown. In each table, a blank cell is a cell in which writing of data is omitted. In a cell of a table, "0x" indicates a hexadecimal number. A drive number is unique in a node, and a node number is unique in a site. A site number is unique in a system.

FIG. 6 illustrates the static mapping table 506 of the protection layer #2.

The number of pieces of data (number of stripes) is indicated by d, the number of parities (number of redundant codes) is indicated by p, and the number of cycles (the number of rows of a matrix of a user data portion) is indicated by c. In the example illustrated in FIG. 6, c is 4, d is 4, and p is 2 (4D2P). In other words, a D region 601 storing data has a four-stripe size, and a P region 602 storing a redundant code has a two-stripe size. Mapping of the static mapping table 506 is repeatedly performed on a pool volume address in the unit of the number of cycles.

A stripe type is a class of a stripe. One or a plurality of redundant codes are generated by using a plurality of stripes in a stripe type. A stripe is a data unit with a predefined size. In the example illustrated in FIG. 6, two redundant codes are generated, and are stored in different nodes 101. Any number of stripes and any number of redundant codes may be designed under a condition in which a plurality of same stripe types are not disposed in the same node. A redundant code is generated through, for example, erasure coding. Consequently, the distributed storage system can generate a static mapping table after a configuration change without changing the redundancy of a static mapping table before the configuration change.

In FIG. 6, for example, a stripe having a stripe position number "0" in nodes having node numbers "1", "2", "3", and "7" belongs to a stripe type having a stripe type number "0". Node numbers of redundant code nodes belonging to the stripe type having the stripe type number "0" are 0 and 5. The nodes having the node numbers "0" and "5" store a redundant code related to the stripe type number "0".

In the example illustrated in FIG. 6, a stripe in the D region 601 is uniformly distributed to eight nodes. The number of data nodes of a stripe type may be changed depending on a storage capacity of a node. In a case where a total number of nodes is small or a fraction occurs, the number of redundant codes of some stripe types may be reduced. Other stripe types may be made redundant by a differing algorithm. In addition, c and d may be different from each other.

A redundant code node is selected from among nodes which are different from all data nodes of the stripe type. Data from data nodes is concentratedly written to a redundant code node. Therefore, redundant code nodes are selected such that a redundant code is disposed as uniformly as possible. Consequently, in a case where the drive 105 is an SSD, the service lives of the nodes 101 can be equalized. In a case where a service life is biased among the nodes, the arrangement in the redundant code P region 602 may be changed such that the service lives are equalized.

In the example illustrated in FIG. 6, a stripe type is determined by a pool volume address. Consequently, a plurality of regions in a single pool volume are classified as a plurality of stripe types. A redundant code does not depend on an address in a volume of a stripe. A redundant code node selects any d pieces of data from data of the same stripe type, and generates a redundant code by using the selected data.

A redundant code node for write data from a host in the protection layer #2 is determined according to the following method. First, a node receiving a write request from a host specifies a number of the node. Next, a write destination address which is a pool volume address of a write destination is specified on the basis of a logical address designated in the write request, and a stripe position number is determined according to the following computation formula.

$$\text{Stripe position number} = (\text{write destination address}/\text{stripe size}) \bmod c$$

If the node number and the stripe position number are determined, the node specifies a stripe type number by referring to the static mapping table 506 of the protection layer, and determines a redundant code node.

The static mapping tables 505 and 507 of the protection layers #1 and #3 have the same configuration as that in the protection layer #2. In the protection layer #1, a drive number is used instead of a node number. In the protection layer #3, a site number is used instead of a node number.

If the static mapping table 506 is summarized for each stripe type number, a stripe type table 506s is obtained. The stripe type table 506s is information shared among the nodes 101 in a single site. The stripe type table 506s indicates a relationship between a node number of a data node storing a corresponding stripe (user data), a node number of a redundant code node storing a redundant code generated by using a stripe for each node stripe type number. The node stripe type number is identification information of a stripe type between nodes.

FIG. 7 illustrates the log structuring mapping table 508 in the protection layer information 501.

The log structuring mapping table 508 includes a data mapping table 701, a redundant code mapping table 702, and an inverse mapping table 703.

The data mapping table 701 manages user data stored in the drive 105 of the node 101 holding the table 701. The data mapping table 701 has an entry for each logical storage region in which user data is stored. Each entry includes a logical drive number, a logical address, a physical drive number, a physical address, and a size of a physical storage region.

By referring to the data mapping table 701, the node 101 can specify a drive address (physical address) in the drive 105 (physical drive) storing user data on the basis of a pool volume address (logical address) of the user data. In other words, in the data mapping table 701, a logical drive number indicating a pool volume, a pool volume address (logical address) of user data in the pool volume, a physical drive number indicating the drive 105, and a drive address (physical address) of a physical storage region in the drive are correlated with each other. The data mapping table 701 stores a size of a physical storage region. For example, the data mapping table 701 indicates that data of a logical drive number "0x0000" and a logical address "0x0000" is stored in a physical drive number "0x0010" of the drive of its local node and a physical address "0x0800" with a data length of 512 bytes. The data mapping table 701 stores information indicating a state of stored data. For example, a state information indicates whether or not data has been transmitted to a corresponding redundant code node. As will be described later, write data is transmitted to a redundant code node in order to generate a redundant code in synchronization or asynchronization with a host write process on the write data according to setting of synchronization or asynchronization.

The redundant code mapping table 702 manages a redundant code stored in the drive 105 of the node 101 holding the table 702. Managed redundant codes include an inter-site redundant code, an inter-node redundant code, and an intra-node redundant code. The redundant code mapping table 702 has an entry for each logical storage region in which a redundant code is stored. Each entry includes a site number, a node number, a logical drive number, a logical address, a physical drive number, a physical address, and a size of a physical storage region.

Consequently, the node 101 can specify a physical address of a redundant code for user data on the basis of a pool volume address in which the user data is stored. For example, in the redundant code mapping table 702, a redundant code of a site number "0", a node number "2", a logical drive number "0x0000", and a logical address "0x0000" is stored in a physical drive number "0x0003" of the drive of its local node and a physical address "0x2000". In other words, a pool volume address (logical address) of user data in a pool volume of remote node is correlated with a drive address (physical address) of a physical storage region of the drive 105 for a redundant code stored in its local node.

The inverse mapping table 703 is an inverse conversion table for specifying a storage position of user data which is a basis of a redundant code on the basis of a storage position of the redundant code. In a case where a failure occurs in user data, the node 101 refers to the table 703 so as to specify data required for recovery. The inverse mapping table 703 has an entry for each logical storage region in which a redundant code is stored. Each entry includes a logical drive number and a logical address of a logical storage region, and a site number, a node number, a logical drive number, a logical address, and a size of a physical storage region storing user data corresponding to the redundant code. Each entry may include a flag indicating whether write data used to generate a redundant code is valid or invalid.

For example, the inverse mapping table 703 indicates that a redundant code stored in of a site number "0", a node number "0", a logical drive number "0x0000", and a physical address "0x0000" is generated from data of the site number "0", a node number "1", a physical drive number "0x0000", and a physical address "0x2000", data of the site number "0", a node number "2", a physical drive number "0x0001", and a physical address "0x1300", data of the site number "0", a node number "3", a physical drive number "0x0004", and a physical address "0x0000", and data of the site number "0", a node number "7", a physical drive number "0x0010", and a physical address "0x0400".

The distributed storage system of the present example stores data according to a log structuring method. In the log structuring method, in a case where data of a logical address in a pool volume is updated to new data, the new data is additionally written to a new physical address without updating data of a physical address to the new data. Therefore, old data and new data may be stored in a physical storage region as data of a single logical address. The unnecessary old data is erased as appropriate. Owing to the log structuring method, reading for updating a redundant code is not necessary, and thus it is possible to reduce time for a write process for the drive 105. The log structuring method may not be installed in the distributed storage system.

FIG. 8 illustrates the local region control table 509.

In FIG. 8, an arrow indicates a pointer. The local region control table 509 includes a valid list 801, an invalid list 802, a free list 803, and a local region amount table 804. The local region control table 509 manages a local region which is a region in the drive 105 of its local node. In the lists 801 to 803, each local region is indicated by a drive number and a logical block address (LBA) in a drive.

The valid list 801 is a list of valid regions. A valid region is a region in which the latest user data or the latest redundant code is stored. In the example illustrated in FIG. 8, in the drive 105 having the drive number "0", valid data is stored in blocks having LBAs "0", "4" and "5".

The invalid list 802 is a list of invalid regions. An invalid region is a region in which old user data or an old redundant code is stored. An old and an invalid redundant code is a redundant code in which all stripes used to generate the redundant code are invalid. In the example illustrated in FIG. 8, in the drive 105 having the drive number "0", invalid data is stored in blocks having LBAs "1", "3" and "7". The free list 803 is a list of regions which are not in use.

The local region amount table 804 has an entry for each of a plurality of data types. Data stored in the drive 105 is classified as one data type of a redundant code type and a write data type. The redundant code type is classified into a node redundant code type, a site redundant code type, and a geo redundant code type, and the write data type is classified into respective site stripe types.

In each entry, a target use amount, an actually used amount, and an amount of invalid regions are managed. The target use amount is set in advance. The actually used amount indicates a total size of valid regions and invalid regions allocated to a corresponding type. The valid region amount indicates a total size of valid regions allocated to a corresponding type. The storage program 302 can appropriately control a data amount of each data type by separately managing an amount of each data type. The storage program 302 updates the local region control table 509 in synchronization or asynchronization with host I/O.

FIG. 9 illustrates information included in the virtualization provisioning information 502.

The virtualization provisioning information 502 includes the page mapping table 510. The page mapping table 510 has an entry for each page in a virtual volume. Each entry holds a correspondence relationship among a virtual volume number, a logical address of a virtual page in the virtual volume, a range indicating a size of the virtual page, a pool volume number, and a pool volume address of a logical page in the pool volume.

In the present example, the page mapping table 510 holds information regarding a virtual volume provided by the node 101 holding the table 510. A logical page of the pool volume 401B of remote node 101B can be allocated to a virtual page via the pool volume 401C of the node 101A or directly. The page mapping table 510 indicates a relationship between a virtual page and the pool volume 401A of the node 101A or the pool volume 401B of remote node 101B. The page mapping table 510 holds a leading LBA and an address range of a virtual page in a virtual volume, and a leading LBA of a logical page in a pool volume corresponding to the leading LBA of the virtual page.

FIG. 10 illustrates a first portion of the storage configuration information 504.

Each table included in the first portion indicates management information of different storage resource types.

The virtual volume management table 511 indicates information regarding a virtual volume. In the present example, the virtual volume management table 511 indicates information regarding a virtual volume provided by the node 101 holding the information. The node 101 receives access to a provided virtual volume. The virtual volume management table 511 may hold information regarding a virtual volume which is not included in its local node in preparation for the occurrence of a failure.

The virtual volume management table 511 has an entry for each virtual volume. Each entry includes a virtual volume number, a size (capacity) of the virtual volume, and a list of node numbers of nodes (owner nodes) which are providing destinations of the virtual volume. The size of the virtual volume indicates not a total amount of allocated logical pages but a virtual amount (maximum capacity) of a virtual volume. Each entry also includes information indicating whether or not generation and writing of a redundant code is synchronized with writing of write data to a storage device of its local node. The information regarding synchronization/asynchronization is given for each protection layer. For example, in a case where a protection layer is the protection layer #3 (geo protection layer), if synchronization is set, a delay time increases, and thus asynchronization is set.

The pool volume management table 512 indicates information regarding a pool volume. In the present example, the pool volume management table 512 indicates a pool volume provided by the node 101 holding the table 512 and a pool volume provided by remote node 101. The pool volume management table 512 has an entry for each pool volume. Each entry includes information regarding a pool volume number, a size (capacity) of the pool volume, and a node number of a node providing the pool volume.

The drive management table 513 indicates a drive allocated to each pool volume. In the present example, the drive management table 513 indicates information regarding the drive 105 included in the node 101 holding the table 513.

The drive management table 513 has an entry for each pool volume. Each entry includes a pool volume number, the type (an SSD or an NL-SAS drive) of drive used for the virtual volume, a set of striping drive numbers for the pool volume (a set of drive numbers forming an RAID), and a size (capacity) of the drive. In a case where striping is not performed, only a single drive is allocated to a single pool volume. A plurality of regions in a single drive may be allocated to different pool volumes.

The storage configuration information 504 may include external connection management information for managing a pool volume of remote node as a pool volume of its local node.

FIG. 11 illustrates a second portion of the storage configuration information 504.

Each table included in the second portion indicates failure management information in the distributed storage system.

The drive state management table 514 has an entry for each drive 105 of its local node. Each entry includes a drive number, a state of the drive, error count of the drive, and a redundant code change pointer of the drive. A site including its local node will be referred to as its local site.

The node state management table 515 has an entry for remote node in its local site. Each entry includes a node number, a state of the node, and error count of the node.

The site state management table 516 has an entry for each site in the distributed storage system. Each entry includes a site number, a state of the site, and error count of the site. In the present example, it is assumed that its local node can perform communication with a representative node of remote site. Thus, an error in the representative node indicates an error in the site.

In a case where an error in communication with the drive 105 of its local node, or remote node 101 is detected, the processor 206 of the node 101 increments the error count in the held management information 514 to 516.

If error count in any hardware resource (a drive, a node, or a site) reaches a first threshold value set in advance, the processor 206 changes a state of the resource from a normal state to a warning state. If error count reaches a second threshold value set in advance, the processor 206 changes a state of the resource from a warning state to a closing state. The warning state and the closing state are abnormality states.

FIG. 12 illustrates the cache information 503.

The node 101 holds the unique cache information 503. The cache information 503 includes a data dirty queue 1201, a code dirty queue 1202, an intermediate dirty queue 1203, a clean queue 1204, a free queue 1205, and a cache bitmap table 1206. The dirty queues 1201, 1202 and 1203 indicate data on a cache which is not reflected in the drive 105.

A cell in the queue indicates an entry, and information of the entry corresponds to information in the cache bitmap table 1206, and stores information selected from the cache bitmap table 1206. An arrow in the queue indicates a pointer connecting entries to each other. A black circle indicates a starting point.

The data dirty queue 1201 indicates write data from a host, stored in the drive 105 of its local node. The data dirty queue 1201 includes a queue for a set of a drive stripe type number and a drive number of its local node which is a data storage position. A drive stripe is a stripe of the protection layer #1.

The code dirty queue 1202 indicates data received from remote node in order to generate a redundant code. The data and a redundant code generated by using the data are dirty data. The code dirty queue 1202 includes a queue for each set of a stripe type and a data position. The node 101 belongs to a plurality of protection layers, and thus queues of stripe types of different protection layers are prepared. In other words, the code dirty queue 1202 includes a queue for each set of a node stripe type and a node number which is a storage position of a redundant code, and a queue for each set of a site stripe type and a site number which is a storage position of a redundant code. A node stripe is a stripe of the protection layer #2. A site stripe is a stripe of the protection layer #3.

For example, in the code dirty queue 1202, a queue of "Stripe Type #0" and "Node #0" belongs to a node stripe of a node stripe type number "0", and is a queue for data stored in a node having a node number "0".

The intermediate dirty queue 1203 indicates an intermediate code on a cache which is not reflected in the drive 105. The intermediate code is data generated by using new data and old data. For example, the intermediate code is computed through xor of old data and new data. In other words, the intermediate code is difference data between the new data and the old data. The node 101 can update a redundant code for old data stored in the drive 105 to a redundant code for new data by using the intermediate code. Details of a method of using an intermediate code will be described later.

A configuration of the intermediate dirty queue 1203 is the same as that of the code dirty queue 1202. In other words, the intermediate dirty queue 1203 includes a queue for each set of a stripe type and a data position. The node 101 belongs to a plurality of protection layers, and thus queues of stripe types of different protection layers are prepared.

The clean queue 1204 indicates data on a cache reflected in the drive 105. The free queue 1205 indicates a region of a cache which is not in use.

The cache bitmap table 1206 has an entry for each slot with a predetermined size in a cache. Each entry includes a logical address of data, a cache address (a position on the memory 205) of a slot, a size of the slot, a dirty bitmap indicating whether or not data in the slot is dirty, and a staging bitmap indicating whether or not data in the slot is staged.

The logical address corresponds to a logical address of a stripe described with reference to the log structuring mapping table 508. A logical address of a stripe transmitted from remote node 101 includes, for example, a site number, a node number, an LDEV number, an LBA, and an offset. The dirty bitmap indicates which portion of a region is in a dirty state. The staging bitmap indicates which portion of the region has been staged on a cache. For example, 1 bit corresponds to 1 block of the drive 105.

FIG. 13 illustrates information for controlling the management program 303.

System configuration information 1301 is information regarding a configuration of the system. Resource monitoring information 1302 is information regarding a use situation of a virtual or a physical hardware resource used by a program of the system.

The system configuration information 1301 includes a physical machine configuration management table 1303 indicating configuration information of a physical machine, a virtual machine configuration management table 1304 indicating configuration information of a virtual machine, and a virtual machine arrangement management table 1305 indicating arrangement information of a virtual machine in a physical machine.

The resource monitoring information 1302 includes a CPU/memory/storage management table 1306 indicating information regarding a use situation of each of the processor 206, the memory 205, and the drive 105, and a network management table 1307 indicating information regarding a use situation of the network.

The backup 517 of all or some of the above-described pieces of information may be synchronously or asynchronously preserved in the drive 105.

FIG. 14 illustrates information indicating the system configuration information 1301.

The physical machine configuration management table 1303 has an entry for each of physical machine (node 101) in the distributed storage system. Each entry includes a physical machine number, the maximum resource, and state information. The physical machine number is a number which is allocated to a physical machine and is unique in the system. The maximum resource indicates the maximum number (amount) of hardware resources included in the physical machine, and includes information regarding each of a CPU, a memory, a network, and a storage. The state information includes a normal state, a warning state, a failure state, an addition progress state, and a removal progress state. The normal state indicates that the physical machine normally operates, the warning state indicates a state in which a resource use ratio of the physical machine is high and exceeds a predefined threshold value, and the failure state indicates that the physical machine fails and thus does not operate. The addition progress state indicates a state in which the physical machine is added (joined) to the site 201 as an addition target physical machine, and the removal progress state indicates a state in which the physical machine is excluded (withdraws) from the site 201 as an addition/removal target physical machine.

Specifically, the addition progress state indicates that addition of an addition target physical machine (node 101) to the site protection layer which is an addition destination is in progress in the distributed storage system. The addition progress state indicates that the storage program 302 on each physical machine (node 101) is generating a new static mapping table obtained by adding a column with a new node number to an existing static mapping table, and is generating a redundant code again on the basis of the static mapping table. The removal progress state indicates that exclusion of a removal target physical machine (node 101) from the site protection layer which is a removal destination is in progress in the distributed storage system. The removal progress state indicates that the storage program 302 on each physical machine (node 101) is generating a new static mapping table obtained by excluding a column with a node number of a removal target node is excluded from an existing static mapping table, and is generating a redundant code again on the basis of the static mapping table.

The virtual machine configuration management table 1304 has an entry for each virtual machine in the distributed storage system. Each entry includes a virtual machine number, the maximum resource, and state information. The virtual machine number is a number which is allocated to the virtual machine 307 and is unique in the system. The maximum resource indicates the maximum number (amount) of virtual hardware resources provided by the hypervisor 304 included in the physical machine, and includes information regarding each of a CPU, a memory, a network, and a storage. The state information includes a normal state, a warning state, and a failure state. The normal state indicates that the virtual machine normally operates, the warning state indicates a state in which a resource use ratio of the virtual machine is high and exceeds a predefined threshold value, and the failure state indicates that the virtual machine fails and thus does not operate.

The virtual machine arrangement management table 1305 has an entry for each virtual machine in the distributed storage system. Each entry includes a virtual machine number and a physical machine number. The virtual machine number indicates a number of a disposed virtual machine, and the physical machine number indicates a physical machine which is a location where the virtual machine is disposed.

FIG. 15 illustrates information included in the resource monitoring information 1302.

The CPU/memory/storage management table 1306 has an entry for each virtual machine. Each entry includes a virtual machine number and a use resource. The virtual machine number is a number which is allocated to the virtual machine 307 and is unique in the system. The use resource indicates information regarding a resource which is currently being used by the virtual machine. In a case where the information exceeds a preset threshold value, the management program 303 updates state information of the virtual machine configuration management table 1304 to a warning state.

The network management table 1307 has an entry for each virtual machine, and each entry includes a single source virtual machine number and several target machine numbers. The source virtual machine number indicates a number of a virtual machine which is a transmission source of network I/O, and the target virtual machine number indicates a number of a virtual machine which is a reception destination of the network I/O. The network management table 1307 is a matrix indicating a communication relationship of network I/O between virtual machines. As will be described later, the management program 303 detects a virtual machine group in which a large amount of network I/O is performed between virtual machines, disposes the virtual machine group in the same physical machine, and can thus reduce an amount of network I/O outward the physical machine.

FIG. 16 illustrates internal configurations of the storage program 302 and the management program 303.

Various programs described below are executed by the processor 206. The storage program 302 includes a main process program 1601, a host I/O process program 1602, a cyclic process program 1603, and an event process program 1604.

The host I/O process program 1602 includes a read process program 1605, a collection read process program 1606, a synchronous write process program 1607, and a collection write process program 1608.

The main process program 1601 is initially called when the storage program 302 is activated, and calls the host I/O process program 1602, the cyclic process program 1603, and the event process program 1604 during processes. The main process program performs the processes in a loop form until an end instruction is explicitly received from a user or the management program 303.

The host I/O process program 1602 is a program processing an I/O request in a case where the I/O request (a read request or a write request) for the virtual volume 107 is received from a host, and executes any of the read process program 1605, the collection read process program 1606, the synchronous write process program 1607, and the collection write process program 1608 according to the content of the I/O request. In a case where there are a plurality of I/O requests, the host I/O process program 1602 may execute a loop until processing of all of the I/O requests is completed.

The read process program 1605 is executed in a case where a request from a host is a read request, and reads data designated by the host from a drive or a cache, and returns the data to the host.

The collection read process program 1606 is executed in a case where data on the failure node 101 is a read target in a read process, recovers failure data, and returns the data to the host.

The synchronous write process program 1607 is executed in a case where a request from the host is a write request, and writes data in an address designated by the host.

The collection write process program 1608 is executed in a case where data on a failure node is a write target in a write process, and transmits data to a redundant code node in order to generate a redundant code for data written by the host.

The cyclic process program 1603 includes a destage process program 1609, an asynchronous write process program 1610, and a capacity exhaustion management process program 1611. The cyclic process program 1603 executes a registered program in a constant cycle as a cyclic process. The cyclic process program 1603 may execute other registered programs as a cyclic process.

The destage process program 1609 is a program which stores data (dirty data) on a cache which is not reflected in the drive 105, in the drive 105.

The asynchronous write process program 1610 transmits data which is not transmitted to remote node yet in a protection layer in which asynchronization is designated, to remote node.

The capacity exhaustion management process program 1611 issues a garbage collection request in a case where an amount of data on the drive 105 exceeds a preset target use amount, and tries to erase unnecessary data. Consequently, the storage program 302 can store necessary data in a restricted region.

The event process program 1604 includes a data migration process program 1612, a data copy process 1613, an address solving process 1614, a configuration changing process program 1615, a redundancy destination changing process program 1616, a garbage collection process program 1617, a data retransmission process program 1618, and a data erasure process program 1619. In response to an event request received from remote node via the network, the event process program 1604 executes various programs corresponding to the request content, and returns execution results to remote node. For example, in a case where a garbage collection request is received from remote node, the event process program 1604 executes the garbage collection process program 1617, and returns an execution result to remote node which is an event transmission source.

The data migration process program 1612 is a program executed in response to a request from the management program 303, and is a program which copies data in the virtual volume 107 provided by the storage program 302 to remote virtual volume 107, and then provides the virtual volume 107 which is a copy destination to the host as a new access destination.

The data copy process program 1613 is a program called by the data migration process program 1612, and is a program copying data from the virtual volume 107 which is a migration source to the virtual volume 107 which is a migration destination.

The address solving process program 1614 is a program called by the data copy process program 1613, and is a program which inquires of remote node about a physical address of data of an access destination when accessing a virtual volume of remote node in a state of being externally connected to the virtual volume of remote node. Consequently, the storage program 302 is not required to nest and issue a read request to remote node, and thus it is possible to reduce a network communication amount.

The configuration changing process program 1615 is a program executed in response to a request from the management program 303, and performs addition or removal of a node to or from a protection layer.

The redundancy destination changing process program 1616 is a program called by the configuration changing process program 1615, and is a program which regenerates a redundant code for user data in each node 101 on the basis of configuration change information and a new static mapping table after a configuration is changed.

The garbage collection process program 1617 is called in response to a request from the capacity exhaustion management process program 1611, and erases a redundant code generated by using unnecessary data so as to avoid capacity exhaustion.

The data retransmission process program 1618 retransmits necessary data of its local node to a redundant code node in response to a request from the garbage collection process program 1617 of remote node. Consequently, a new redundant code is generated, and thus not only unnecessary data but also an old redundant code can be erased such that capacity exhaustion of a drive can be avoided.

The data erasure process program 1619 erases unnecessary data of its local node in response to a request from the garbage collection process program 1617 of remote node.

The management program 303 includes a state management process program 1620 and a migration destination selection program 1621.

FIG. 17 illustrates a temporary arrangement pattern table 3000.

The temporary arrangement pattern table 3000 includes an arrangement pattern and network communication cost. The arrangement pattern has an entry for each physical machine which is the node 101. Each entry includes a physical machine number, and numbers of several virtual machines disposed in the physical machine. The network communication cost is network communication cost (communication band) with a virtual machine disposed in another physical machine in network communication between virtual machines.

Hereinafter, a description will be made of an operation of the distributed storage system.

First, a description will be made of an operation of the distributed storage system during normal operation.

FIG. 18 is a flowchart illustrating a read process performed by the storage program 302.

The present process is performed in a case where a read request is issued from a host (for example, the application program 301).

First, the storage program 302 determines whether or not a logical page in a pool volume has been allocated to an access destination virtual page indicated by an address designated in the received read request, by referring to the page mapping table 510 (S1801). The designated address is designated by, for example, a virtual volume number and an LBA. The LBA may be expressed by a starting LBA and a block length. Specifically, the storage program 302 retrieves a corresponding pool volume number and a corresponding LBA on the basis of the designated address by referring to the page mapping table 510. The storage program 302 determines whether or not a logical page has been allocated to a virtual page on the basis of the presence or absence of corresponding address information.

In a case where a logical page has not been allocated (S1801: N), the storage program 302 determines whether or not exclusion is necessary (S1805). The storage program 302 refers to the virtual volume management table 511, and determines that exclusion is not necessary in a case where an owner node of a virtual volume is only its local node.

In a case where exclusion is necessary (S1805: Y), the storage program 302 acquires exclusion (S1806), and determines again whether or not a logical page in a pool volume has been allocated to a virtual page (S1807). As an example of an exclusion method, the storage program 302 specifies a representative node which is uniquely defined on the basis of a read address by using a hash function, and requests the representative node to perform adjustment, and the representative node performs the adjustment.

In a case where a logical page has been allocated (S1807: Y), the storage program 302 cancels exclusion (S1814), and proceeds to step S1802. In a case where a logical page has not been allocated (S1807: N), the storage program 302 returns zero data (S1808), and determines whether or not exclusion is necessary in the same manner as in the determination in step S1805 (S1809). In a case where exclusion is necessary (S1809: Y), exclusion is already acquired, and thus the storage program 302 releases exclusion (S1810).

In a case where the logical page has been allocated in step S1801 (S1801: Y), and the logical page in the pool volume of its local node is allocated to the virtual page (S1802: Y), the storage program 302 secures a cache region of its local node (S1803), reads data from the pool volume, and returns the read data to the host (S1804). The storage program 302 determines whether or not the logical page in the pool volume of its local node is allocated to the virtual page by referring to the pool volume management table 512 and the external connection management information.

In a case where a logical page in the pool volume 401B of remote node 101 is allocated to the virtual page via the pool volume 401A of its local node, it is determined that the logical page in the pool volume of remote node is allocated to the virtual page.

In securing a cache region, the storage program 302 refers to the cache information 503, and specifies a cache region correlated with a target logical address. In a case where a cache region is not present, the storage program 302 secures a new region from the free queue 1205. In a case where the free queue 1205 is vacant, the storage program 302 secures a new region from the clean queue 1204. In a case where the clean queue 1204 is vacant, the storage program 302 destages a region in the dirty queue 1201, 1202 or 1203, so as to change the region to a free region.

In a case where the logical page in the pool volume 401B of remote node is allocated to the access destination virtual page (S1802: N), it is determined whether or not remote node which is a transmission destination of the read request is in a failure state on the basis of the node state management table 515 (S1811). In a case where remote node which is a transmission destination is not in a failure state (normal state) as a result of the determination in step S1811 (S1811: N), the storage program 302 transmits the read request to the node 101 which is remote node (S1812). Consequently, remote node 101 performs a read process according to this flowchart. The storage program 302 does not cache read data in its local node. In other words, if a logical page allocated to a virtual page is present in remote node, the storage program 302 does not cache read data (read through) in the memory 205 of its local node, and remote node 101 caches the read data. In a case where remote node which is a transmission destination is in a failure state as a result of the determination in step S1811 (S1811: Y), a collection read process is called so as to be performed (S1813).

FIG. 19 is a flowchart illustrating a synchronous write process performed by the storage program 302.

The present process is performed in a case where a write request is issued from a host (for example, the application program). In the present process, write data is stored in a pool volume of its local node, and the write data is also transmitted to the node 101 which is remote node in order to generate an inter-node redundant code and an inter-site redundant code.

First, the storage program 302 of the node 101 receiving the write request determines whether or not a logical page in a pool volume has been allocated to an access destination virtual page (S1901).

In a case where a logical page has not been allocated (S1901: N), the storage program 302 performs a process of allocating a virtual page to the pool volume. First, the storage program 302 determines whether or not exclusion of update of the page mapping table 510 is necessary (S1911). Exclusion is acquired to prevent a plurality of different logical pages from being allocated to a virtual page in a case where remote node 101 simultaneously performs allocation.

By referring to the virtual volume management table 511, the storage program 302 determines that exclusion is necessary in a case where nodes including its local node are included in owner nodes, and determines that exclusion is not necessary in a case where an owner node is only its local node. In a case where exclusion is necessary (S1911: Y), the storage program 302 acquires exclusion (S1912). A method of acquiring exclusion is the same as the method described in the read process.

Next, the storage program 302 determines again whether or not a logical page has been allocated to the virtual page (S1913). This is because exclusion may be acquired by remote node after it is determined whether or not a logical page has been allocated to the virtual page in step S1901 and before exclusion is acquired in step S1912.

In a case where a page has not been allocated (S1913: N), the storage program 302 determines a pool volume to be allocated to the virtual page and a logical page therein (S1914). Here, the storage program 302 checks whether or not there is a vacant page in the pool volume of its local node. Specifically, the storage program 302 selects a pool volume and a logical page therein, specifies a stripe type of the logical page by using the static mapping table 506, and determines whether or not an actually used amount is smaller than the target use amount in an entry of the stripe type in the local region amount table 804. In a case where the actually used amount is smaller than the target use amount, the storage program 302 allocates the logical page in the pool volume of its local node to the virtual page. In a case where there is no vacant page in its local node, the storage program 302 locally mounts a pool volume of remote node through the external connection function, and allocates a vacant page therein to the virtual page.

In a case where the pool volume is determined, the storage program 302 allocates a logical page in the pool volume to the virtual page (S1915). Specifically, the storage program 302 updates a correspondence relationship in the page mapping table 510.

Next, the storage program 302 determines whether or not exclusion is necessary (S1916). This determination is the same as in step S1911. In a case where exclusion is necessary (S1916: Y), or in a case where a page has been allocated in step S1913 (S1913: N), the storage program 302 releases the acquired exclusion (S1917). In a case where exclusion is not necessary (S1916: N), the storage program 302 proceeds to step S1902.

In a case where the logical page has been allocated in step S1901 (S1901: Y), the storage program 302 determines whether or not the pool volume of its local node is allocated to a logical address (virtual page) in a virtual volume of the write request by referring to the page mapping table 215 (S1902).

In a case where the pool volume of its local node is not allocated (S1902: N), next, it is determined whether or not remote node which is a transmission destination of the write request is in a failure state on the basis of the node state management table 515 (S1918). In a case where remote node which is a transmission destination is not in a failure state (normal state) as a result of the determination in step S1918 (S1918: N), the storage program 302 transmits the write request to remote node 101 (S1918). Remote node 101 performs a synchronous write process according to this flowchart. The storage program 302 does not cache write data in its local node in order to maintain data coherency. In a case where remote node which is a transmission destination is in a failure state as a result of the determination in step S1918 (S1918: Y), the storage program 302 calls and performs a collection write process (S1920).

In a case where the pool volume of its local node is allocated to the virtual page (S1902: Y), the storage program 302 starts a write process for each protection layer (S1903 to S1910). For example, in a case where the distributed storage system is formed of three protection layers, the storage program 302 repeatedly performs a total of three processes in the three layers. In the present example, the node protection layer is set to synchronous write.

The storage program 302 determines whether or not the layer is a synchronous write target (S1903). Specifically, the storage program 302 performs the determination by referring to the Sync/Async field corresponding to a write target virtual volume in the virtual volume management table 511.

In a case where the layer is not a synchronous write target (S1903: N), the storage program 302 records "uncompleted" in a region state field of the data mapping table 701 without transmitting the write data (stripe) to remote node 101. The state field indicates a state of each protection layer. Data on a cache of which a state field indicates "uncompleted" is maintained until being transmitted.

The storage program 302 determines whether or not processes in all of the protection layers are completed (S1910), and finishes the preset process in a case where the processes are completed. In a case where the processes are not completed (S1910: N), the storage program 302 repeatedly performs a process in the next protection layer from step S1903. In a case where the layer is a synchronous write target (S1903: Y), the storage program 302 secures a cache in a cache region of its local node (S1904). A method thereof is the same as the method in the read process.

Next, the storage program 302 specifies a stripe type of the write data, and determines a redundant code node which is a transmission destination of the write data (S1905). The storage program 302 specifies a redundant code node according to the following method. The storage program 302 calculates a stripe position number in the static mapping table 506 on the basis of a designated address, and determines a stripe type number (an element of the static mapping table) by referring to the static mapping table of the protection layer on the basis of the calculated stripe position number and its local node number. The storage program 302 determines a redundant code node on the basis of the stripe type number by referring to the static mapping table 506 of the protection layer. The storage program 302 determines a redundant code node in which an inter-node redundant code is finally stored by referring to, for example, the static mapping table 506 of the protection layer #2. The storage program 302 determines a redundant code site (a site in which a redundant code of the protection layer #3 is stored) by referring to, for example, the static mapping table 507 of the protection layer #3. For example, a representative node of each site is set in advance, and the storage program 302 determines a representative node of a redundant code site as a redundant code node.

Next, the storage program 302 determines whether or not an intermediate code is to be transmitted (S1906). The intermediate code indicates an update difference between old data (the latest data hitherto) and new data (data to be written this time). For example, in a case of a redundant code corresponding to RAID5, the intermediate code is a value obtained through xor of the old data and the new data. In a case of using erasure coding, the storage program 302 may generate a plurality of xor results multiplied by coefficients of matrices.

Any criterion may be used as a determination criterion for whether or not the intermediate code is required to be transmitted. For example, in a case where a residual amount of a redundant code region of the redundant code node is smaller than a threshold value, the storage program 302 determines that the intermediate code is required to be transmitted. Consequently, the redundant code node can reliably store a necessary redundant code. In this case, the storage program 302 acquires information regarding a local region amount of the redundant code node from the redundant code node.

In a case where a response reduction effect during cache hit in its local node is small, the storage program 302 may generate an intermediate code. For example, in a case where a write-through mode is set in its local node, a drive is used for a predetermined low delay time in its local node, its local node is in a load state of being more than a threshold value, or a communication distance between nodes is more than a threshold value, the storage program 302 determines that the intermediate code is required to be transmitted.

Alternatively, in a case where the write service life of the drive 105 sufficient remains, the storage program 302 may determine that the intermediate code is required to be transmitted. In the write-through mode, the storage program 302 destages write data from the cache to the drive 105, and then returns a completion response to the host.

In a case where it is determined that the intermediate code is required to be transmitted (S1906: Y), the storage program 302 generates the intermediate code on the basis of the new data on the cache and the old data read from the drive 105 (S1907), and writes the intermediate code to the cache of the redundant code node (S1908). The storage program 302 transmits the intermediate code to the redundant code node along with its local address information (a site number, a node number, an LDEV number, an LBA, and migration length (TL)) and an identifier indicating the intermediate code. The LDEV number is an identifier of a pool volume.

In the redundant code node, in a case where there is dirty data of the same transmission source address as that of the intermediate code, the storage program 302 of the redundant code node calculates xor of the intermediate code and the dirty data, and updates data on the cache. The storage program 302 of the redundant code node connects information regarding the intermediate code to the intermediate dirty queue 1203. The redundant code node may calculate xor of an intermediate code from a differing transmission source, which is a basis of the same redundant code, and may update data on the cache.

In a case where it is determined that the intermediate code is not to be transmitted in step S1906 (S1906: N), the storage program 302 transmits the write data to the redundant code node, and the redundant code node stores the received write data in the cache (S1909). The transmission source node of the write data transmits the write data along with its local address information (a site number, a node number, an LDEV number, an LBA, and a TL) of the transmitted data, and an identifier indicating normal data. In the redundant code node, the storage program 302 connects information corresponding to the write data to the corresponding code dirty queue 1202.

FIG. 20 is a flowchart illustrating an asynchronous write process performed by the storage program 302.

The present process is performed asynchronously with host I/O, and data which is not transmitted to remote node yet in a protection layer in which asynchronization is designated, is transmitted to remote node. Steps S2002 to S2009 in the asynchronous write process are the same as steps S1904 to S1910 in the synchronous write process. Herein, only a difference from the synchronous write process will be described. In each node 101, the storage program 302 performs the present process on all registered virtual volumes by referring to the page mapping table 510.

The storage program 302 determines whether or not a target virtual page is an asynchronous write target (S2001). Specifically, the storage program 302 checks a state of a logical page in a pool volume corresponding to the virtual page in the data mapping table 701. In a case where the state is an "uncompleted" state in the protection layer, the storage program 302 determines that the virtual page is an asynchronous write target (S2001: Y), and proceeds to step S2002.

In a case where the process on all of virtual pages is completed (S2009: Y), the storage program 302 finishes this flow. The storage program 302 may perform the asynchronous write process periodically or normally. The storage program 302 may dynamically change an execution frequency of the present process or a transmission speed according to an amount of pages in an "uncompleted" state.

For example, in a case where the protection layer #3 (geo protection layer) is set to asynchronization in the information regarding synchronization/asynchronization of the virtual volume management table 511, data transmission between sites is not performed in response to a write request, and thus a response time of the application program 301 can be prevented from increasing.

FIG. 21 is a flowchart illustrating a destage process performed by the storage program 302.

The present process is performed asynchronously with host I/O in a case where there is dirty data in the drive 105, that is, non-reflected data on a cache. Two kinds of dirty data are present on the cache. One is write data stored in the drive 105 of its local node. The other is data transmitted from remote node 101 in order to generate a redundant code. Here, the data transmitted from remote node includes an intermediate code. The dirty data is managed in the data dirty queue 1201, the code dirty queue 1202, and the intermediate dirty queue 1203. The flowchart illustrates a destage process on dirty data managed in the data dirty queue 1201 and the code dirty queue 1202.

First, the storage program 302 finds target dirty data by referring to the data dirty queue 1201 and the code dirty queue 1202. The storage program 302 determines whether or not the target data is write data to be stored in the drive 105 of its local node (S2101). In a case where the target data is indicated by the data dirty queue 1201, the target data is write data.

In a case where the target data is write data (S2101: Y), the storage program 302 writes the write data to the drive 105 of its local node (S2107). The data is stored in a log structuring format. As illustrated in the log structuring mapping table 508, in a case where write data is stored in the drive 105 in a log structuring format, the storage program 302 records a correspondence relationship between a pool volume address and a drive address, and a state of data in the data mapping table 701.

In a case where there is no vacant region in the drive 105, the storage program 302 may perform a capacity exhaustion management process which will be described later and then write data to the drive 105.

The storage program 302 determines whether or not all pieces of dirty data have been processed (S2106). In a case where processing on all of the pieces of dirty data is completed (S2106: Y), the storage program 302 finishes this flow.

In a case where the target data is not write data, that is, the target data is data (data received from remote node) for generating a redundant code (S2101: N), the storage program 302 finds dirty data of the same stripe type (S2102).

Specifically, the storage program 302 acquires a plurality of pieces of write data transmitted from remote node 101, including target data in a queue of the target data in the code dirty queue 1202. The storage program 302 acquires X pieces of data as much as possible according to arrangement policy (XDYP: the number Y of redundant codes with respect to the maximum number X of pieces of user data) indicating policy for data protection designated by a user in advance. The arrangement policy will be described later.

Specifically, the storage program 302 selects as many stripes as possible within a scope not exceeding the number of data nodes indicated by the static mapping table 506 or 507. Consequently, the storage program 302 can perform redundancy satisfying arrangement policy as much as possible. Transmission source nodes of write data selected here are different from each other. In a case where a queue of target data indicates write data from all data nodes belonging to the stripe type, the storage program 302 selects the write data from all of the data nodes. When a stripe is selected, any logical address in a transmission source node may be used.

As mentioned above, the number of pieces of write data for generating a redundant code is not fixed but variable. A set of logical addresses of write data for generating a redundant code is also variable. Consequently, the storage program 302 can efficiently generate a redundant code by using only transmitted write data. In a case where there is no write data of the same stripe type from remote node 101 in the code dirty queue 1202, the storage program 302 may store a single piece of target data in the drive 105 as a redundant code. When data is destaged, data from a transmission source node is transmitted in synchronization with frontend write, and, thus, at that time, write data is not written to a drive of the transmission source node, and may be overwritten on a cache if a new synchronous write process is performed before the data is destaged. Thus, in a redundant code node, the transmission source node is required to use only destaged data for generation of a redundant code. In order to realize this, the transmission source node may notify the redundant code node that the data is destaged. However, in a case where the transmission source node transmits data to the redundant code node at a destage timing, the redundant code node may disregard this condition.

The storage program 302 may find dirty data from a queue of the same stripe type in the intermediate dirty queue 1203. The storage program 302 calculates xor of a corresponding redundant code and an intermediate code, stored in the drive 105, so as to update the redundant code. In a case where the updated redundant code is generated from only write data of a node which is different from a transmission source node of target data, the storage program 302 generates a new redundant code by using the target data and the updated redundant code.

The storage program 302 may select write data for generating a redundant code such that a ratio of old write data becomes as high as possible. In a case where a redundant code can be generated by using only old write data, the storage program 302 selects only a stripe of the old write data, and generates a redundant code. Since a ratio of old data in generation of a redundant code is increased, the time when the redundancy code becomes invalid data can be advanced, and a free space of a redundant code storage region can be efficiently increased.

The storage program 302 calculates a redundant code by using the selected write data, and writes the redundant code to the drive 105 (S2103 and S2104).

In a case where a redundant code is written by using a combination of a plurality of pieces of user data, and then remote node is required to generate a redundant code by using the combination, the storage program 302 notifies remote node of combination information of user data used to generate the redundant code. For example, the storage program 302 notifies remote node of a node number, a stripe number, a drive number, and an LBA of the user data used to generate the redundant code as the combination information. Remote node receiving the notification generates second and subsequent redundant codes on the basis of the combination information. Consequently, a plurality of redundant code nodes can generate a redundant code by using the same combination of user data.

Writing for the drive 105 is additional writing in a log structuring format in the fundamentally same manner as in step S2107. Consequently, reading of old data is omitted, and thus it is possible to efficiently realize generation of a redundant code and a drive write process.

The storage program 302 records a correspondence relationship between a physical region as a storage position of the calculated redundant code and the logical page in the pool volume in the redundant code mapping table 702 instead of the data mapping table 701. The storage program 302 records a correspondence relationship between a pool volume address and a drive address in the inverse mapping table 703. Since a redundant code is generated by using a plurality of pieces of write data, the inverse mapping table 703 has a plurality of references for a single drive address.

If the redundant code is written to the drive 105, the storage program 302 changes the redundant code to a clean queue, and notifies the transmission source node of write completion (S2105). The transmission source node receiving the notification changes a state of the target protection layer of the target data in the data mapping table 701 to "completed". The state field is referred to in order to determine whether or not the data is a retransmission target during the occurrence of a node failure. If processing on all of the pieces of dirty data is completed (S2106: Y), the storage program 302 finishes this flow. If otherwise, the storage program 302 processes the next dirty data in step S2101.

In destaging of the intermediate code, the storage program 302 generates a new redundant code by using the old redundant code and the intermediate code stored in the drive 105, and overwrites the new redundant code on the old redundant code in the drive 105. Overwriting is performed, and thus the log structuring mapping table 508 is not changed. Update of a redundant code using an intermediate code requires reading of old data from a data node, but a use amount of a local region in a redundant code node can be reduced.

In a case where a plurality of intermediate codes for a single redundant code are present in the intermediate dirty queue 1203, the storage program 302 calculates xor of all of the intermediate codes so as to generate a new intermediate code, and updates the redundant code by using the new intermediate code. A plurality of intermediate codes corresponding to the same redundant code include data of different generations of the same logical address and intermediate codes of the different nodes 101.

The storage program 302 can recognize a physical address of a redundant code for an intermediate code selected from the intermediate dirty queue 1203 by using the redundant code mapping table 702. The storage program 302 can specify a logical address of an intermediate code corresponding to the redundant code by using the inverse mapping table 703.

Specific examples of update of a redundant code will now be described. Hereinafter, as an example, RAID6 using a Reed-Solomon code will be described as erasure coding (d=3, and p=2). Galois coefficients are assumed to be A1 to A3.

(1) Code dirty queue 1202

The storage program 302 selects dirty data X1 to X3 from the code dirty queue 1202, and calculates a redundant code P1 or P2 according to the following equations.

$P1 = X1 \text{xor} X2 \text{xor} X3$ $P2 = (X1*A1)\text{xor}(X2*A2)\text{xor}(X3*A3)$ The redundant codes P1 and P2 are respectively written into new regions of a storage device of its local node.

(2) Intermediate dirty queue 1203

The storage program 302 extracts new intermediate dirty data M1 or M2 corresponding to old redundant codes P1$o$ or P2$o$ written to the drive 105 of its local node, from the intermediate dirty queue 1203. The number of pieces of intermediate dirty data may not be two. The storage program 302 calculates a new intermediate code MP1 or MP2 according to the following equations.

$MP1 = M1 \text{xor} M2$ $MP2 = (M1*A1)\text{xor}(M2*A2)$

The storage program 302 calculates a new redundant code P1 or P2 according to the following equations.

$P1 = P1o \text{xor} MP1$ $P2 = P2o \text{xor} MP2$

The new redundant code P1 or P2 is overwritten into the old regions (P1$o$, P2$o$).

The storage program 302 may generate a redundant code by using write data of the preset number d or smaller of data. In this case, the storage program 302 generates a redundant code by using lacking write data as 0 data.

For example, in a case where the number d of data is set to 3, the storage program 302 generates a redundant code by using three pieces of write data X1, X2, and X3. However, in a case where the third write data X3 is not transmitted from remote node indefinitely, the storage program 302 cannot destage the other inserted write data X1 and X2. Therefore, the storage program 302 generates a redundant code by using the lacking write data X3 as 0 data as follows, and performs destaging.

$P = X1 \text{xor} X2 \text{xor} 0$

In a case where lacking write data is transmitted from remote node after a redundant code is generated with respect to the redundant code generated by using write data of the number smaller than the number d of data, the storage program 302 may update the redundant code by using the write data. For example, the storage program 302 updates the redundant code P generated in the above example as follows, so as to generate a new redundant code Pn.

$Pn = P \text{xor} X3$

As mentioned above, in a case where there is a redundant code generated by using write data of the number smaller than the number d of data during destaging, the storage program 302 may find the redundant code, and may update the redundant code by using lacking write data. Consequently, a transmission source node of write data can update a redundant code without generating an intermediate code, and can thus efficiently use a restricted capacity.

As described above, the redundant code node dynamically selects write data from among pieces of write data of a single stripe type, and generates a redundant code by using the selected write data. Consequently, the redundant code node can efficiently generate a redundant code by using transmitted write data without using an existing redundant code.

In the present example, in a case where the redundant code node dynamically selects write data, at least one of a combination of pieces of selected write data and the number of stripes is variable. In the above example, the redundant code node independently selects write data from both of the number of stripes and a combination of addresses, but one thereof may be fixed. Here, addresses in the address combination are addresses designated by a node, a pool volume, and a pool volume address.

A log structuring method may not be applied to writing of a redundant code to the drive 105. In other words, the redundancy code node may rewrite an old redundant code to a new redundant code without additionally writing the new redundant code generated by using the same address combination as that of the old redundant code into a local region. In a configuration of not using a log structuring method, a redundant code generated by using an address combination which is different from that of all of existing redundant codes is additionally written into the local region.

In the above example, the redundant code node generates a redundant code by using only write data of a predefined stripe type. The distributed storage system may determine a combination of write data by using other rules without defining a stripe type for a pool volume address, and may generate a redundant code by using the combination.

Herein, a description will be made of a capacity exhaustion management process performed by the storage program 302.

First, in a case where the capacity exhaustion management process program 1611 in the storage program 302 of the node 101 detects that an actually used amount of any stripe type of a write data type exceeds a target use amount in its local node, the capacity exhaustion management process is performed.

Next, the capacity exhaustion management process program 1611 designates information regarding a reduction target stripe type, and issues a capacity reduction process request to a redundant code node storing a redundant code of a stripe type of which capacity exhaustion is detected. The redundant code node receiving the capacity reduction process request erases the redundant code generated by using the reduction target data type, so as to secure a free space in a capacity which is a capacity reduction request target.

Here, the redundant code node has no meaning to hold a redundancy code corresponding to all of pieces of invalid write data any more, and may immediately erase the redundant code. However, if a redundant code corresponding to at least one piece of valid write data is erased, the redundancy of valid write data is reduced, and thus the redundant code node cannot erase the redundant code. Therefore, before a redundant code is erased, the redundant code node determines whether write data used to generate the redundant code is valid or invalid, and, in a case where the write data is valid, the redundant code node receives the valid data again, and generates a new redundant code by using the received valid data and other pieces of valid data present on a cache, so that the redundancy of valid write data is not reduced.

FIG. 22 is a flowchart illustrating a capacity exhaustion management process performed by the storage program 302.

In the present process, data is tried to be erased in a case where any actually used amount exceeds a target use amount. Consequently, the distributed storage system can store necessary data in a restricted region. An erased data type is a write data type and a redundant code type. The storage program 302 may perform the present process asynchronously with host I/O. A relationship between the actually used amount and the target use amount is indicated by the local region amount table 804.

First, the storage program 302 determines whether or not an actually used amount of a selected target data type exceeds a target use amount by referring to the local region amount table 804 (S2301).

In a case where the actually used amount of the target data type does not exceed the target use amount as a result of the determination in step S2301 (S2301: N), the storage program 302 finishes the capacity exhaustion management process. In a case where the actually used amount of the target data type exceeds the target use amount as a result of the determination in step S2301 (S2301: Y), the storage program 302 performs a capacity reduction process (S2302). Here, in a case where a data type of which the actually used amount exceeds the target use amount is write data, the storage program 302 of a capacity excess node which is a node in which capacity excess is detected designates information regarding a data type of which the actually used amount exceeds the target use amount, and issues a capacity reduction request for requesting a capacity reduction process to a redundant code node which is a node storing a redundant code for the write data. In a case where a data type of which the actually used amount exceeds the target use amount is a redundant code, the storage program 302 of its local node performs a capacity reduction process.

Next, the capacity reduction process will be described.

If the capacity reduction request is received (S2305), the redundant code node retrieves a redundant code which is an erasure target by referring to the log structuring mapping table 508 (S2306). During retrieval, in a case where a request source node of the capacity reduction process is remote node, data desired to be erased is invalid write data of remote node, and thus the redundant code node retrieves a redundant code including the invalid write data of remote node. In a case where a request source node of the capacity reduction process is its local node, data desired to be erased is a redundant code of its local node, and thus the redundant code node retrieves the redundant code. In this case, the redundant code node retrieves a redundant code generated by using invalid write data if at all possible, and thus it is possible to reduce the number of issuing a data retransmission process which will be described later and thus to reduce a network communication amount.

Next, the redundant code node determines whether or not write data used to generate the redundant code node is invalid data with respect to the redundant code as a retrieval result (S2307). For example, the redundant code node may provide a flag indicating whether write data used to generate a redundant code in the inverse mapping table 703, and may perform determination by using the flag, and may inquire of a node storing each piece of write data about whether write data is valid or invalid.

In a case where the write data used to generate the redundant code is invalid write data as a result of the determination in step S2307 (S2307: N), the redundant code node issues an erasure request for requesting a data erasure process on the invalid write data to a data node which is a node storing the invalid write data (S2309).

Herein, the data erasure process will be described. The data node receiving the erasure request erases the data which is an erasure request target as the data erasure process, and returns a completion response to the request source node (S2317 to S2319). Specifically, the data node deletes the erasure target write data from the invalid list 802 of the local region control table 509, and reconnects the data to the free list 803.

In a case where the write data used to generate the redundant code is valid write data as a result of the determination in step S2307 (S2307: Y), the redundant code node issues a data retransmission request for requesting a data retransmission process on the invalid write data to a data node which is a node storing the valid write data (S2308).

Herein, the data retransmission process will be described. The data node receiving the retransmission request reads the data which is a retransmission request target from the drive 105 or a cache, retransmits the data to the request source node (the redundant code node of the write data) as the data retransmission process, and returns a completion response (S2314 to S2316). In the redundant code node, the retransmitted valid data is reconnected to the code dirty queue 1202 of the cache information 503, and a redundant code is generated by the destage process program 1609 again so as to be written to the drive 105.

Next, the redundant code node determines whether or not the data erasure process or the data retransmission process is completed with respect to the write data used to generate the erasure target redundant code (S2310). In a case where the process is not completed as a result of the determination in step S2310 (S2310: N), the redundant code node performs again the processes in steps S2307 to S2309 on write data on which the process is not completed. In a case where the process is completed as a result of the determination in step S2310 (S2310: Y), the redundant code node erases the erasure target redundant code since the data erasure process or the data retransmission process is completed with respect to all pieces of write data used to generate the erasure target redundant code (S2311). Here, specifically, the redundant code node deletes a relationship between the drive address and the pool volume address of the target region in the redundant code mapping table 702, deletes the target region from the invalid list 802, reconnects the target region to the free list 803, and reduces the actually used amount of the corresponding redundant code type in the local region amount table 804.

Next, the redundant code node determines whether or not all redundant codes generated by using the data type which is an erasure request target or all redundant codes of the data type which is an erasure request target have been retrieved (S2312). In a case where all redundant codes have not been retrieved as a result of the determination in step S2313, the redundant code node executes steps S2306 to S2311 (S2312: N). In a case where all redundant codes have been retrieved as a result of the determination in step S2313 (S2312: Y), the redundant code node notifies the capacity excess node which is a request source of the capacity reduction process that erasure of a redundant code is completed, and finishes the process (S2313).

Hereinafter, a description will be made of an operation of the distributed storage system during the occurrence of a failure.

FIG. 23 is a flowchart illustrating a configuration management process in the management program 303 and the storage program 302.

The present process is realized by two programs such as the management program 303 and the storage program 302. Through the present process, processes of when a configuration is changed due to a node failure, node removal, node addition, and the like are performed.

First, a description will be made of a state management process performed by the management program 303 of a specific state management node among the nodes 101. The state management node is a node on which the management program 303 operates, may be all of the nodes 101, and may be some nodes set in advance.

The management program 303 acquires resource use information from the hypervisor 304 and the virtual machine 307 (S2401).

Next, the management program 303 updates the acquired resource use information to the resource monitoring information 1302 (S2402). Here, the management program 303 reflects the resource use information acquired from each physical machine or virtual machine in an entry of the resource monitoring information 1302 corresponding to the physical machine or the virtual machine which is an acquisition source. Thereafter, the management program 303 refers to the reflected entry, and updates state information of the system configuration information 1301 to a warning state in a case where a resource use situation exceeds a threshold value set in advance by a user or the system. A node (physical machine) or the virtual machine 307 to which an error is returned during communication required to acquire a resource updates the state information of the system configuration information 1301 to a failure state.

Next, the management program 303 refers to the system configuration information 1301 so as to check states of the physical machine and the virtual machine (S2403).

Next, the management program 303 determines whether or not a node (physical machine) of which a state is a failure state by referring to the system configuration information 1301 (S2404). In a case where there is no node (physical machine) in a failure state as a result of the determination in step S2404 (S2404: N), the management program 303 proceeds to the next step S2405. In a case where there is a node (physical machine) in a failure state as a result of the determination in step S2404 (S2404: Y), the management program 303 reactivates the storage program 302 operating on the node (physical machine) in a failure state on remote node (physical machine) which normally operates. As described above, each node 101 backs up control information in the memory 205 in the backup 517 of the drive 105 of remote reactivation destination node (physical machine), and thus the reactivation destination node reactivates the storage program operating on a failure node while maintaining the control information. The reactivation destination node may reactivate the storage program 302, as a new virtual machine, having operated on the failure node, on a physical machine operating as the reactivation destination node, and may reactivate the storage program having operated on the failure node on a virtual machine on which remote storage program is operating, according to a separate process.

The storage program 302 reactivated in the reactivation destination node from the failure node provides a virtual volume to a host. However, the virtual volume does not have the drive 105, and, in a case where a host accesses the virtual volume, the collection read process program 1606 and the collection write process program 1608 which will be described later are executed, and then a result is returned to the host.

Next, the management program 303 issues a configuration change request for requesting a configuration changing process to the failure node and all nodes included in the protection layer (S2408). In this case, the configuration change request includes a node number of a configuration change target (for example, an addition target or a removal target). The configuration changing process performed by the storage program 302 will be described later.

Next, the management program 303 selects a node which is a migration destination of a virtual machine for operating an application program having operated on the failure node (S2409). In a virtual machine migration destination selection process, a use state of resources of each node is checked, and a migration destination node which is a recovery destination of a virtual machine on the failure node is selected such that a resource use load on each node is distributed. Details of the migration destination selection process will be described later.

Next, the management program 303 issues, to a storage program of the migration destination node, a data migration request for requesting data on a virtual volume provided by the storage program 302 having operated on the failure node to be transferred to a virtual volume of the migration destination node of the virtual machine for the application program (S2410). Consequently, the reactivation destination node recovers data on the failure node, and can thus migrate the data to a surviving node. In a case where data is temporarily recovered in a spare region by using a spared node, it is necessary that the failure node is replaced with remote node, and then the temporarily recovered data is rewritten to the replaced node from the spared node, and thus the number of maintenance processes required for recovery increases. In the present process, a process of removing the failure node (that is, excluding the failure node from the protection layer) and a data recovery process are simultaneously performed, and thus replacement of a node or rewriting of temporary data is not necessary, so that there is an effect of reducing the number of maintenance processes required for recovery.

Next, if the migration of the data is completed, the management program 303 migrates the virtual machine to the migration destination node (S2411).

Next, the management program 303 determines whether or not the current process is a failure recovery process, and stops the reactivated storage program and finishes this flow (S2413) in a case where the process is the failure recovery process (S2412: Y). For example, the management program 303 executes a failure recovery process route (S2407), and thus stores an ID of a virtual machine on which the storage program of the reactivation destination node operates in a memory when the storage program 302 of the failure node is reactivated in the reactivation destination node. In S2413, the management program 303 refers to the stored virtual machine ID, and stops a virtual machine on which a storage program operates if there is the storage program reactivated from the failure node. In a case where the process is not the failure recovery process (S2412: N), the state management process is finished.

In the state management process, in addition to the failure recovery process, a node addition/removal process and a resource use load distribution (rebalance) process among a plurality of nodes (physical machines) may be performed.

In step S2405, the management program 303 determines whether or not there is a physical machine addition/removal request. Specifically, if a node addition/removal request is received from the user or the system, the management program 303 updates a corresponding entry of the state information of the physical machine configuration management table 1303 of the system configuration information 1301 to addition progress or removal progress according to the request content, and determines whether there is an addition request or a removal request by referring to the state information. In this case, the management program 303 may receive the addition request or the removal request, and then may perform rebalance of a virtual machine by continuously issuing a configuration change request to the storage program.

In a case where there is the addition/removal request as a result of the determination in step S2405 (S2405: Y), steps S2408 to S2413 are executed. In a case where there is no addition/removal request as a result of the determination in step S2405 (S2405: N), step S2406 is executed.

In step S2406, the management program 303 determines whether or not the virtual machine is required to be rebalanced to a plurality of physical machines in order to distribute resource use since there is a bias in a resource use state in a physical machine (S2406). Specifically, the management program 303 determines whether or not a state is a warning state by referring to the state information of the system configuration information 1301. In a case where the state information indicates a warning state, the management program 303 determines that rebalance of the virtual machine is necessary since a resource use state exceeds a threshold value.

In a case where rebalance of the virtual machine is necessary as a result of the determination in step S2406 (S2406: Y), the management program 303 executes steps S2409 to S2413, and performs a virtual machine rebalance process on the physical machine or the virtual machine. In a case where rebalance of the virtual machine is not necessary as a result of the determination in step S2406 (S2406: N), the management program finishes this flow.

Next, the configuration changing process will be described.

If a configuration change request is received, the storage program 302 acquires an addition/removal target node number from the requested configuration change request (S2414), and generates a new static mapping table on the basis of the addition/removal target node number (S2415).

In the example illustrated in FIG. 1, in a case where a failure occurs in the node #0, the storage program 302 removes a node with the node #0 from the static mapping table 506A before a configuration change, so as to generate the new static mapping table 506B after a configuration change.

In the static mapping table generation process, first, a single stripe type is selected from the static mapping table 506A before a configuration change.

In the example illustrated in FIG. 1, the storage program 302 selects the stripe type number "3". Next, the storage program 302 exchanges a stripe with the selected stripe type number "3" with a stripe with a stripe type number allocated to the removal target node #0. Specifically, the storage program 302 exchanges the stripe type number "0" of D0 (the node number=0, and the stripe position number=0) of the node #0 with the stripe type number "3" of D0 (the node number=3, and the stripe position number=0) of the node #3, exchanges the stripe type number "2" of D1 of the node #0 with the stripe type number "3" of D1 of the node #2, and exchanges the stripe type number "1" of P of the node #0 with the stripe type number "3" of P of the node #1. In the above-described way, the storage program 302 generates the new static mapping table 506B after a configuration change. In a case where a node is added, reversely to the removal process, the storage program 302 defines a new stripe type number on the addition target number, exchanges the stripe type number with a stripe type number of each node such that the same stripe type is not repeated in the same node (the same column), and thus generates a new static mapping table after a configuration change.

Next, the storage program 302 performs a redundancy destination changing process on the basis of the static mapping table after a configuration change (S2416). In the redundancy destination changing process, a redundancy destination (a redundant code storage destination, for example, a redundant code node) is determined for write data stored in each node on the basis of the new static mapping table, and a new redundant code is generated again. Thereafter, a redundant code generated on the basis of the old static mapping table is not necessary and is thus deleted. Consequently, since protection layer can be updated without moving write data, the application program and arrangement of data accessed by the application program in the same node can be maintained.

Next, if the redundancy destination changing process is completed, the storage program 302 discards the unnecessary static mapping table before a configuration change, sends a response to the request source, and finishes this flow (S2417). Specifically, the storage program 302 erases the unnecessary static mapping tables 505 to 507 from the backup 517 on the memory 205 and the drive 105.

Next, a description will be made of the data migration process.

As described above, in step S2410, the management program 303 issues, to the storage program 302 of the migration destination node, the data migration process request for designating a virtual volume of a migration source and a virtual volume of a migration destination.

First, the storage program 302 of the migration destination node receiving the data migration request creates a virtual volume (migration distribution volume) of the migration destination on its local node (S2418). Specifically, the storage program 302 finds a vacant entry by referring to the virtual volume management table 511. If a vacant entry is found, the storage program 302 registers a size of the virtual volume, synchronization/asynchronization protection setting for each protection layer, and an owner node number in the virtual volume management table 511 with the entry as a new virtual volume.

Next, the storage program 302 of the migration destination node connects a virtual volume (migration source volume) provided by the storage program 302 of the migration source, for example, the storage program 302 reactivated by the reactivation destination node to the storage program 302 of its local node through the storage external connection function (S2419).

Next, the storage program 302 of the migration destination node performs a data copy process from the externally connected virtual volume to the newly created virtual volume of its local node (S2420). Details of the data copy process will be described later.

Next, if the data copy process is completed, the storage program 302 of the migration destination node switches a main path of storage I/O toward a host to the migration destination volume, and finishes this flow (S2421). Consequently, the host accesses the migration destination volume thereafter.

According to the configuration management process, the distributed storage system can maintain the redundancy changing arrangement of user data and a redundant code depending on a change in the number of normal nodes. In a case where a failure occurs in a node, or a node is removed, the distributed storage system regenerates a redundant code in a combination not including a removal target node, and can thus recover the redundancy of data on each node. In a case where a node is added, the distributed storage system regenerates a redundant code in a combination including an existing node and an addition target node, and can thus maintain the redundancy of data on each node.

FIG. 24 is a flowchart illustrating the data copy process performed by the storage program 302.

In the data copy process, data in the designated migration source volume is copied to the designated migration destination volume. The storage program 302 performing the data copy process may be the storage program 302 providing the migration source volume, may be the storage program 302 providing the migration destination volume, and may be the storage program 302 having no relation to a migration source and a migration destination. In the data copy process, the storage program 302 performs an address solving process so as to reduce a network I/O communication amount between storage programs of a migration source and a migration destination.

First, the storage program 302 designates a copy source address which is an address of copy source data in the migration source volume, and determines whether or not a virtual page in a pool volume of its local node is allocated to the copy source address by referring to the page mapping table 510 and the external connection management information (S2501). The copy source address is designated by, for example, a virtual volume number and a logical address.

In a case where the logical page of its local node is allocated to the copy source address as a result of the determination in step S2501 (S2501: Y), the storage program 302 performs a read process, and thus the storage program 302 reads data in the copy source address. Details of the read process are the same as described above. In a case where the logical page of its local node is not allocated to the copy source address as a result of the determination in step S2501 (S2501: N), the storage program 302 issues an address solving request for requesting an address solving process to the storage program 302 of remote node storing copy source data (S2506). In this case, the storage program 302 designates, for example, a virtual volume number, a logical address, and a read attribute in the address solving request. Details of the address solving process will be described later.

Next, if a response of address solving process completion is received, the storage program 302 issues a read request for requesting the copy source data to be read from the solved copy source address to remote node storing the copy source data on the basis of the returned information (S2502). Details of the read process are the same as described above.

Next, the storage program 302 determines whether or not the logical page in the pool volume of its local node is allocated to a copy destination address in the migration destination volume (S2503). A method of determining whether or not the logical page in the pool volume of its local node is allocated to the copy destination address is the same as in S2501. In a case where the logical page in the pool volume of its local node is allocated to the copy destination address as a result of the determination in step S2503 (S2503: Y), the storage program 302 designates the read copy source data as write data, designates the copy destination address as a write distribution address, and performs a write process (S2504).

In a case where the logical page in the pool volume of its local node is not allocated to the copy destination address as a result of the determination in step S2503 (S2503: N), an address solving request is issued to remote node storing in which a logical page is allocated to the copy destination address (S2507). In this case, the storage program 302 designates, for example, a virtual volume number, a logical address, and a write attribute in the address solving request. Details of the address solving process will be described later.

Next, if the copy destination address is solved, the storage program 302 designates the read copy source data as write data, designates the solved copy destination address as a write destination address, and performs a write process (S2504). Details of the write process are the same as described above.

Next, the storage program 302 determines whether or not all pieces of data in the migration source volume have been copied (S2505). In a case where there is copy target data as a result of the determination in step S2505 (S2505: Y), steps S2501 to S2504 are repeatedly performed. In a case where there is copy target data as a result of the determination in step S2505 (S2505: N), the storage program 302 finishes the data copy process.

Next, the address solving process will be described.

If the address solving request is received, the storage program 302 determines whether an address solving attribute has a read attribute or a write attribute on the basis of the address solving request.

In a case where the address solving request has a read attribute, it is determined whether or not the logical page of its local node is allocated to a region designated in the address solving request (S2508). A determination method is the same as described in step S2501. In a case where the logical page of its local node is allocated to the designated region as a result of the determination in step S2508 (S2508: Y), an address to be solved which is an address allocated to the region designated in the address solving request is solved by using the page mapping table 510 (S2509). Next, the storage program 302 returns the solved address which is obtained to the storage program 302 of the issue source node of the address solving request (S2510). The solved address is indicated by, for example, a pool volume number and a pool volume address.

In a case where the logical page of its local node is not allocated to the designated region as a result of the determination in step S2508 (S2508: N), the storage program 302 issues an address solving request to the storage program 302 of remote node storing the data (S2511), and waits for a completion response (S2512). Next, if a response of address solving process completion is received from the storage program 302 of remote node, the storage program 302 returns the returned information to the address solving request issue source (S2510).

In a case where the address solving request has a write attribute, the storage program 302 performs a process of allocating a new virtual page to the virtual volume designated in the address solving request in step S2508. In a case where a logical page in the pool volume of its local node is allocated to the virtual page (S2508: Y), the logical page in the pool volume of its local node is allocated to the virtual page, and a solved address indicated by the allocated pool volume number and pool volume address is returned to the issue source of the address solving process (S2509 and S2510). In a case where a logical page of a pool volume of remote node is allocated to the virtual page (S2508: N), the storage program issues an address solving request instruction a write attribute is designated to remote node (S2511), and waits for a completion response (S2512). Thereafter, if the response is returned, the storage program 302 returns the result to the issue source of the address solving request (S2510). Allocation of a virtual page is the same as described in the synchronous write process.

If a virtual page is and nested and allocated to storage programs on a plurality of nodes, in a case where a read request is sequentially transmitted, read data is returned via all storage programs to which the virtual page is nested when a result is returned, and thus a network communication amount increases. In the address solving process of the present example, a data read source node first solves a logical drive and a logical address along with a data read destination node, and thus it is possible to restrict read data network transmission due to issuing of a read request to one time, so that there is an effect of reducing a network communication amount.

Next, a description will be made of the collection read process performed by the storage program 302.

A node A is a failure node, and stores data X. A node B stores a redundant code XxorYxorZ for the data X on the failure node. A node C stores data Y which is a basis of the redundant code, and a host on the node C reads the data X on the failure node. A node D stores data Z which is a basis of the redundant code.

In a case where the host on the node C issues a read process on the data X on the failure node, since the node A is the failure node, the node C issues a collection read process request to the node B storing the redundant code for the read target data X. Since a redundant code mapping table or an inverse mapping table required for recovery of data is stored in the local drive 105 of the redundant code node, the node C requests the redundant code node to perform the collection read process, and thus control information is not required to be transmitted and received among the nodes, so that there is an effect of reducing overhead. The node B receiving the collection read process request reads the write data Y and X and the redundant code X*Y*Z required for recovery of data from the drives 105 of its local node and remote node, and recovers the data X. Next, the node B returns the recovered data to the issue source of the collection read process request.

FIG. 25 is a flowchart illustrating the collection read process performed by the storage program 302.

The collection read process includes processes (S2609 to S2612) in a read request reception node which is a node receiving a read request from a host, and processes (S2601 to S2608) in a redundant code node.

First, a description will be made of the processes (S2609 to S2612) in the read request reception node.

In a case where it is determined that read target user data is present on a failure node, the storage program 302 of the read request reception node issues a collection read request to the storage program 302 of the redundant code node (S2609). In this case, the collection read request designates, for example, a site number, a node number, a pool volume (logical drive) number, and a pool volume address of the read target user data. The redundant code node specifies the node number and the pool volume address of the read target user data on the basis of the static mapping table by using the method described with reference to the static mapping table.

Next, the storage program 302 of the read request reception node waits for a response to the collection read request to be received (S2610). If the response to the collection read request is received (S2611), the storage program 302 returns the returned read target user data to the host, and finishes the process (S2612).

Next, a description will be made of the processes (S2601 to S2608) in the redundant code node. If the collection read request is received, the storage program 302 of the redundant code node is executed. The storage program 302 determines whether or not request user data in the collection read request is present on a cache (S2601) Specifically, the storage program 302 checks whether or not there is data of an entry matching a node number, a logical drive, and a logical address of the request user data from the code dirty queue 1202 of the cache information 503. In a case where the request user data is present on the cache as a result of the determination in step S2601 (S2601: Y), the storage program 302 returns the user data to the read request reception node which is a request source, and finishes the process (S2608). The present process route indicates that the user data does not undergo a destage process yet, and a redundant code for the user data is not generated. Therefore, the user data in this state can be returned at a high speed since request user data is not required to be computed by using a redundant code.

In a case where the request user data is present on the cache as a result of the determination in step S2601 (S2601: N), the storage program 302 proceeds to a process of recovering request user data by using a redundant code. First, the storage program 302 specifies a storage position of a redundant code for the request user data on the basis of designated node number, logical drive and logical address by referring to the redundant code mapping table 702 of the log structuring mapping table 508. Next, user data of remote node used to the redundant code is specified on the basis of the specified storage position by referring to the inverse mapping table 703 (S2602).

Next, the storage program 302 issues a request for reading the user data of remote node specified in step S2602 (S2603). After the read request is issued, the storage program 302 reads a redundant code stored in its local node (S2604), and then waits for a read process completion response to be received from remote node (S2605). Next, if the read process completion response is received from remote node, the storage program 302 recovers the read request user data by using the user data read from remote node and the redundant code read from its local node (S2606 and S2607). Next, the storage program 302 returns the recovered user data to the read request reception node which is a request source, and finishes the process (S2608).

According to the collection read process, during the occurrence of a failure in a node, a transitory storage program can issue a collection read request to a redundant code node, and thus the redundant code node can recover data. Consequently, the transitory storage program can copy data on the failure node to a migration destination node.

Next, a description will be made of the collection write process performed by the storage program 302.

A node A is a failure node, and stores data X. A node B stores a redundant code XxorYxorZ for the data X on the failure node. A node C stores data Y which is a basis of the redundant code, and a host on the node C reads the data X on the failure node. A node D stores data Z which is a basis of the redundant code.

In a case where the host on the node C issues a write process on the data X on the failure node, since the node A is the failure node, the node C performs the collection write process so as to perform a data transmission process for transmitting a redundant code on the redundant code node B storing the redundant code for the write target data X. In a case where an intermediate code is required to be transmitted to the redundant code node B, the node C recovers write target user data through the collection read process, then generates an intermediate code by using the recovered write target user data and new write user data, and transmits the generated intermediate code to the redundant code node.

FIG. 26 is a flowchart illustrating the collection write process performed by the storage program 302.

Herein, a synchronous write process will be described, but the collection write process is performed in the same manner for an asynchronous write process.

First, the storage program 302 of a write request reception node receiving a write request from a host determines whether or not write target user data is a synchronous write target (S2701). A determination method is the same as in the above-described synchronous write process. In a case where the user data is a synchronous write target as a result of the determination in step S2701 (S2701: Y), the storage program 302 specifies a stripe type of the write target data according to the method described with reference to the static mapping table, and determines a redundant code on the basis of the specified stripe type and the static mapping table (S2702). Next, the storage program 302 determines whether or not an intermediate code is required to be transmitted (S2703).

In a case where it is determined that an intermediate code is required to be transmitted as a result of the determination in step S2703 (S2703: Y), the storage program 302 performs a collection read process so as to perform a process of recovering the write target user data in order to generate the intermediate code (S2706). Next, the storage program 302 generates the intermediate code by using the recovered write target data and new write data, and transmits the generated intermediate code to the redundant code node (S2707 and S2708). In a case where it is determined that an intermediate code is not required to be transmitted as a result of the determination in step S2703 (S2703: N), the storage program 302 transmits the write data to the redundant code node (S2704). Next, the storage program 302 determines whether or not the process is completed in all of the protection layers (S2705). In a case where the process is not completed in all of the protection layers as a result of the determination in step S2705 (S2705: N), the storage program 302 performs again the processes from step S2701 on a protection layer on which the process is not completed. In a case where the process is completed in all of the protection layers as a result of the determination in step S2705 (S2705: Y), the storage program 302 finishes the process.

FIG. 27 illustrates a concept of the redundancy destination changing process performed by the storage program 302.

FIG. 27 illustrates that the distributed storage system changes a storage position in a protection layer from a static mapping table (before a configuration change) 110A to a static mapping table (after a configuration change) 110B. Specifically, the distributed storage system which protects data between nodes at 2D1P excludes the node #3 from the protection layer among the nodes #0 to #3. FIG. 27 illustrates a process in which, with respect to user data corresponding to a stripe of D0 (the node number=1, and the stripe position number=0) of the node #1, a storage position of a redundant code is changed from the node #2 to the node #0 in the static mapping table 506A.

A storage position of a redundant code is changed as follows. First, the node #1 performs a redundancy destination changing main process 1616A so as to read the user data X corresponding to the stripe of D0, and refers to the static mapping table 506B after a configuration change. Then, the user data is transmitted to the redundant code node #0. The redundant code node #0 after a configuration change generates a new redundant code XxorZ by using the transmitted user data, and stores the redundant code in the drive. In this case, a combination (stripe type) of data for generating the redundant code is determined on the basis of the static mapping table 506B after a configuration change. Specifically, the node #0 generates the redundant code by using the user data X corresponding to the stripe of D0 of the node #1 and the user data Z corresponding to the stripe of D1 of the node #2.

An old redundant code before a configuration change for the user data X for which a storage position of the redundant code is changed is not necessary, and thus the node #1 issues an old redundant code erasure request to the node #2. If the old redundant code erasure request is received, the node #2 performs a redundancy destination changing sub-process 1616B, retrieves the requested redundant code corresponding to the user data by referring to the log structuring mapping table, and tries to erase the redundant code. In the above-described way, the distributed storage system changes a redundant code node of user data so as to change a configuration of a protection layer as the redundancy destination changing process.

FIG. 28 is a flowchart illustrating the redundancy destination changing process performed by the storage program 302.

The redundancy destination changing process is a process performed according to a configuration changing process which will be described later, and an old redundant code node of user data stored in the drive 105 of each node 101 is changed to a new redundant code node on the basis of a new static mapping table after a configuration change, and a redundant code is regenerated. The redundancy destination changing process includes a redundancy destination changing main process performed by a data node storing user data used to generate a redundant code of which a storage position is changed, and a redundancy destination changing sub-process performed by an old redundant code node before a configuration change.

First, a description will be made of the redundancy destination changing main process.

In the redundancy destination changing main process, the storage program 302 changes a redundant code node of user data in a logical address order with respect to the user data in each drive 105. First, the storage program 302 specifies a stripe type of target user data as a target stripe type, and determines whether or not a configuration changing process on the target stripe type is necessary (S2901). Here, a configuration changing process on the target stripe type being necessary indicates that, for example, in static mapping tables before and after a configuration change, a number of a node storing a redundant code of the target stripe type is changed, or a combination of user data of the target stripe type is changed.

In a case where a configuration changing process on the target stripe type is necessary as a result of the determination in step S2901 (S2901: Y), the storage program 302 reads target user data from the drive 105 (S2902). Next, the storage program 302 determines a new redundant code node after a configuration change of the target stripe type on the basis of the target stripe type and the static mapping table after a configuration change (S2903). Next, the storage program 302 transmits the target user data to the new redundant code node determined in step S2903 (S2904). The storage program 302 of the new redundant code node receiving the write data queues the received write data in the code dirty queue 1202 of the cache information 503, generates a redundant code through a destage process, and stores the redundant code in the drive 105.

Next, the storage program 302 specifies an old redundant code node before a configuration change of the target stripe type on the basis of the target stripe type and the static mapping table before a configuration change (S2905). Next, the storage program 302 issues a redundant code erasure request for requesting a redundant code before a configuration change to be erased to the old redundant code node specified in step S2906 (S2906). The redundant code erasure request includes, for example, a site number, a node number, a logical drive number, and a logical address of the target user data. Details of the redundancy destination changing sub-process performed the old redundant code node before a configuration change will be described later.

Next, the storage program 302 determines whether or not the process is completed on all pieces of user data of the target stripe type (S2907). For example, the storage program 302 holds a redundant code change pointer in the drive state management table 514, and determines whether or not the process on the user data is completed on the basis of the pointer. Specifically, the storage program 302 sequentially performs a redundancy destination changing process on logical addresses with a predetermined data size from a young logical address, and updates the redundant code change pointer if the process is completed on a single piece of data. In this case, the storage program 302 may determine that the redundancy destination changing process is completed on a logical address with a smaller value than that of a logical address indicated by the redundant code change pointer, and may determine that the redundancy destination changing process is not completed on a logical address with a greater value than that of the logical address indicated by the redundant code change pointer.

In a case where there is user data on which the process is not completed as a result of the determination in step S2907 (S2907: N), the storage program 302 performs the process on the user data from S2902.

In a case where the process on all of the pieces of user data of the target stripe type as a result of the determination in step S2907 (there is no user data on which the process is not completed) (S2907: Y), the storage program 302 determines whether or not the process is completed on all stripe types in the drive 105 (S2908). In a case where the process is completed on all stripe types as a result of the determination in step S2908 (S2908: Y), the storage program 302 finishes the process. In a case where the process is not completed on all stripe types as a result of the determination in step S2908 (S2908: N), the storage program 302 performs again the process on a stripe type on which the process is not completed from step S2901.

In a case where the configuration changing process on the target stripe type is not necessary as a result of the determination in step S2901 (S2901: N), the storage program 302 determines whether or not the process is completed on all stripe types in the drive 105 (S2908).

Next, the redundancy destination changing sub-process will be described.

The storage program 302 receiving the redundant code erasure request determines whether or not target user data designated in the redundant code erasure request is present on a cache (S2909). Specifically, the storage program 302 checks whether or not there is user data matching designated node number, logical drive and logical address by referring to the code dirty queue 1202 of the cache information 503.

In a case where there is the target user data on the cache as a result of the determination in step S2909 (S2909: Y), the storage program 302 erases the target user data from the cache. Specifically, the storage program 302 excludes an entry of the user data from the code dirty queue 1202, and reconnects the entry to the free queue 1205.

In a case where there is no target user data on the cache as a result of the determination in step S2909 (S2909: N), the storage program 302 sets a flag indicating that the target user data is made redundant in a new static mapping table after a configuration change (S2910). For example, the storage program 302 sets the flag in an entry of the target user data in the inverse mapping table 703 of the log structuring mapping table 508. Next, the storage program 302 determines whether or not a target redundant code corresponding to the target user data is erasable (S2911). Specifically, the storage program 302 checks the flag set in step S2910, checks a flag of an entry of each piece of user data in the inverse mapping table 703 of the target redundant code, and determines that the target redundant code is erasable in a case where all pieces of user data used to generate the target redundant code are made redundant in the new static mapping table.

In a case where the target redundant code is erasable as a result of the determination in step S2911 (S2911: Y), the storage program 302 erases the target redundant code (S2912). Specifically, the storage program 302 deletes an entry of the target redundant code from the redundant code mapping table 702 and the inverse mapping table 703, and reconnects an entry of the target redundant code of the local region management table to the free list 803 from the valid list 801. In a case where the target redundant code is not erasable as a result of the determination in step S2911 (S2911: N), the process is finished.

According to the redundancy destination changing process, the distributed storage system can generate a redundant code after a configuration change and can also erase a redundant code before a configuration change. Consequently, the distributed storage system can use a storage region of the redundant code before a configuration change as a storage region of the redundant code after a configuration change.

The distributed storage system may also perform the same process as in the protection layer #2 in the protection layer #3. In a case where a write request is received, a node selects a transmission destination site from among sites on the basis of site group information (for example, the static mapping table 507) in asynchronization with the write request, and transmits site transmission data (for example, write data) based on write data to the transmission destination site. In a case where a plurality of pieces of site transmission data are received from a plurality of sites, a node generates a site redundant code by using the plurality of pieces of site transmission data on the basis of the site group information, and writes the site redundant code to a local storage device (for example, the drive 105). In a case where configurations of a plurality of sites are changed, a node changes the site group information on the basis of the changed configuration of the plurality of sites, reads data from a local storage device, selects a new redundant code site which is a site storing a changed site redundant code corresponding to the read data on the basis of the changed site group information, transmits retransmission data based on the read data to the new redundant code site, selects an old redundant code site which is a site storing a site redundant code before being changed corresponding to data based on the read data, and transmits an erasure request for requesting the site redundant code before being changed to be erased to the old redundant code site. Consequently, also in a case where configurations of a plurality of sites are changed, the redundancy can be maintained. It is possible to increase the reliability by also using other protection layers. The site group corresponds to a stripe type or the like of the protection layer #3. The site transmission data corresponds to write data, part of the write data, an intermediate code, a class 1 code, or the like.

The distributed storage system may also perform the same process as in the protection layer #2 in the protection layer #1. In the protection layer #1, in a case where a write request is received, a node writes write data to a first storage device of a plurality of local storage devices (for example, the drives 105), generates a storage device redundant code by using the write data on the basis of storage device group information (for example, the static mapping table 505), and writes the storage device redundant code to a second storage device of the plurality of storage devices. In a case where configurations of a plurality of storage devices are changed, a node corresponding to the plurality of changed storage devices changes the storage device group information on the basis of the changed configurations of the plurality of storage devices, reads data from the storage devices, selects a new redundant code storage device which is a storage device storing a changed storage device redundant code corresponding to the read data on the basis of the changed storage device group information, writes storage device retransmission data based on the read data to a new redundant code storage device, selects an old redundant code storage device which is a storage device storing a storage device redundant code before being changed corresponding to the read data on the basis of the storage device group information before being changed, and issues an erasure request for requesting the storage device redundant code before being changed to be erased to the old redundant code storage device. Consequently, also in a case where configurations of a plurality of sites are changed, the redundancy can be maintained. It is possible to increase the reliability by also using other protection layers. The storage device group corresponds to a stripe type or the like of the protection layer #1. The storage device transmission data corresponds to write data, part of the write data, an intermediate code, a class 1 code, or the like.

FIG. 29 is a flowchart illustrating a virtual machine migration destination selection process performed by the management program 303.

The management program 303 initializes the temporary arrangement pattern table 3000 in which a virtual machine arrangement pattern is temporarily stored (S3001).

Specifically, invalid values are set to the arrangement pattern and the network communication cost of the temporary arrangement pattern table 3000.

Next, the management program 303 generates an arrangement pattern of a virtual machine in a physical machine (S3002). Regarding a method of generating an arrangement pattern, for example, combinations of physical machines and virtual machines are comprehensively listed according to a generally known combination listing algorithm. However, a virtual machine on which the storage program 302 operates is used to operate the local drive 105, and thus is not regarded as a migration target virtual machine. Alternatively, in a case where a virtual machine on which the storage program 302 operates is selected as a migration target, the arrangement pattern is discarded.

Next, the management program 303 determines whether or not the generated arrangement pattern is suitable for arrangement policy (S3009). Specifically, the management program 303 refers to an arrangement policy management table indicating arrangement policy which will be described later, and, for example, in a case where an arrangement pattern is generated in which a plurality of virtual machines set to be disposed in different physical machines according to arrangement pattern are disposed in the same physical machine, the management program discards the arrangement pattern since the arrangement pattern is not suitable for the arrangement policy. Consequently, the management program 303 can execute the application program 301 having a cluster configuration in a physically separate node 101, and can thus reduce an influence range on the application program 301 during a node failure.

For example, in a case where an arrangement pattern is generated in which a plurality of virtual machines set to be disposed in the same physical machine according to arrangement policy are disposed in different physical machines, the arrangement pattern is not suitable for the arrangement policy, and thus the management program 303 discards the arrangement pattern. Consequently, the management program 303 disposes virtual machines performing a large amount of network communication in the same physical machine, and can thus reduce a network communication amount among physical machines since network communication among virtual machines can be realized by communication using a virtual network provided by the hypervisor 304.

In a case where the generated arrangement pattern is not suitable for the arrangement policy as a result of the determination in step S3009 (S3009: N), the management program 303 proceeds to step S3007.

In a case where the generated arrangement pattern is suitable for the arrangement policy as a result of the determination in step S3009 (S3009: Y), the management program 303 computes network communication cost in the generated arrangement pattern.

Specifically, the management program 303 computes network communication cost of a specific physical machine according to the following equation.

Network communication cost of physical machine=sum of network communication amounts of virtual machine disposed in its local node physical machine and virtual machine disposed remote node physical machine For example, in a case where the system is configured to include three physical machines (physical machines #0, #1 and #3), and five virtual machines (virtual machines #0, #1, #2, #3 and #4), the physical machines and the virtual machines are disposed as follows.

Physical machine #0: virtual machines #0 and #1
Physical machine #1: virtual machines #2 and #3
Physical machine #2: virtual machine #4

In this case, the network communication cost of the physical machine #0 is as follows.

Network communication cost of physical machine #0=network communication amounts among virtual machines #0 to #2+network communication amounts among virtual machines #0 to #3+network communication amounts among virtual machines #0 to #4+network communication amounts between virtual machines #1 and #2+network communication amounts among virtual machines #1 to #3+network communication amounts among virtual machines #1 to #4

The management program 303 acquires a network communication amount among the respective virtual machines from the network management table 1307. Thereafter, the management program 303 sets the maximum network communication cost among the network communication costs of the respective physical machines in the temporary arrangement pattern table 3000 as network communication cost in the arrangement pattern.

Next, the management program 303 determines whether or not the network communication cost of the current temporary arrangement pattern table 3000 is an invalid value, or a computation result in step S3003 is less than the network communication cost of the current temporary arrangement pattern table 3000 (S3004).

In a case where the network communication cost of the current temporary arrangement pattern table 3000 is an invalid value, or a computation result in step S3003 is less than the network communication cost of the current temporary arrangement pattern table 3000 as a result of the determination in step S3004 (S3004: Y), the management program 303 proceeds to step S3005.

In a case where the network communication cost of the current temporary arrangement pattern table 3000 is not an invalid value, and a computation result in step S3003 is more than the network communication cost of the current temporary arrangement pattern table 3000 as a result of the determination in step S3004 (S3004: N), the management program 303 discards the arrangement pattern, and proceeds to step S3007.

In step S3005, the management program 303 determines whether or not resources of a virtual machine other than a network, that is, a CPU, a memory, and a storage do not exceed a resource sum of a physical machine when the virtual machine is migrated in the currently selected arrangement pattern. Specifically, the management program 303 refers to the CPU/memory/storage management table 1306, and determines whether or not a resource sum of a virtual machine disposed in the same physical machine in the arrangement pattern does not exceed the resource maximum value of the physical machine which is an arrangement destination stored in the physical machine configuration management table 1303.

In a case where a sum of a resource use amount of the virtual machine does not exceed the maximum resource amount of the physical machine as a result of the determination in step S3005 (S3005: Y), the management program 303 updates the current temporary arrangement pattern table 3000 with the arrangement pattern as anew computation result (S3006). In a case where a sum of a resource use amount of the virtual machine exceeds the maximum resource amount of the physical machine as a result of the determination in step S3005 (S3005: N), the management program 303 proceeds to step S3007.

In step S3007, the management program 303 determines whether or not the process is completed on all arrangement patterns of a virtual machine in a physical machine, and performs the processes from step S3002 in a case where there is an arrangement pattern on which the process is not completed (S3007: N). In a case where the process is completed on all of the arrangement patterns of a virtual machine in a physical machine as a result of the determination in step S3007 (S3007: Y), the management program 303 determines the arrangement stored in the current temporary arrangement pattern table 3000 as a new arrangement pattern (S3008).

As mentioned above, the management program 303 determines an arrangement destination of a virtual machine in a physical machine, and can thus realize arrangement of a virtual machine in a physical machine by taking into consideration external network communication of the physical machine and internal network communication of the physical machine. In other words, the management program 303 can find an arrangement pattern in which an internal network communication amount is large, and an external network communication amount is small, and can thus reduce a network communication amount of physical networks of the entire system.

Hereinafter, a description will be made of a graphical user interface (GUI) provided to a manager by the management program 303. Each GUI may be displayed on a terminal apparatus connected to the distributed storage system, and may receive input from the manager.

FIG. 30 illustrates a configuration example of a node setting screen.

A GUI 3114 in the node setting screen displays node configuration setting information to a user, and provides an interface for the manager to set a node configuration. The GUI 3114 includes node information 3101, node configuration setting 3102, drive configuration setting 3107, and data protection setting 3110. Regarding input to each column, the user may input any value, and the user may select registered information through pulldown.

The node information 3101 has an entry for each node. Each entry includes a node ID, a node name, an IP address, and a state. The node ID indicates an identifier of a node, that is, a physical machine, and is a unique value in the system. The identifier is determined by the system in a case where a node is added and is changed. The node name indicates any character string designated by the user in a case where a node is added and is changed. The IP address indicates an IP address designated by the user or an IP address determined by the system when a node is added and is changed. The state indicates a state of the node, and includes, for example, a normal state, a failure state, a recovery progress state, and a configuration change progress state. In a case where the state is a recovery progress state or a configuration change progress state, the state may indicate the progress of a recovery process and a configuration changing process.

In the above-described way, the user can check a configuration and a state of each node forming the system.

The node configuration setting 3102 includes a node name 3103, an IP address 3104, site setting 3105, and geo setting 3106. If the user inputs a value of each item, and presses an "add" button, a "change" button, or a "delete" button provided on a lower part in the node configuration setting 3102, the management program 303 performs a process. In a case where of addition, the management program 303 adds a new setting target node to the system. In a case of change, the management program 303 changes setting of a setting target node to an input value. In a case of deletion, the management program 303 deletes a setting target node from the system.

The node name 3103 allows a name of a setting target node to be designated. The user inputs a setting target node to this item. The IP address 3104 allows an IP address set for the setting target node to be designated. The user may input any value to this item. In a case where AUTO is selected for the IP address 3104, an IP address available in the system is retrieved, and the available IP address is automatically set for the setting target node. The management program 303 may check the set IP address from the table of the node information 3101. The site setting 3105 allows a zone of a site protection layer (protection layer #2) to which the setting target node belongs to be designated. This zone may be registered in data protection setting which will be described later, a redundant code is generated between nodes added to the zone, and thus data between the nodes is protected. The geo setting 3106 allows a zone of a geo protection layer (protection layer #3) to which the setting target node belongs to be designated. This zone may be registered in data protection setting which will be described later, a redundant code is generated between sites added to the zone, and thus data between the sites is protected.

The drive configuration setting 3107 includes a node name 3108 and a drive name 3109. If the user inputs a value of each item, and presses an "add" button or a "delete" button provided on a lower part in the drive configuration setting 3107, the management program 303 performs a process. In a case where of addition, the management program 303 adds a designated drive to the setting target node. In a case where of deletion, the management program 303 deletes a designated drive from the setting target node.

The node name 3108 allows a name of a node which is a target to which a drive is added. The drive name 3109 allows a name of an addition target drive. The name of the drive displays a name of a drive detected by the system.

The data protection setting 3110 includes a layer name 3111, a protection level 3112, and a protection method 3113. If the user inputs a value of each item, and presses an "add" button, a "change" button, or a "delete" button provided on a lower part in the data protection setting 3110, the management program 303 performs a process. In a case where of addition, the management program 303 adds a new setting target protection layer to the system. In a case of change, the management program 303 changes setting of a setting target protection layer to an input value. In a case of deletion, the management program 303 deletes a setting target protection layer from the system.

The layer name 3111 allows a name of the setting target protection layer to be designated. The protection level 3112 allows policy (XDYP: the maximum number X of pieces of data and the number Y of redundant codes) for data protection of the setting target protection layer to be designated. In a case where the number of nodes does not reach X+Y, if storage capacities of resources are different from each other, the distributed storage system uses a value close thereto as the protection level 3112 in an actual configuration. The protection method 3113 allows whether data transmission for redundant code generation is performed synchronously or asynchronously with host I/O to be designated.

FIG. 31 illustrates a configuration example of an arrangement policy setting screen.

A GUI 3201 in the arrangement policy setting screen provides an interface for setting arrangement policy of virtual machines to the user. The GUI 3201 includes arrangement policy information 3202 and arrangement policy setting 3203. Regarding input to each column, the user may input any value, and the user may select registered information through pulldown.

The arrangement policy information 3202 displays information regarding a policy ID, a policy name, a virtual machine ID, and a policy type to the user. The policy ID is an identifier allocated by the system when new policy is added, and is used in a case where the system refers to policy. The policy name is any character string which can be designated by the user, and is used in a case where the user checks policy. The virtual machine ID is an identifier of a virtual machine which is a setting target of the policy. The set policy is applied to the virtual machine. The policy type is the type of applied policy, and includes, for example, two types of the same node arrangement and separate node arrangement. The same node arrangement indicates that a plurality of application target virtual machines are disposed in the same node (physical machine). The separate node arrangement indicates that a plurality of application target virtual machines are disposed in separate nodes (physical machines).

The arrangement policy setting 3203 provides an arrangement policy setting interface to the user. The arrangement policy setting 3203 includes a policy name 3204, a policy type 3205, and a virtual machine name 3206. If the user inputs a value of each item, and presses an "add" button, a "change" button, or a "delete" button provided on a lower part in the arrangement policy setting 3203, the management program 303 reflects setting information in the system. In a case where of addition, the management program 303 adds new setting target policy to the system. In a case of change, the management program 303 changes setting of setting target policy to an input value. In a case of deletion, the management program 303 deletes setting target policy from the system.

The policy name 3204 is used to designate a name of the setting target policy. The policy type 3205 is used to designate the type of applied policy. The policy type is the same as described above. The virtual machine name 3206 is used to designate a name of a virtual machine which is a policy application target.

EXAMPLE 2

FIG. 32 illustrates an off-load configuration in Example 2.

In the present example, a flash drive 3301 is used instead of the drive 105. The backend port 208 of the nodes 101 connected to each other via the network 203 is connected to a plurality of flash drives 3301 via the virtual or physical network 203. One or a plurality of nodes 101 are provided in a single site.

The node 101 can perform communication with each of the flash drives 3301 via the backend network 203 without using other nodes 101, and can use the flash drive as a local drive. A single flash drive 3301 performs corresponding to with a single node 101.

The backend network 203 may connect a plurality of nodes 101 to each other, and the nodes 101 connected to the backend network 203 perform communication with each other by using the backend network 203. The nodes not connected to the backend network 203 perform communication with each other by using, for example, the external network 204.

The flash drive 3301 includes an I/F for connection to the backend network 203, a buffer memory temporarily storing data, an internal processor controlling the flash drive 3301, and a plurality of flash memories storing data.

The distributed storage system of the present example realizes an off-load configuration by performing a redundant code generation process, and a data storing process in a log structuring format in the flash drive 3301. Consequently, the node 101 can reduce the time for a write process without being aware of generation of a redundant code and a log structuring format.

The off-load configuration of the present example is realized by, specifically, a coordinator program 3401 and a drive program 3402 which will be described next. The coordinator program 3401 is a program operating on the node 101, receives storage I/O from a host, and performs a communication process among the nodes 101 and among the flash drives 3301.

The drive program 3402 is a program operating on the internal processor of the flash drive 3301, and processes a command received from the coordinator program 3401.

In the example illustrated in FIG. 32, the distributed storage system includes nodes 101A to 101C. The nodes 101A to 101C respectively include processors 206A to 206C. The node 101A includes flash drives 3301A to 3301C, the node 101B includes flash drives 3301D and 3301E, and the node 101C includes flash drives 3301F and 3301G. The processors 206A to 206C respectively execute coordinator programs 3401A to 3401C. The flash drives 3301A to 3301G respectively execute the drive programs 3402A to 3402G.

If a write request is received from a host, the coordinator program 3401B of the node 101B issues a write command for writing user data DATA1 from the host to the drive program 3402D operating on the flash drive 3301D. Simultaneously, a command for generating a redundant code in a node is issued to the drive program 3402E operating on the flash drive 3301E, and the user data DATA1 is transmitted to the coordinator program 3401A operating on the node 101A in order to generate an inter-node redundant code.

The drive program 3402D stores the received user data DATA1 in a nonvolatile medium of the flash drive 3301D. The drive program 3402E queues the received user data DATA1 in a code dirty queue present on the buffer memory of the flash drive 3301E, generates a redundant code Code4 by using the user data DATA1 through a destage process, and stores the redundant code in the nonvolatile medium. In other words, the flash drive 3301D and the flash drive 3301E respectively correspond to a data drive and a redundant code drive of a single stripe type. The redundant code drive is determined on the basis of a write destination address of user data and the static mapping table described in Example 1. The distributed storage system in the example illustrated in FIG. 32 generates a redundant code by using a single piece of user data, but the redundant code may be generated by using pieces of user data written to a plurality of drives.

If a write request for user data DATA2 is received from the host, the node 101C performs the same process as that in the node 101B.

Consequently, the node 101A receives the user data DATA1 and DATA2 from the node 101B and the node 101C. The coordinator program 3401A of the node 101A determines the flash drive 3301A storing a redundant code, and writes the received user data DATA1 and DATA2 to the flash drive 3301A by using a command for writing a redundant code.

The drive program 3402A receiving the command for writing a redundant code queues the received user data in the code dirty queue present on the buffer memory of the flash drive 3301A, generates an inter-node redundant code Code? through a destage process, and stores the redundant code in the nonvolatile medium.

The coordinator program 3401 manages a capacity such that the capacity of each flash drive 3301 is not exhausted. Specifically, the coordinator program 3401 monitors an actually used amount of the flash drive 3301 by using a local region amount table which will be described later, issues a capacity reduction request to the drive program 3402B on the flash drive 3301B storing a redundant code for user data of the flash drive 3301B of which the actually used amount exceeds a target use amount, and performs a process of erasing unnecessary redundant code and user data.

The management program 303 operates on one or a plurality of nodes 101, and issues a management operation such as an addition, deletion or recovery process for the node 101 to the coordinator program 3401 on each node 101.

FIG. 33 illustrates a configuration example of a log structuring mapping table 508b managed by the flash drive 3301 in order to control the distributed storage system.

A buffer memory 3504 of the flash drive 3301 stores the log structuring mapping table 508b.

The log structuring mapping table 508b includes an address identifier conversion table 3501 and an address identifier free list 3502 in addition to the information in the log structuring mapping table 508.

The address identifier conversion table 3501 indicates a correspondence relationship between an address identifier for uniquely identifying data and log information which is logical-physical (logical address-physical address) conversion information. In a case where user data is written, the flash drive 3301 updates the logical-physical conversion information, assigns an address identifier which is a unique identifier in the drive to the data with the updated logical-physical conversion information as log information, and manages the data. With respect to a redundant code held in another flash drive, the flash drive 3301 holds information regarding user data used to generate the redundant code by using an address identifier.

Consequently, the flash drive 3301 may not notify a flash drive of remote node of a changed physical address even if the physical address of user data stored in the flash drive of its local node by performing a garbage collection process or a wear-leveling process, and can thus reduce communication overhead between the flash drives 3301.

The address identifier free list 3502 stores an address identifier not in use. In a case where user data is written, the coordinator program 3401 acquires (dequeues) an address identifier from the head of the address identifier free list 3502, and writes the user data to the flash drive 3301 along with the acquired address identifier.

The flash drive 3301 stores log information in the address identifier conversion table 3501 along with a designated address identifier. The coordinator program 3401 registers (enqueues) an erased address identifier in the end of the address identifier free list 3502 by a trigger to erase invalid user data (a trigger to issue an INVALIDATE command).

The flash drive 3301 may store a backup 3506 of the log structuring mapping table 508b in a flash memory 3505.

FIG. 34 illustrates communication interfaces between the coordinator program 3401 and the drive program 3402.

The coordinator program 3401 may issue the following commands to the drive program 3402.

A D_WRITE command 3601 causes a drive program on a flash drive storing user data to write user data with a drive number, an LBA, a data transmission length, and an address identifier as arguments.

A P_WRITE command 3602 causes a drive program on a flash drive storing a redundant code to write user data for generation of a redundant code with a drive number, a data transmission length, and data storing information as arguments. The data storing information includes a node number, a drive number, an LBA, and an address identifier for a flash drive storing user data.

A D_READ command 3603 causes a drive program on a flash drive storing user data to read valid user data with a drive number, an LBA, and a data transmission length as arguments.

An OLD_D_READ command 3604 causes a drive program on a flash drive storing user data to read invalid user data with a drive number, an address identifier, and a data transmission length as arguments. This command is used to recover failure data during collection read.

A P_GET command 3605 is used to acquire redundant code configuration information indicating user data used for generation in generation of a redundant code generated through a destage process in a flash drive, from the flash drive storing the redundant code with a drive number as an argument. The redundant code configuration information includes a drive number, an LBA, and an address identifier for a flash drive storing user data.

A P_PUSH command 3606 is used to notify a flash drive storing second and subsequent redundant codes of redundant code configuration information with a drive number and the redundant code configuration information as arguments.

An INVALID command 3607 causes a flash drive storing user data to erase unnecessary invalid user data with a drive number and an address identifier as arguments during a capacity exhaustion management process.

A SEARCH command 3608 is used to request a flash drive storing a redundant code to retrieve a deletion target redundant code, and to acquire redundant code information of the deletion target redundant code and redundant code configuration information of the deletion target redundant code as a retrieval result, during a capacity exhaustion management process. The redundant code information of the deletion target redundant code includes a drive number and an LBA for a flash drive storing a redundant code. The redundant code configuration information of the deletion target redundant code includes a drive number, an LBA, and an address identifier for a flash drive storing user data, and information indicating whether the user data is valid user data or invalid user data.

A P_READ command 3609 is used to acquire a redundant code for recovery target user data and redundant code configuration information from a flash drive storing a redundant code during a collection read process. The redundant code configuration information includes a storage position of user data used to generate the redundant code, a node number, a drive number, an LBA, and an address identifier.

Communication is performed between the coordinator program 3401 and the drive program 3402 by using the above-described commands, and thus the off-load configuration is realized.

Hereinafter, a description will be made of an operation of the distributed storage system of Example 2.

FIG. 35 is a flowchart illustrating a read process in Example 2.

The read process in the present example is a process in which the coordinator program 3401 reads user data from the drive program 3402.

The coordinator program 3401 determines whether or not a read request from a host is a request for access to the flash drive of its local node (S3701).

In a case where the read request is a request for access to the flash drive of remote node as a result of the determination in step S3701 (S3701: N), the coordinator program 3401 transmits the read request to the coordinator program 3401 of remote node (S3707). The coordinator program 3401 of remote node receiving the read request processes the read request in the same manner as in the present process.

In a case where the read request is a request for access to the flash drive of its local node as a result of the determination in step S3701 (S3701: Y), the coordinator program 3401 determines whether or not the flash drive which is an access destination is a failure drive (S3702).

In a case where the access destination drive is a failure drive as a result of the determination in step S3702 (S3702: Y), the coordinator program 3401 performs a collection read process which will be described later (S3708).

In a case where the access destination drive is not a failure drive as a result of the determination in step S3702 (S3702: N), the coordinator program 3401 issues the D_READ command to the drive program 3402 on the access destination flash drive (S3703), and waits for process completion (S3704).

In a case where the D_READ command is received, the drive program 3402 converts a designated logical address into a physical address by referring to the logical-physical conversion information of the address identifier conversion table 3501 of the log structuring mapping table 508b (S3709).

Next, the drive program 3402 reads designated user data from the nonvolatile medium, and returns the result to the coordinator program 3401 (S3710 and S3711).

If a completion response is received from the drive program 3402, the coordinator program 3401 returns the returned user data to the host (S3706).

FIG. 36 is a flowchart illustrating a synchronous write process in Example 2.

In the synchronous write process in the present example, the coordinator program 3401 writes user data to the drive program 3402. The coordinator program 3401 can write data without being aware of a log structuring format, and thus it is possible to reduce a write process time.

The coordinator program 3401 determines whether or not a write request from a host is a request for access to the flash drive of its local node (S3801).

In a case where the write request is a request for access to the flash drive of remote node as a result of the determination in step S3801 (S3801: N), the coordinator program 3401 transmits the write request to the coordinator program 3401 of remote node (S3810). The coordinator program 3401 of remote node receiving the write request processes the write request in the same manner as in the present process.

In a case where the write request is a request for access to the flash drive of its local node as a result of the determination in step S3801 (S3801: Y), the coordinator program 3401 determines whether or not the flash drive which is an access destination is a failure drive (S3802).

In a case where the access destination drive is a failure drive as a result of the determination in step S3802 (S3802: Y), the coordinator program 3401 performs the collection read process described in FIG. 27 (S3711).

In a case where the access destination drive is not a failure drive as a result of the determination in step S3802 (S3802: N), the coordinator program 3401 acquires a free address identifier from the address identifier free list (S3803).

Next, the coordinator program 3401 issues the D_WRITE command including the acquired address identifier to the drive program 3402 on the access destination flash drive (S3804).

If the D_WRITE command is received, the drive program 3402 connects received user data to the data dirty queue of the cache information (S3813), and returns the result to the coordinator program 3401 (S3814).

Next, the coordinator program 3401 determines whether or not a storage position of a redundant code of a processing target protection layer is its local node in order to perform user data transmission for storing the redundant code (S3805).

In a case where the redundant code is stored in remote node as a result of the determination in step S3805 (S3805: N), the coordinator program 3401 transmits the P_WRITE command to the coordinator program 3401 of remote node (S3812). The coordinator program 3401 of remote node receiving the P_WRITE command determines a flash drive storing a redundant code by using, for example, round-robin, and issues the P_WRITE command to a drive program of the determined flash drive.

In a case where a redundant code is stored in its local node as a result of the determination in step S3805 (S3805: Y), the coordinator program 3401 issues the P_WRITE command to the flash drive 3301 of its local node which is a redundant code storage position (S3806).

The drive program 3402 receiving the P_WRITE command connects the received user data to the code dirty queue of the cache information, and returns the result to the coordinator program 3401 (S3815 and S3816).

Next, the coordinator program 3401 determines whether or not data transmission for a redundant code is completed in all of the protection layers (S3807).

In a case where there is a protection layer on which the processes is not completed as a result of the determination in step S3807 (S3807: N), the coordinator program 3401 performs the processes from step S3805.

In a case where there is protection layer on which the processes is not completed as a result of the determination in step S3807 (S3807: Y), the coordinator program 3401 waits for command completion from the flash drive, and returns a write request completion response to the host if the completion is received (S3808 and S3809).

FIG. 37 is a flowchart illustrating a destage process in Example 2.

In the destage process in the present example, the drive program 3402 writes user data to a nonvolatile medium. The drive program 3402 executes the same steps S3901 to S3907 as steps S2101 to S2107 of the destage process described in Example 1. Herein, a description will be made of only a difference from the destage process in Example 1.

The drive program 3402 generates an initial redundant code in S3903, writes the redundant code to the medium in S3904, and temporarily preserves information regarding a combination of user data used to generate the redundant code in the buffer memory in S3905.

The coordinator program 3401 acquires combination information of user data which is used to generate a redundant code and is preserved by the drive program 3402, in response to the P_GET command (S3909). The coordinator program 3401 may perform the present process periodically or normally.

In a case where the combination information of user data is not returned from the drive program 3402 in response to the P_GET command (S3909: N), the coordinator program 3401 finishes the process.

In a case where the combination information of user data is returned from the drive program 3402 in response to the P_GET command (S3909: Y), the coordinator program 3401 notifies a drive program of a flash drive storing second and subsequent redundant codes or a coordinator program of a node storing second and subsequent redundant codes of the combination information (S3910). Consequently, the coordinator program receiving the combination information notifies a drive program of a flash drive storing an inter-node redundant code of the combination information.

The drive program 3402 receiving the combination information of user data detects user data designated by the combination information from the code dirty queue on the buffer memory (S3911), generates the next (second and subsequent) redundant codes by using the user data (S3912), and writes the generated redundant codes to the nonvolatile medium (S3913).

Next, a description will be made of a capacity exhaustion management process in Example 2.

In the present example, the coordinator program 3401 performs a capacity exhaustion management process and a capacity reduction process, and the drive program 3402 performs a data retransmission process and a data erasure process. A process of retrieving an erasure target redundant code in the storage program 302 in Example 1 is off-loaded to the drive program 3402 in the present example.

A description will now be made of a difference from the capacity exhaustion management process in Example 1. The coordinator program 3401 which receives a capacity reduction request according to the capacity exhaustion management process performed by the coordinator program 3401 of its local node or remote node performs the same capacity reduction process as in S2305.

Thereafter, the coordinator program 3401 issues the SEARCH command for retrieving an erasure target redundant code to the drive program 3402 instead of S2306 in the capacity reduction process.

The drive program 3402 receiving the SEARCH command retrieves an erasure target redundant code. In this case, the drive program 3402 uses a number of a drive of which a capacity is required to be reduced as an argument, and retrieves a redundant code generated by using invalid user data of the drive number.

If the erasure target redundant code is found, the drive program 3402 returns redundant code information and redundant code configuration information to the coordinator program 3401. The redundant code information includes a drive number which is a storage position of a redundant code and an LBA, and is used to designate a deletion target redundant code during deletion of the redundant code in the capacity reduction process. The redundant code configuration information includes a node number, a drive number, and an address identifier for user data used to generate a redundant code, and is used to erasure or retransmit user data in the capacity reduction process. In a case where invalid user data is erased, the coordinator program 3401 issues the INVALID command to the drive program 3402 with an address identifier for identifying erasure target user data as an autonomous retrieval such that the invalid user data is erased.

FIG. 38 is a flowchart illustrating a collection read process in Example 2.

In the collection read process in the present example, the coordinator program 3401 reads failure user data from the drive program 3402.

The coordinator program 3401 issues the P_READ command to the drive program 3402 of a flash drive storing a redundant code for recovery target user data in order to acquire the user data and redundant code configuration information (S4101). Next, the coordinator program 3401 waits for a result of the P_READ command to be returned (S4102).

If the P_READ command is received, the drive program 3402 of the flash drive storing the redundant code for the recovery target user data determines whether or not the recovery target user data is present in the code dirty queue on the buffer memory of the flash drive (S4111).

In a case where the recovery target user data is present as a result of the determination in step S4111 (S4111: Y), the drive program 3402 returns the recovery target user data to the coordinator program 3401 (S4115).

In a case where the recovery target user data is present as a result of the determination in step S4111 (S4111: N), the drive program 3402 specifies a redundant code for the recovery target user data from the redundant code mapping table of the log structuring mapping table 508b (S4112). Next, the drive program 3402 specifies redundant code configuration information from the inverse mapping table of the log structuring mapping table 508b (S4113).

Next, the drive program 3402 returns the specified redundant code and redundant code configuration information to the coordinator program 3401 (S4114).

If the results of the P_READ command are received, the coordinator program 3401 determines whether or not the returned data is the recovery target user data (S4103 and S4104).

In a case where the recovery target user data is returned as a result of the determination in step S4104 (S4104: Y), the coordinator program 3401 returns the recovery target user data to the read request source of user data, and finishes the process.

In a case where the recovery target user data is not returned as a result of the determination in step S4104 (S4104: Y), the coordinator program 3401 specifies user data required for recovery from the returned redundant code configuration information, and issues the OLD_D_READ command for designating an address identifier of the specified user data so as to read the specified user data. Here, in a case where necessary user data is stored in remote node, the coordinator program 3401 transmits the OLD_D_READ command to the coordinator program 3401 of remote node. The coordinator program 3401 waits for a result of the OLD_D_READ command to be returned from the drive program 3402 (S4106).

If the OLD_D_READ command is received, the drive program 3402 specifies a physical address of user data corresponding to the designated address identifier from the address identifier conversion table of the log structuring mapping table 508b (S4116), reads the user data from the nonvolatile medium (S4117), and returns the user data to the coordinator program 3401 (S4118).

If all results of the OLD_D_READ command are received (S4107), the coordinator program 3401 computes and recovers the recovery target user data on the basis of the redundant code read by using the P_READ command and the user data read by using the OLD_D_READ command (S4108). Next, the coordinator program 3401 returns the recovered user data to the user data request source (S4109), and finishes this flow.

Next, a description will be made of a redundancy destination changing process in Example 2.

The redundancy destination changing process in the present example is realized by the coordinator program 3401 performing the same redundancy destination changing main process as in Example 1 and the drive program 3402 performing the same redundancy destination changing sub-process as in Example 1.

If a configuration change request is received from the management program 303, the coordinator program 3401 performs the same configuration changing process as in Example 1, and performs a redundancy destination changing main process. In the redundancy destination changing main process, the coordinator program 3401 sequentially reads user data from the flash drive 3301. Next, the coordinator program 3401 determines a redundancy destination after a configuration change by referring to the static mapping table, and writes the read user data to the redundancy destination after a configuration change by using the P_WRITE command. The coordinator program 3401 designates user data of which a redundancy destination is changed by referring to the static mapping table before a configuration change, and issues a command for erasing a redundant code for the user data to a flash drive storing the old redundant code.

The drive program 3402 receiving the redundant code erasure command due to a configuration change performs the redundancy destination changing sub-process, performs the process according to the flowchart in the redundancy destination changing process of Example 1, and returns a result thereof to the coordinator program 3401.

Next, a description will be made of a data copy process in Example 2.

The data copy process in the present example is realized by the coordinator program 3401 performing the data copy process and the address solving process in Example 1.

If a data migration request is received from the management program 303, the coordinator program 3401 performs the same data migration process as in Example 1, and performs the data copy process. The coordinator program 3401 performs the same data copy process and address solving process as described in Example 1, and copies data.

Next, a description will be made of a failure recovery process in Example 2.

A recovery process in the present example is performed in the same manner as the recovery process in Example 1. However, in the present example, the management program 303 issues requests for the configuration changing process and the data migration process to the coordinator program 3401.

EXAMPLE 3

In the present example, a description will be made of a method for making transmission between nodes for redundancy efficient. A configuration of the distributed storage system of the present example is the same as that in Example 1. However, a redundancy process of generating a redundant code in the present example is different from that in Example 1.

In Example 1, a transmission amount increases in proportion to the redundancy with respect to a write amount for a node. For example, in order to recover data during the occurrence of failures in two nodes, write data is transmitted from a single node to cache storage devices of two nodes. In other words, network transmission which is twice the write amount for a node occurs. Hereinafter, a description will be made of a method of reducing a transmission amount for generation of a redundant code in remote node.

FIG. 39 illustrates a redundancy process in Example 3.

FIG. 39 illustrates an example in which the distributed storage system including four nodes such as nodes 101A to 101D protects data with a 2D2P redundant configuration (a configuration of generating two redundant codes by using two pieces of user data). In other words, the present system has the redundancy of being capable of recovering all pieces of data during the occurrence of failures in two nodes.

For example, the node 101 divides received write data having a large data length into user data d1 and d2 of two data blocks, and generates two parities p and q. The parities are handled as data blocks. The parities p and q are referred to as primary redundant codes (class 1 codes). Next, the node 101 distributes and copies the user data and the parities to caches (buffers) of other nodes 101. A data unit is a combination of one or a plurality of data blocks.

In the example illustrated in FIG. 39, the node 101A divides received write data into user data d1$a$ and d2$a$ of two data blocks, and generates parities pa and qa by using the user data. Similarly, the node 101B divides received write data into user data d1$b$ and d2$b$ of two data blocks, and generates parities pb and qb by using the user data. Similarly, the node 101C divides received write data into user data d1$c$ and d2$c$ of two data blocks, and generates parities pc and qc by using the user data. Similarly, the node 101D divides received write data into user data d1$d$ and d2$d$ of two data blocks, and generates parities pd and qd by using the user data.

The node 101 of the present example copies three data blocks to three different nodes 101, respectively. A synchronous write process is completed such that necessary redundancy is obtained (data can be recovered during the occurrence of failures in two nodes) at the time of copy completion.

Each node 101 copies a single piece of user data d2 and two parities p and q to caches (buffers) of three different nodes 101, respectively. Each node stores data blocks (write data or parities) from three different nodes in the caches.

Each of the nodes 101A to 101D asynchronously generates parities x and y by using data blocks (user data or parities) collected from three different nodes, writes the parities to a local drive, and releases the cache. The parities x and y are referred to as class 2 codes. The node 101A generates parities xa and ya by using data blocks received from other nodes. Similarly, the node 101B generates parities xb and yb by using data blocks received from other nodes. Similarly, the node 101C generates parities xc and yc by using data blocks received from other nodes. Similarly, the node 101D generates parities xd and yd by using data blocks received from other nodes.

For example, the node 101C receives the parity pa from the node 101A, receives the parity pb from the node 101B, and receives the parity qd from the node 101D. The node 101C generates the parities x and y by using the data blocks, writes the parities to the local drive, and releases the cache.

Each of the nodes 101A to 101D writes the user data d1 and d2 to the local drive so as to release the cache. For example, the node 101A writes the user data d1$a$ and d2$a$ to the local drive so as to release the cache.

In Example 1, in order to recover data during the occurrence of failures in two nodes, the node 101 transmits write data d1 and d2 to two different nodes. In contrast, in the present example, part d2 of the write data and the primary redundant codes (parities p and q) generated by using the write data are transmitted to other nodes. Therefore, the distributed storage system of the present example can make data transmission between nodes efficient while maintaining requested redundancy. The pieces of stripe data d1 and d2 are all stored in the local drive.

FIG. 39 illustrates an example of the 2D2P redundant configuration, but the method of the present example is applicable to any mDnP configuration (where m and n are natural numbers). Write data (mD) is stored in the local drive, and data of which the redundancy is reduced by 1 (the redundancy is n−1) is transmitted to other nodes.

For example, a 3D2P configuration (d1, d2, d3, p, and q), write data (d1+d2+d3) is stored in the local drive, and the data blocks d2, d3, p and q are transmitted to other nodes. A set of transmitted data blocks is not limited thereto, and, for example, the data blocks d1, d2, d3 and p may be transmitted to other nodes.

By combining the redundancy process of the present example with the redundancy process described in Example 1 in which a stripe is dynamically selected from among stripes of a single stripe type, a redundant code is generated by using the selected stripe, and information regarding the stripe and the redundant code is stored as metadata (for example, the log structuring mapping table 508), it is possible to reduce read modified write and a network transmission amount and thus to realize high performance in a write process. The redundancy process of the present example is applicable to the system including a plurality of protection layers described in Example 1.

In a case where a data length of received write data is small (for example, random write), data transmission for redundancy has small influence on a band of a network. Thus, the redundancy process of the present example may be performed only in a case where a data length is more than a preset threshold value (sequential write). In a case where a data length is equal to or less than the threshold value, for example, the redundancy process described in Example 1 is applied.

Consequently, it is possible to improve use ratios of a processor process and a network band. In this case, the distributed storage system may add information indicating whether or not a method of generating a class 2 code is applied to metadata (for example, the log structuring mapping table 508), and may switch between the redundancy processes according to the information. The distributed storage system may make a parity generation process efficient by writing a class 1 code to the local drive as an intra-node (node protection layer) parity.

FIG. 40 illustrates a data recovery process in Example 3.

FIG. 40 illustrates an example in which the nodes 101A and 101B fail, and write data is recovered.

Each of the nodes 101C and 101D recovers a class 1 code by using a class 2 code, and recovers user data of the nodes 101A and 101B by using the class 1 code.

Specifically, the node 101C acquires the parity qd from the node 101D, and recovers the parity pa of the node 101A and the parity pb of the node 101A by using the parity qd and the local parities xc and yc. Here, the node 101D may recover the parity qd by using the local user data d1$d$ and d2$d$ of the node 101D, and may replace the user data with parity pd if the parity pd is locally stored.

The node 101D acquires the parity qc from the node 101C, and recovers parities q (parities qa and qb) of the nodes 101A and 101B by using the parity qc and the local parities xd and yd. Here, the node 101C recovers the parity qc by using the local user data d1$c$ and d2$c$ of the node 101C.

The node 101C recovers the user data d1$a$ and d2$a$ by using the parity qa recovered by the node 101D and the parity pa recovered by the node 101C. The node 101D recovers the user data d1*b* and d2*b* by using the parity pb recovered by the node 101C and the parity qb recovered by the node 101D. As mentioned above, write data can be recovered through the recovery process of two stages.

FIG. 41 illustrates a redundancy destination changing process in Example 3.

FIG. 41 illustrates a redundancy destination changing process for the redundancy process in the present example. FIG. 41 illustrates an example in which a redundancy destination is changed in a case where a new node 101E is added to the system formed of the nodes 101A to 101D.

The nodes 101A, 101B and 101D storing a redundant code for user data on the node 101C which is an old redundancy destination regenerates class 1 codes, and transmit the class 1 codes to nodes other than the old redundancy destination. The node 101C which is an old redundancy destination erases a class 2 code.

Specifically, the node 101A reads the write data d1*a* and d2*a* from the local drive, regenerates the parity pa which has been transmitted to the node 101C by using the read write data d1*a* and d2*a*, so as to transmit the parity to the node 101B, and notifies the node 101C of a change of the redundancy destination of the parity pa. The nodes 101B and 101D respectively perform the same process on the parities pb and qd. If a notification indicating that all redundancy destinations of the parities pa, pb and qd are changed is received, the node 101C erases the parities xc and yc which are class 2 codes generating by using the parities. This notification may be a request for erasing a parity before a change. The node 101E which is a new redundancy destination generates parities xe and ye which are class 2 codes by using the parity qd transmitted from the node 101D and the data d2*a* and the parity pc respectively transmitted from the nodes 101A and 101C, and stores the parities in a drive.

In the above-described way, the distributed storage system can change a storage position of a redundant code.

According to each of the Examples, in a case where data of a computer node in which a failure occurs is recovered, the distributed storage system recovers an application program and user data accessed by the application program to a computer node which is a recovery destination. A redundant code is regenerated by using a new combination of user data for recovered user data and user data for which a redundant code is lost.

As mentioned above, since an application program and data accessed by the application program are maintained in the same computer node without reducing the redundancy of data, data reading is realized without using a network, and thus it is possible to improve delay time and a throughput.

The terms will be described. A computer system corresponds to the distributed storage system or the like. A computer corresponds to the computer node 101 or the like. A storage device corresponds to the drive 105 or the like. A logical storage region corresponds to a region or the like in a pool volume. A user data region corresponds to a region or the like of a stripe or a write data type. A redundant code region corresponds to a region or the like of a redundant code type. A group corresponds to a stripe type or the like of the protection layer #2 (site protection layer). Group information corresponds to the static mapping table 506 or the like. A redundant code corresponds to a redundant code or the like of the protection layer #2. A nonvolatile semiconductor memory corresponds to a flash memory. A primary redundant code corresponds to a class 1 code or the like. A redundant code corresponds to a redundant code of Examples 1 and 2, a class 2 code, or the like. A control program corresponds to the storage program 302, the management program 303, or the like. A write command corresponds to the D_WRITE command 3601 or the like. A redundant code generation command corresponds to the P_WRITE command 3602 or the like.

As described above, the embodiment of the present invention has been described, but is an example for description of the present invention, and the scope of the present invention is not intended to be limited to the configuration. The present invention can be implemented in other various forms.

REFERENCE SIGNS LIST

101 COMPUTER NODE, 105 DRIVE, 107 VIRTUAL VOLUME, 201 DOMAIN, 202 INTERNAL NETWORK, 203 BACKEND NETWORK, 204 EXTERNAL NETWORK, 205 MEMORY, 206 PROCESSOR, 207 PROCESSOR PACKAGE, 208 BACKEND PORT, 401 POOL VOLUME

The invention claimed is:

1. A computer system comprising:
   a plurality of computers,
   wherein each computer includes a storage device,
   wherein each computer sets a plurality of groups each including a user data region storing user data and a redundant code region storing a redundant code based on the user data in a logical storage region based on the storage device, and generates group information indicating positions of the user data region and the redundant code region in each of the plurality of computers for each group,
   wherein, in a case where a write request for write data is received, each computer writes the write data to a local storage device, selects a transmission destination computer from among other computers on the basis of the group information, and transmits transmission data based on the write data to the transmission destination computer,
   wherein, in a case where a plurality of pieces of transmission data are respectively received from a plurality of other computers, each computer generates a redundant code by using the plurality of pieces of transmission data on the basis of the group information, and writes the redundant code to the local storage device, and
   wherein, in a case where configurations of the plurality of computers are changed, each computer changes the group information on the basis of the changed configurations, reads user data from the local storage device, selects a new redundant code computer which is a computer storing a redundant code after being changed based on the read user data on the basis of the changed group information, transmits retransmission data based on the read user data to the new redundant code computer, selects an old redundant code computer which is a computer storing a redundant code before being changed based on the read user data on the basis of the group information before being changed, and transmits an erasure request for requesting the redundant code before being changed to be erased to the old redundant code computer.

2. The computer system according to claim 1,
   wherein each computer selects a logical storage region into which the write data is written, selects a user data region corresponding to the logical storage region, selects the transmission destination computer including a redundant code region corresponding to the selected user data region on the basis of the group information, and transmits the write data to the transmission destination computer as the transmission data, and wherein, in a case where the configurations of the plurality of computers are changed, each computer reads user data from the local storage device, and transmits the read user data to the new redundant code computer as the retransmission data.

3. The computer system according to claim 2, wherein each computer includes a processor, and wherein, in a case where the plurality of pieces of transmission data are received, the processor generates the redundant code by using the plurality of pieces of transmission data on the basis of the group information, and writes the redundant code to the local storage device.

4. The computer system according to claim 3, wherein the processor generates and changes the group information under the condition that a plurality of groups located in a single computer are different from each other, and wherein the redundancy after the group information is changed is the same as the redundancy before the group information is changed.

5. The computer system according to claim 4, wherein, in a case where any one of the plurality of computers withdraws from the computer system, the processor generates group information not including the withdrawing computer as the changed group information.

6. The computer system according to claim 5, wherein, in a case where a computer is joined to the computer system, the processor generates group information including the joined computer as the changed group information.

7. The computer system according to claim 6, wherein, in a case where a failure occurs in any of the plurality of computers, the processor recovers user data stored in the computer in which the failure occurs by using user data stored in computers other than the computer in which the failure occurs on the basis of the group information, and generates group information not including the computer in which the failure occurs as the changed group information.

8. The computer system according to claim 7, wherein the processor generates a pool based on the local storage device, and generates a virtual volume based on the pool, wherein the processor allocates a logical storage region in the pool to the virtual volume in response to the write request, wherein the processor specifies a user data region corresponding to the allocated logical storage region, wherein the processor executes an application program which accesses the virtual volume, and wherein, in a case where the failure occurs, the processor selects a computer which is a migration destination of a specific application program on the basis of a communication amount among the plurality of computers in a case where the specific application program having executed in the computer in which the failure occurs is transferred to computers other than the computer in which the failure occurs, and a resource use amount of each of the plurality of computers, copies the recovered user data to the migration destination computer, and migrates the specific application program to the migration destination computer.

9. The computer system according to claim 1, wherein the plurality of computers are disposed in a plurality of sites, wherein each computer sets a plurality of site groups each including a user data region and a redundant code region, and generates site group information indicating positions of the user data region and the redundant code region in each of the plurality of sites for each site group, wherein, in a case where the write request is received, each computer writes the write data to the local storage device, wherein each computer selects a transmission destination site from among other sites on the basis of the site group information asynchronously with the write request, and transmits site transmission data based on the write data to the transmission destination site, wherein, in a case where a plurality of pieces of site transmission data are respectively received from a plurality of other sites, each computer generates a site redundant code by using the plurality of pieces of site transmission data on the basis of the site group information, and writes the site redundant code to the local storage device, and wherein, in a case where configurations of the plurality of sites are changed, each computer changes the site group information on the basis of the changed configurations of the plurality of sites, reads data from the local storage device, selects a new redundant code site which is a site storing a site redundant code after being changed based on the read data on the basis of the changed site group information, transmits site retransmission data based on the read user data to the new redundant code site, selects an old redundant code site which is a site storing a site redundant code before being changed based on the read data on the basis of the site group information before being changed, and transmits an erasure request for requesting the site redundant code before being changed to be erased to the old redundant code site.

10. The computer system according to claim 1, wherein each computer includes a plurality of storage devices, wherein each computer sets a plurality of storage device groups each including a user data region and a redundant code region, and generates storage device group information indicating positions of the user data region and the redundant code region in each of the plurality of storage devices for each storage device group, wherein, in a case where the write request is received, each computer writes the write data to a first storage device among the plurality of storage devices, generates a storage device redundant code by using the write data on the basis of the storage device group information, and writes the storage device redundant code to a second storage device among the plurality of storage devices on the basis of the storage device group information, and wherein, in a case where configurations of the plurality of storage devices are changed, a computer corresponding to the plurality of storage devices of which the configurations are changed changes the storage device group information on the basis of the changed configurations of the plurality of storage devices, reads data from a storage device, selects a new redundant code storage device which is a storage device storing a storage device redundant code after being changed based on the read data on the basis of the changed storage device group information, writes storage device retransmission data based on the read data to the new redundant code storage device, selects an old redundant code storage device which is a storage device storing a storage device redundant code before being changed based on the read data on the basis of the storage device group information before being changed, and issues an erasure request for requesting the storage device redundant code before being changed to be erased to the old redundant code storage device.

11. The computer system according to claim 2,
wherein each computer includes a processor,
wherein the storage device includes a nonvolatile semiconductor memory and an internal processor connected to the nonvolatile semiconductor memory,
wherein the processor selects a logical storage region into which the write data is written, selects a user data region corresponding to the logical storage region, issues a write command accompanying the write data to a local storage device, selects the transmission destination computer including a redundant code region corresponding to the selected user data region on the basis of the group information, and transmits the write data to the transmission destination computer,
wherein, in a case where the write command is received, the internal processor writes the write data to the nonvolatile semiconductor memory,
wherein, in a case where the plurality of pieces of transmission data are received, the processor issues a redundant code generation command accompanying the plurality of pieces of transmission data to the local storage device on the basis of the group information, and
wherein, in a case where the redundant code generation command is received, the internal processor generates the redundant code by using the plurality of pieces of transmission data, and writes the redundant code to the nonvolatile semiconductor memory.

12. The computer system according to claim 1,
wherein, in a case where the write request is received, each computer writes the write data to the local storage device, generates a primary redundant code by using the write data, selects a plurality of transmission destination computers from among other computers on the basis of the group information, and transmits data selected from part of the write data and the primary redundant code to each transmission destination computer as transmission data,
wherein, in a case where the configurations of the plurality of computers are changed, each computer reads user data from the local storage device, generates a primary redundant code by using the read user data, selects a plurality of new redundant code computers on the basis of the changed group information, and transmits data selected from part of the read user data and the generated primary redundant code to each new redundant code computer as retransmission data, and
wherein, in a case where a plurality of pieces of retransmission data are respectively received from a plurality of other computers, each computer generates a redundant code after being changed by using the plurality of pieces of retransmission data on the basis of the group information, writes the redundant code after being changed to the local storage device, selects the old redundant code computer which is a computer storing a redundant code before being changed corresponding to the read user data and the primary redundant code on the basis of the group information before being changed, and transmits the erasure request for requesting the redundant code before being changed to be erased to the old redundant code computer.

13. A control method for a computer system including a plurality of computers, the control method comprising:
setting a plurality of groups each including a user data region storing user data and a redundant code region storing a redundant code based on the user data in a logical storage region based on the storage device of each computer, and generating group information indicating positions of the user data region and the redundant code region in each of the plurality of computers for each group;
in a case where a write request for write data is received, causing each computer to write the write data to a local storage device, to select a transmission destination computer from among other computers on the basis of the group information, and to transmit transmission data including at least part of the write data to the transmission destination computer;
in a case where a plurality of pieces of transmission data are respectively received from a plurality of other computers, causing each computer to generate a redundant code by using the plurality of pieces of transmission data on the basis of the group information, and to write the redundant code to the local storage device; and
in a case where configurations of the plurality of computers are changed, causing each computer to change the group information on the basis of the changed configurations, to read user data from the local storage device, to select a new redundant code computer which is a computer storing a redundant code after being changed based on the read user data on the basis of the changed group information, to transmit retransmission data based on the read user data to the new redundant code computer, to select an old redundant code computer which is a computer storing a redundant code before being changed based on the read user data on the basis of the group information before being changed, and to transmit an erasure request for requesting the redundant code before being changed to be erased to the old redundant code computer.

14. A non-transitory computer readable recording medium storing a control program causing a computer to execute a process for controlling a plurality of computers, the process comprising:
setting a plurality of groups each including a user data region storing user data and a redundant code region storing a redundant code based on the user data in a logical storage region based on a storage device of each computer, and generating group information indicating positions of the user data region and the redundant code region in each of the plurality of computers for each group;
in a case where a write request for write data is received, writing the write data to a local storage device, selecting a transmission destination computer from among other computers on the basis of the group information, and transmitting transmission data including at least part of the write data to the transmission destination computer;
in a case where a plurality of pieces of transmission data are respectively received from a plurality of other computers, generating a redundant code by using the plurality of pieces of transmission data on the basis of the group information, and writing the redundant code to the local storage device; and in a case where configurations of the plurality of computers are changed, changing the group information on the basis of the changed configurations, reading user data from the local storage device, selecting a new redundant code computer which is a computer storing a redundant code after being changed based on the read user data on the basis of the changed group information, transmitting retransmission data based on the read user data to the new redundant code computer, selecting an old redundant code computer which is a computer storing a redundant code before being changed based on the read user data on the basis of the group information before being changed, and transmitting an erasure request for requesting the redundant code before being changed to be erased to the old redundant code computer.

* * * * *